US012037213B2

(12) United States Patent
Arakawa et al.

(10) Patent No.: US 12,037,213 B2
(45) Date of Patent: Jul. 16, 2024

(54) IMAGE RECORDING APPARATUS

(71) Applicant: BROTHER KOGYO KABUSHIKI KAISHA, Nagoya (JP)

(72) Inventors: Yuta Arakawa, Nagoya (JP); Hiroaki Takahashi, Nagoya (JP); Hideaki Yoshimune, Nagoya (JP); Kengo Noda, Inazawa (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 154 days.

(21) Appl. No.: 17/015,685

(22) Filed: Sep. 9, 2020

(65) Prior Publication Data

US 2021/0070576 A1 Mar. 11, 2021

(30) Foreign Application Priority Data

Sep. 10, 2019 (JP) ................................ 2019-164634
Sep. 10, 2019 (JP) ................................ 2019-164637
Sep. 10, 2019 (JP) ................................ 2019-164638
Sep. 10, 2019 (JP) ................................ 2019-164639
Sep. 10, 2019 (JP) ................................ 2019-164640

(51) Int. Cl.
*B41J 11/06* (2006.01)
*B65H 29/12* (2006.01)
*B41J 11/00* (2006.01)

(52) U.S. Cl.
CPC ........... *B65H 29/125* (2013.01); *B41J 11/006* (2013.01); *B65H 2402/40* (2013.01); *B65H 2601/11* (2013.01)

(58) Field of Classification Search
CPC .............. B65H 29/125; B65H 2402/40; B65H 2601/11; B41J 11/006
See application file for complete search history.

(56) References Cited

U.S. PATENT DOCUMENTS

2011/0188916 A1* 8/2011 Sano ........................ B41J 13/00 400/642
2011/0236118 A1* 9/2011 Ota ........................ B41J 3/4071 400/642

(Continued)

FOREIGN PATENT DOCUMENTS

JP S61-154870 A 7/1986
JP 10-291698 * 11/1998

(Continued)

OTHER PUBLICATIONS

Machine translation of JP10-291698. (Year: 1998).*

(Continued)

*Primary Examiner* — Thomas A Morrison
(74) *Attorney, Agent, or Firm* — Baker Botts L.L.P.

(57) ABSTRACT

An image recording apparatus is provided, including a casing; a tray which is to be installed to the casing by being inserted in a first orientation and which is to be withdrawn from the casing in a second orientation that is opposite to the first orientation; a sheet conveying passage; a platen; a recording part; and an interlock which moves the platen while being interlocked with movement of the tray in the first orientation or movement in the second orientation. The platen is movable to a printing position and a release position. The interlock moves the platen from the printing position to the release position while being interlocked with the withdrawal of the tray from the casing or the insertion of the tray into the casing.

19 Claims, 34 Drawing Sheets

(56) References Cited

U.S. PATENT DOCUMENTS

| | | | | |
|---|---|---|---|---|
| 2012/0081760 | A1* | 4/2012 | Asada | B41J 3/4071 358/471 |
| 2012/0162302 | A1* | 6/2012 | Oguchi | B41J 29/38 347/16 |
| 2013/0293656 | A1* | 11/2013 | Anami | B41J 11/006 347/104 |
| 2014/0063166 | A1* | 3/2014 | Nogami | B41J 3/4071 347/108 |
| 2014/0232800 | A1 | 8/2014 | Sano et al. | |
| 2015/0090561 | A1 | 4/2015 | Mimoto et al. | |
| 2015/0259166 | A1* | 9/2015 | Wakakusa | B65H 5/36 271/9.01 |
| 2016/0289023 | A1 | 10/2016 | Uchino | |
| 2019/0185281 | A1* | 6/2019 | Niwata | H04N 1/00588 |

FOREIGN PATENT DOCUMENTS

| | | | |
|---|---|---|---|
| JP | 2006-036516 | A | 2/2006 |
| JP | 2012-076272 | A | 4/2012 |
| JP | 2014-156088 | A | 8/2014 |
| JP | 2015-016598 | A | 1/2015 |
| JP | 2015-066934 | A | 4/2015 |
| JP | 2015-067449 | A | 4/2015 |
| JP | 2016-064577 | A | 4/2016 |
| JP | 2016-064891 | A | 4/2016 |
| JP | 2016-193547 | A | 11/2016 |
| JP | 2019-011183 | A | 1/2019 |

OTHER PUBLICATIONS

Machine translation of Japanese Publication No. 2015-066934. (Year: 2015).*

Machine translation of Japanese Publication No. 2016-193547. (Year: 2016).*

Japan Patent Office, Notice of Reasons for Refusal issued in Japanese Patent Application No. 2019-164637, dated Jun. 13, 2023 (5 pages).

Japan Patent Office, Notice of Reasons for Refusal issued in Japanese Patent Application No. 2019-164634, dated Jun. 27, 2023 (8 pages).

* cited by examiner

IMAGE RECORDING APPARATUS

CROSS REFERENCE TO RELATED APPLICATION

The present application claims priority from Japanese Patent Applications No. 2019-164634 filed on Sep. 10, 2019, No. 2019-164638 filed on Sep. 10, 2019, No. 2019-164637 filed on Sep. 10, 2019, No. 2019-164639 filed on Sep. 10, 2019 and No. 2019-164640 filed on Sep. 10, 2019, the disclosures of which are incorporated herein by reference in their entireties.

BACKGROUND

Field of the Invention

The present disclosure relates to an image recording apparatus which records an image on a sheet.

Description of the Related Art

Regarding an image recording apparatus, in a case that a sheet is jammed in the inside of a casing of the image recoding apparatus, the sheet is removed from the inside of the casing by allowing a user to access the sheet from the outside of the casing.

For example, a printer is known, including a rotatable platen which is opposed to a recording part configured to record an image on a sheet and which supports the sheet. In the case of this printer, if the sheet is jammed in the space between the recording unit and the platen, then a tray, on which the sheet is supported, is withdrawn from the casing, and then the platen is controlled and rotated by a controller from a reference position to a release position. Thus, such a state is given that a sheet conveying passage is open to a great extent, and it is easy to take out the sheet.

SUMMARY

However, in the case of the known printer described above, the platen is rotated to the release position after the withdrawal of the tray from the casing. Therefore, it is necessary for the user to operate a switch for releasing the locked state of the platen and/or operate a lever for changing the locked state. In this case, it is feared that the user may forget the execution of the operation after the withdrawal of the tray from the casing. In such a situation, the platen remains at the reference position. Therefore, it is feared that the sheet cannot be taken out. Further, time and labor are required to perform the operation in order to rotate the platen.

The present disclosure has been made taking the foregoing circumstances into consideration, an object of which is to provide an image recording apparatus which makes it possible to reliably move a platen from a position provided during the printing to a position provided when a sheet is taken out, in accordance with the withdrawal of a tray from a casing.

According to the present disclosure, there is provided an image recording apparatus including:

- a casing including an opening and an internal space, the internal space being open to outside via the opening;
- a tray which is to be installed to the casing by being inserted in a first orientation into the internal space via the opening, which is to be withdrawn from the casing in a second orientation that is opposite to the first orientation, and which is configured to support a sheet;
- a sheet conveying passage located in the casing;
- a platen located in the conveying passage and including a support surface for supporting the sheet;
- a recording part located above the platen and configured to record an image on the sheet supported by the platen; and
- an interlock which moves the platen while being interlocked with movement of the tray in the first orientation or movement in the second orientation,
- wherein the platen is movable to a printing position which is a position provided during the recording of the image on the sheet by the recording part and a release position at which the support surface is located under the printing position, and
- wherein the interlock moves the platen from the printing position to the release position while being interlocked with the withdrawal of the tray from the casing or the insertion of the tray into the casing.

In this configuration, when the tray is withdrawn from the casing, the platen is moved to the release position. In other words, it is unnecessary to provide any exclusive switch and/or any exclusive lever which would be otherwise operated by the user in order to move the platen to the release position. The platen can be reliably moved to the release position by merely withdrawing the tray from the casing.

Usually, when the image is recorded on the sheet, the tray is installed to the casing of the image recording apparatus. In the configuration of the present disclosure, the platen is moved to the printing position while being interlocked with the insertion of the tray into the casing. Therefore, it is possible to avoid such a situation that the printing process is executed while the platen is not returned to the printing position.

According to the image recording apparatus concerning the present disclosure, it is possible to move the platen from the printing position to the release position in accordance with the withdrawal of the tray from the casing.

DESCRIPTION OF THE PREFERRED EMBODIMENTS

Figure 1:
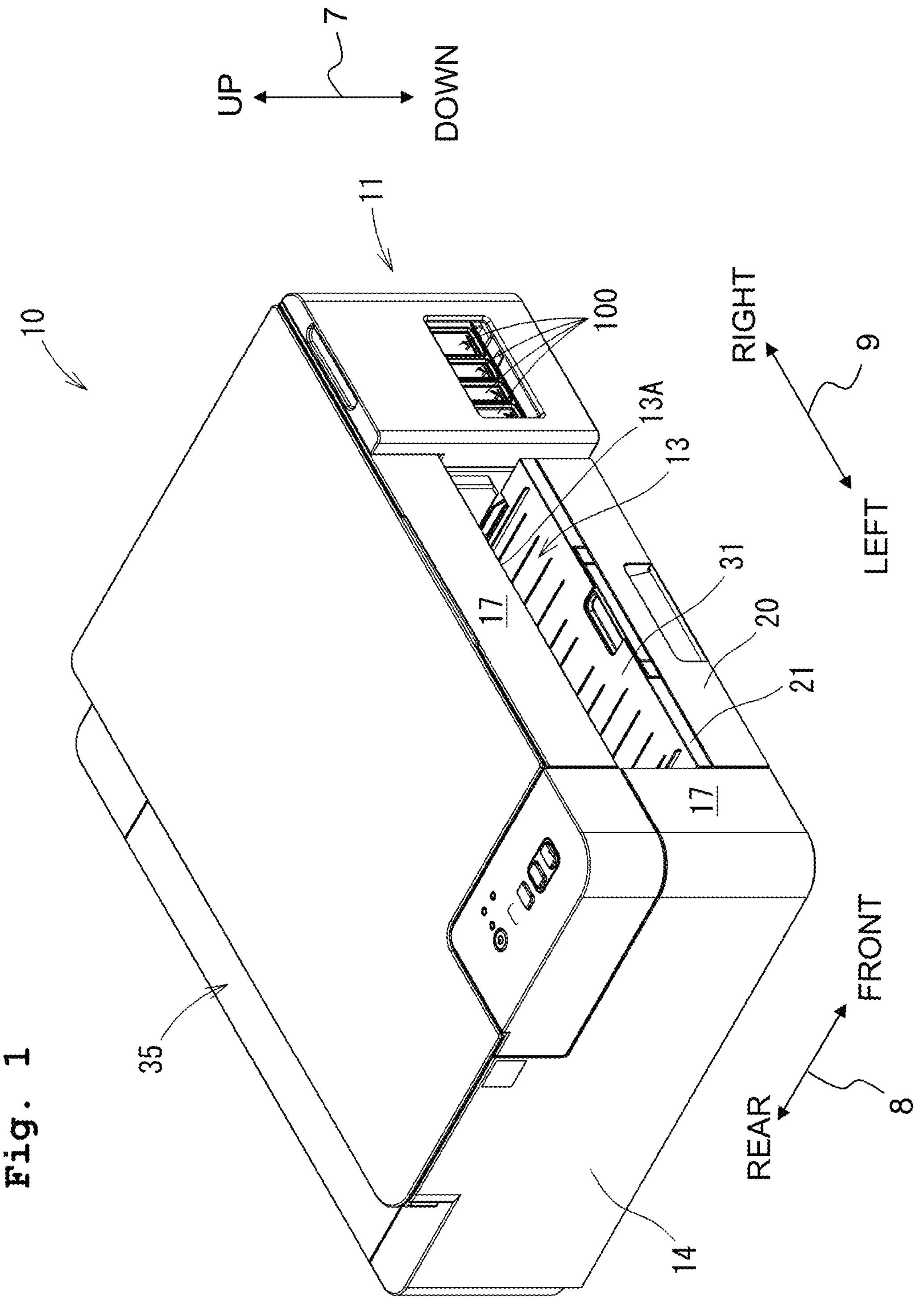
FIG. 1 is a perspective view depicting a multifunction peripheral 10 including a printer part 11 as an image recording apparatus according to an embodiment of the present disclosure.

An explanation will be made below, while appropriately referring to the drawings, about an embodiment of the present disclosure. Note that the embodiment explained below is merely an example of the present disclosure. It goes without saying that the embodiment of the present disclosure can be appropriately changed within a range without changing the gist or essential characteristics of the present disclosure. In the following explanation, an up-down direction 7 is defined on the basis of a state (state depicted in FIG. 1) in which a multifunction peripheral 10 is usably installed. A front-rear direction 8 is defined assuming that a plane, in which an opening 13 is provided, is defined as a front side (front surface 17). A left-right direction 9 (an example of a "scanning direction") is defined as viewing the multifunction peripheral 10 from the front side (side of the front surface 17). The up-down direction 7, the front-rear direction 8, and the left-right direction 9 are orthogonal to one another. Further, in the following explanation, advancement or movement (displacement) directed from a starting point to an end point of an arrow is expressed as an "orientation", and going forth and back on a line connecting the starting point and the end point of the arrow is expressed as a "direction". In other words, the orientation is a component of the direction.

[Overall Structure of Multifunction Peripheral 10]

As depicted in FIG. 1, the multifunction peripheral 10 is provided with a casing 14 which is generally formed into a thin type rectangular parallelepiped. The multifunction peripheral 10 has various functions including, for example, a print function and a scan function. As the print function, the multifunction peripheral 10 has a function of recording an image on one surface of the recording paper 12 (see FIG. 2, example of a "sheet") in accordance with the ink-jet system. The multifunction peripheral 10 may be configured to record images on both surfaces of the recording paper 12. A printer part 11 (example of an "image recording apparatus") is provided at a lower portion of the casing 14 in order to realize the print function. A scanner part 35 is provided at an upper portion of the casing 14 in order to realize the scan function.

The casing 14 is an exterior cover for accommodating therein the respective constitutive elements of the printer part 11 and the scanner part 35. The casing 14 is placed on a base member 90 (see FIG. 3), which will be described later on, from an upper position to cover the base member 90.

Figure 2:
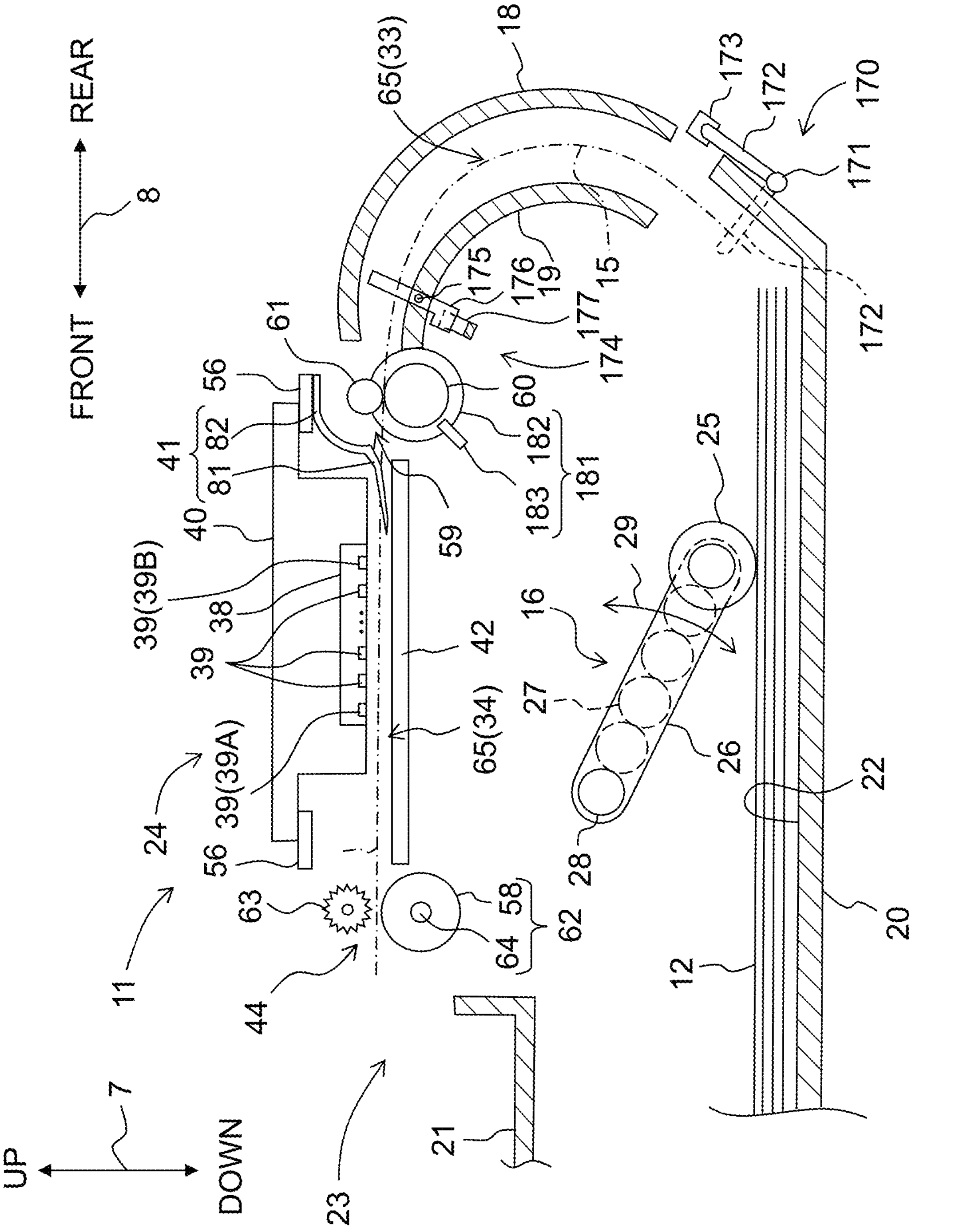
FIG. 2 is a vertical sectional view schematically depicting the internal structure of the printer part 11.
Figure 3:
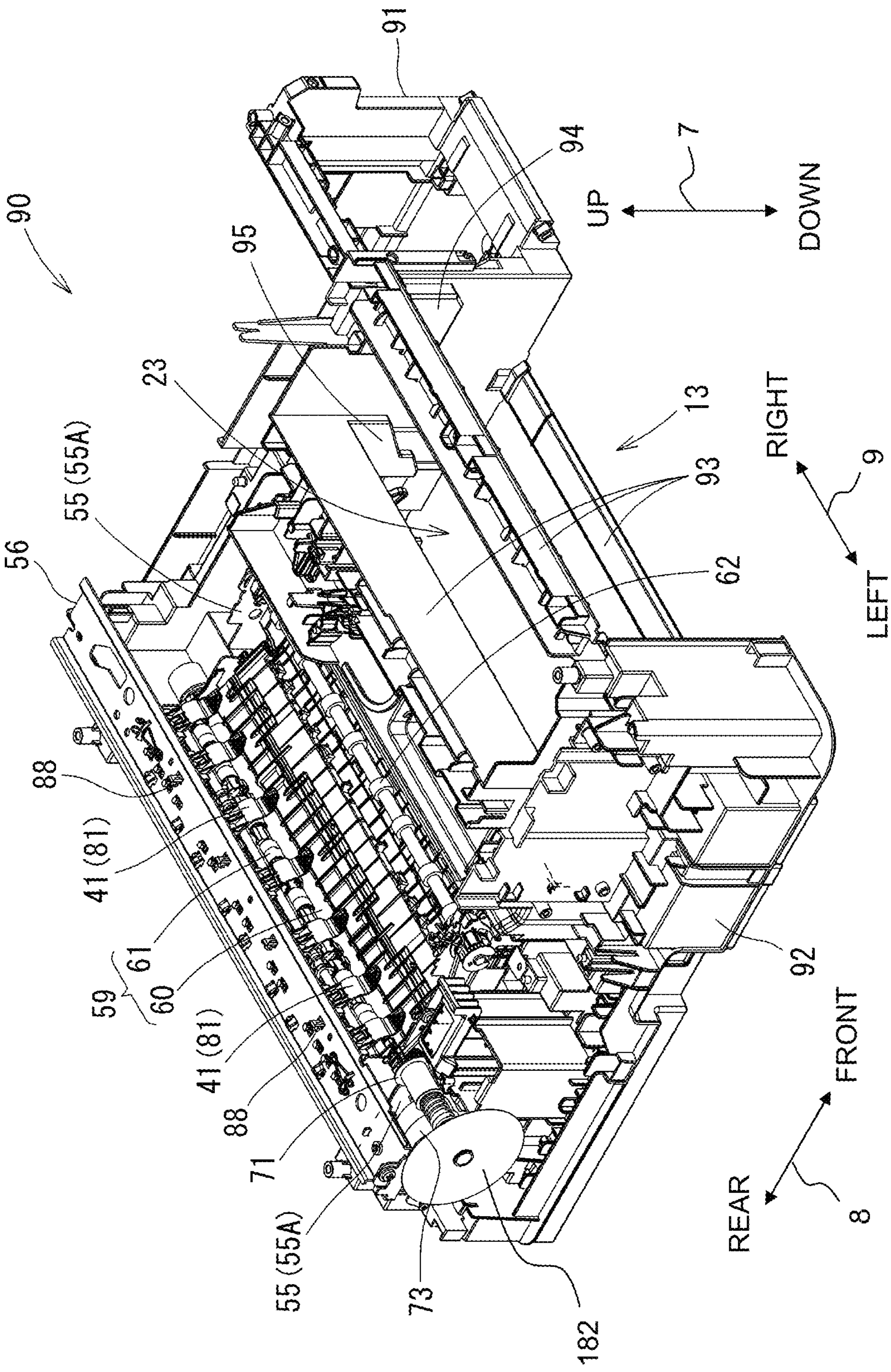
FIG. 3 is a perspective view depicting a lower portion of the printer part 11.
Figure 11:
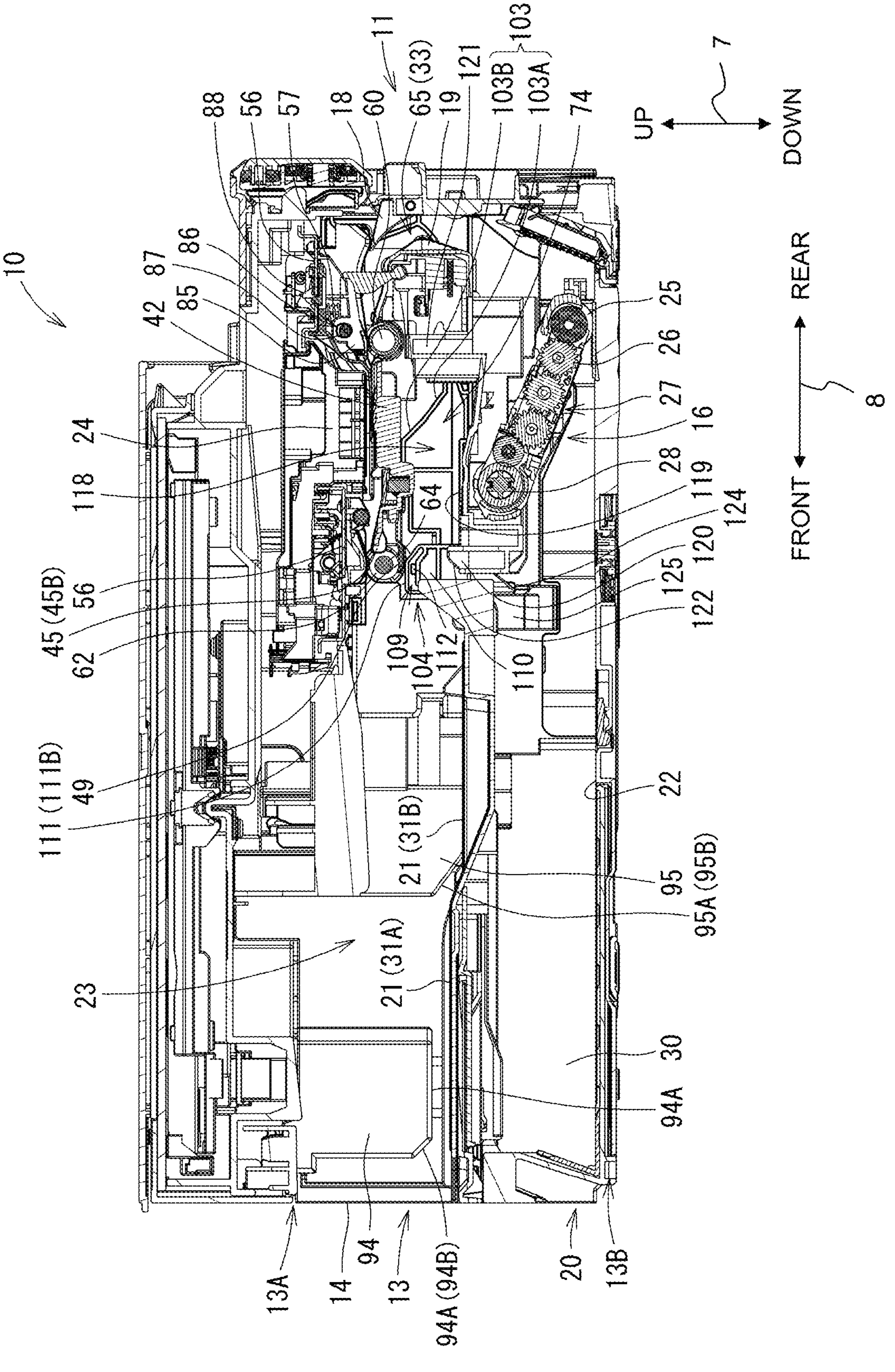
FIG. 11 is a vertical sectional view taken along the center in the left-right direction 9 of the printer part 11 in a state that the feed tray 20 is installed.

As depicted in FIGS. 2 and 3, the printer part 11 is provided with, as constitutive elements thereof, a feed tray 20 (example of a "tray"), a discharge tray 21, a feeding part 16, a conveying passage 65, a base member 90, a pair of side frames 55 (example of a "frame"), a recording part 24, guide rails 56, a conveying roller pair 59 (example of a "first roller pair"), a discharge roller pair 44 (example of a "second roller pair"), a contact member 41, a platen 42, and an interlocking mechanism. As depicted in FIG. 11, the interlocking mechanism is provided with slide members 74, levers 75, coil springs 115 (example of the biasing member), a tray sensor 170, a sheet sensor 174, an encoder 181, and a controller 190. As depicted in FIGS. 2, 3 and 11, the feeding part 16, the conveying passage 65, the pair of side frames 55, the recording part 24, the guide rails 56, the conveying roller pair 59, the discharge roller pair 44, the contact member 41, the platen 42, and the interlocking mechanism are positioned at the inside of the casing 14.

[Feed Tray 20]

As depicted in FIG. 1, the opening 13 is formed in the front surface 17 of the casing 14. As depicted in FIG. 3, the casing 14 has an internal space 23. The internal space 23 is open to the outside (space disposed in front of the casing 14) via the opening 13.

The feed tray 20 is installed to the casing 14 by being inserted into the casing 14 via the opening 13 and by being moved backwardly (in the backward orientation). FIG. 1 depicts a state in which the feed tray 20 is installed to the casing 14. The feed tray 20, which is installed to the casing 14, is withdrawn from the casing 14 via the opening 13 by being moved frontwardly (in the frontward orientation) (see FIG. 4). The backward orientation is an example of a "first orientation". The frontward orientation (opposite to the backward orientation) is an example of a "second orientation".

Figure 4:
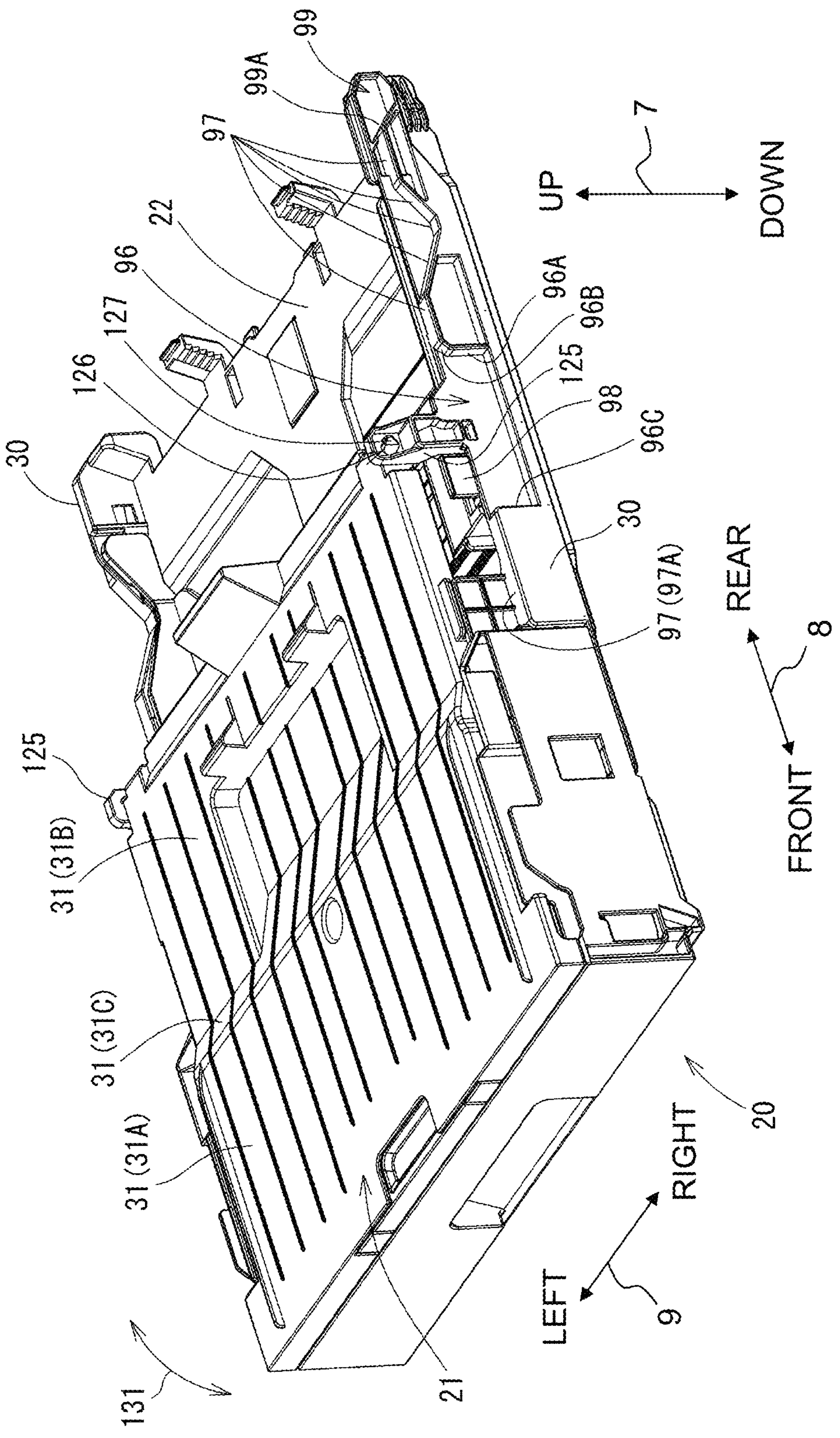
FIG. 4 is a perspective view depicting a feed tray 20 and a discharge tray 21.

As depicted in FIG. 4, the feed tray 20 is a box-shaped member having an upper portion which is open. The feed tray 20 is provided with a bottom wall 22 and a pair of side walls 30.

As depicted in FIG. 2, sheets of the recording paper 12 are supported by the bottom wall 22 in a stacked state. Note that the recording paper 12 is omitted from the illustration in the respective drawings which are different from FIG. 2.

As depicted in FIG. 4, the bottom wall 22 supports a pair of side guides 98 which are movable in the left-right direction 9. Note that FIG. 4 depicts only a side guide 98 on the right side (right side guide 98) of the pair of side guides 98, and a side guide 98 on the left side (left side guide 98) of the pair of side guides 98 is disposed at a position at which the left side guide 98 is hidden by the discharge tray 21 and is not visible. A right end of the recording paper 12 supported by the bottom wall 22 makes contact with (abuts against) the left surface of the right side guide 98. A left end of the recording paper 12 supported by the bottom wall 22 makes contact with the right surface of the left side guide 98. The pair of side guides 98 are connected to one another so that the pair of side guides 98 are interlockable with each other. When one of the pair of side guides 98 is moved rightwardly or leftwardly, the other is interlocked and moved leftwardly or rightwardly.

As depicted in FIG. 4, the pair of side walls 30 are provided upstandingly in the upward direction from a right end and a left end of the bottom wall 22. The pair of side walls 30 extend in the front-rear direction 8. The pair of side walls 30, which parts or portions subjected to the contact by the levers 75 (as will be described later on) in the feed tray 20, are positioned under or below an upper end 13A of the opening 13 (see FIG. 11).

The pair of side walls 30 have recesses 99 which are disposed at back end portions thereof and which are recessed downwardly from the upper surface 97. An inclined surface 99A, which comparts a front end of the recess 99, is inclined upwardly further toward closely to the front.

The pair of side walls 30 have cutouts 96 on outer sides thereof in the left-right direction 9. In other words, inner side portions in the left-right direction 9 of the pair of side walls 30 are not cut out. The pair of side walls 30 are provided with projected parts 125 which project or protrude upwardly and which are disposed at the positions not subjected to the cutting out. The projected parts 125 support the discharge tray 21.

The cutouts 96 are recessed downwardly from the upper surfaces 97 of the pair of side walls 30. The cutouts 96 are formed at approximately central portions in the front-rear direction 8 of the pair of side walls 30. A back end of each of the cutouts 96 is comparted by a back surface 96A. An upper end portion of the back surface 96A is an inclined surface 96B. The inclined surface 96B is inclined upwardly further toward closely to the back. A front end of the cutout 96 is comparted by a front surface 96C.

The projected parts 125 make contact with protrusions 124 of the slide members 74 from front positions of the slide members 74 during a process in which the feed tray 20 is (being) inserted into the casing 14. Holes 126, which penetrate in the left-right direction 9, are formed at the upper end portions of the projected parts 125. Projections (bumps) 127 of the discharge tray 21 are inserted into the holes 126 (see FIG. 4).

The lever 75 (to be described later on) is arranged over or above the cutout 96. Therefore, each of the projected parts 125 is arranged while being offset to the inside in the left-right direction 9 of the side wall 30, and each of the projected parts 125 is made high. Accordingly, the position of the discharge tray 21 supported by the projected parts 125 is offset upwardly. Therefore, it is possible to obtain a high height of the side guide 98 positioned under or below the discharge tray 21.

The upper surface 97 has a horizontal surface 97A which extends frontwardly from an upper end of the front surface 96C of the cutout 96.

[Discharge Tray 21]

As depicted in FIG. 4, the discharge tray 21 is rotatably supported by the feed tray 20, and the discharge tray 21 is movable in the front-rear direction 8 integrally with the feed tray 20. The discharge tray 21 is provided with the projections 127 which project or protrude in the left-right direction 9 from both of left and right ends disposed at back end portions thereof. The projections 127 are inserted into the holes 126 which are formed through the projected parts 125 of the feed tray 20. Accordingly, the discharge tray 21 is rotatable (rockable, pivotable) in directions of arrows 131 with respect to the feed tray 20 about the center of the shaft or axis which passes through the centers of the projections 127 and which extends in the left-right direction 9. A front upper portion of the feed tray 20 is opened/closed in accordance with the rotation of the discharge tray 21. FIG. 4 depicts a state in which the feed tray 20 is closed by the discharge tray 21. The recording paper 12 can be put in and taken out with respect to the feed tray 20 by rotating the discharge tray 21 upwardly from the closed state so that the feed tray 20 is opened.

As depicted in FIGS. 2 and 11, when the feed tray 20 is installed to the casing 14, an upper surface 31 of the discharge tray 21 constructs the bottom surface which comparts the internal space 23. The upper surface 31 supports the recording paper 12 which is discharged to the internal space 23 after having an image recorded thereon by the recording part 24. The recording paper 12, which is supported by the upper surface 31, is taken out by the user to the outside of the casing 14 via the opening 13.

As depicted in FIG. 4, the upper surface 31 has a front upper surface 31A, a back upper surface 31B, and an inclined surface 31C. The front upper surface 31A extends backwardly from a front end of the upper surface 31. The front upper surface 31A extends, in the front-rear direction 8, up to the vicinity of the front of the horizontal surface 97A of the side wall 30 of the feed tray 20 front-rear direction. The back upper surface 31B extends frontwardly from a back end of the upper surface 31. The back upper surface 31B is positioned under or below the front upper surface 31A. The back upper surface 31B is connected to the front upper surface 31A via the inclined surface 31C.

[Feeding Part 16]

As depicted in FIGS. 2 and 11, the feeding part 16 is positioned over or above the bottom wall 22 of the feed tray 20 in a state that the feed tray 20 is installed to the printer part 11 and is positioned under or below the recording part 24. The feeding part 16 is provided with a feed roller 25, a feed arm 26, and a driving transmitting mechanism 27. The feed roller 25 is rotatably supported at a forward end portion of the feed arm 26. The feed arm 26 is rotatable in the directions of arrows 29 about the center of a support shaft 28 provided at a proximal end portion of the feed arm 26. Accordingly, the feed roller 25 is capable of making contact with and separating away from the feed tray 20 or the recording paper 12 supported by the feed tray 20.

The feed roller 25 is rotated by a driving force of a conveying motor 73 (see FIG. 3) transmitted by the driving transmitting mechanism 27 including a plurality of gears. Accordingly, a recording paper sheet 12, which is disposed on the uppermost side, among recording paper sheets 12 supported by the bottom wall 22 of the feed tray 20, and which makes contact with the feed roller 25, is fed to the conveying passage 65. Note that the feed roller 25 may be rotated by the driving force applied thereto from a motor which is provided separately from the conveying motor 73. Further, the driving transmitting mechanism 27 is not limited to the form which includes the plurality of gears. For example, the driving transmitting mechanism 27 may include a belt which is stretched between the support shaft 28 and the shaft of the feed roller 25.

[Conveying Passage 65]

As depicted in FIG. 2, the conveying passage 65 extends from a back end portion of the feed tray 20. The conveying passage 65 is formed at a location behind or on the back side of the internal space 23. In other words, the conveying passage 65 is formed at a position opposite to the opening 13 positioned at the front end of the casing 14, with respect to the internal space 23. The conveying passage 65 is provided with a curved part 33 (example of a “first path”) and a straight part 34 (example of a “second path”). The curved part 33 extends while being curved, with the back side thereof being as the outer side of the curvature and the front side thereof being as the inner side of the curvature. The straight part 34 extends in the front-rear direction 8.

The curved part 33 extends upwardly from the back end portion of the feed tray 20, while the curved part 33 U-turns from the backward orientation to the frontward orientation. The curved part 33 is formed by a first guide member 18 and a second guide member 19 which are opposed to one another while being separated from each other by a predetermined spacing distance. The first guide member 18 comparts the outer side of the curvature of the curved part 33. The second guide member 19 comparts the inner side of the curvature of the curved part 33.

The straight part 34 extends generally in the front-rear direction 8. A back end of the straight part 34 is continued to the curved part 33. A front end of the straight part 34 is continued to the internal space 23. In other words, the straight part 34 is continued to the curved part 33, and the straight part 34 extends frontwardly to arrive at the internal space 23. In other words, the straight part 34 extends backwardly from the internal space 23. The straight part 34 is formed by the recording part 24 and the platen 42 which are opposed to one another while being separated from each other by a predetermined spacing distance, at a position at which the recording part 24 is arranged. The first guide member 18 and the second guide member 19 are provided to extend in the left-right direction 9 which is a direction orthogonal to the sheet surface of FIG. 2.

The recording paper 12, which is supported by the feed tray 20, is conveyed so that the recording paper 12 U-turns from the downward to the upward through the curved part 33 by means of the feed roller 25, and the recording paper 12 arrives at the conveying roller pair 59. The recording paper 12, which is nipped by the conveying roller pair 59, is conveyed frontwardly through the straight part 34, with the image recording surface being directed to the recording part 24. The recording paper 12, which arrives at the position just under or immediately below the recording part 24, is subjected to the recording of the image on the image recording surface by the recording part 24. The recording paper 12, on which the image has been recorded, is conveyed frontwardly through the straight part 34, and the recording paper 12 is discharged to the upper surface 31 of the discharge tray 21. As described above, the recording paper 12 is conveyed along with a conveying orientation 15 indicated by an arrow of alternate long and short dash line depicted in FIG. 2.

[Base Member 90]

The base member 90 depicted in FIG. 3 is a member which constructs a lower portion of the printer part 11. The base member 90 is integrally formed or molded with a resin material such as PBT, ABS, etc.

As depicted in FIG. 3, the base member 90 is provided with a right part 91 which constitutes a right portion of the printer part 11, a left part 92 which constitutes a left portion of the printer part 11, and a connecting part 93 which connects the right part 91 and the left part 92.

The bottom surface of the base member 90 is a placing surface when the multifunction machine 10 is placed, for example, on a desk.

The right part 91 is positioned rightwardly as compared with the feed tray 20 installed to the casing 14. The left part 92 is positioned leftwardly as compared with the feed tray 20 installed to the casing 14. In other words, the feed tray 20 is installed between the right part 91 and the left part 92.

Figure 12:
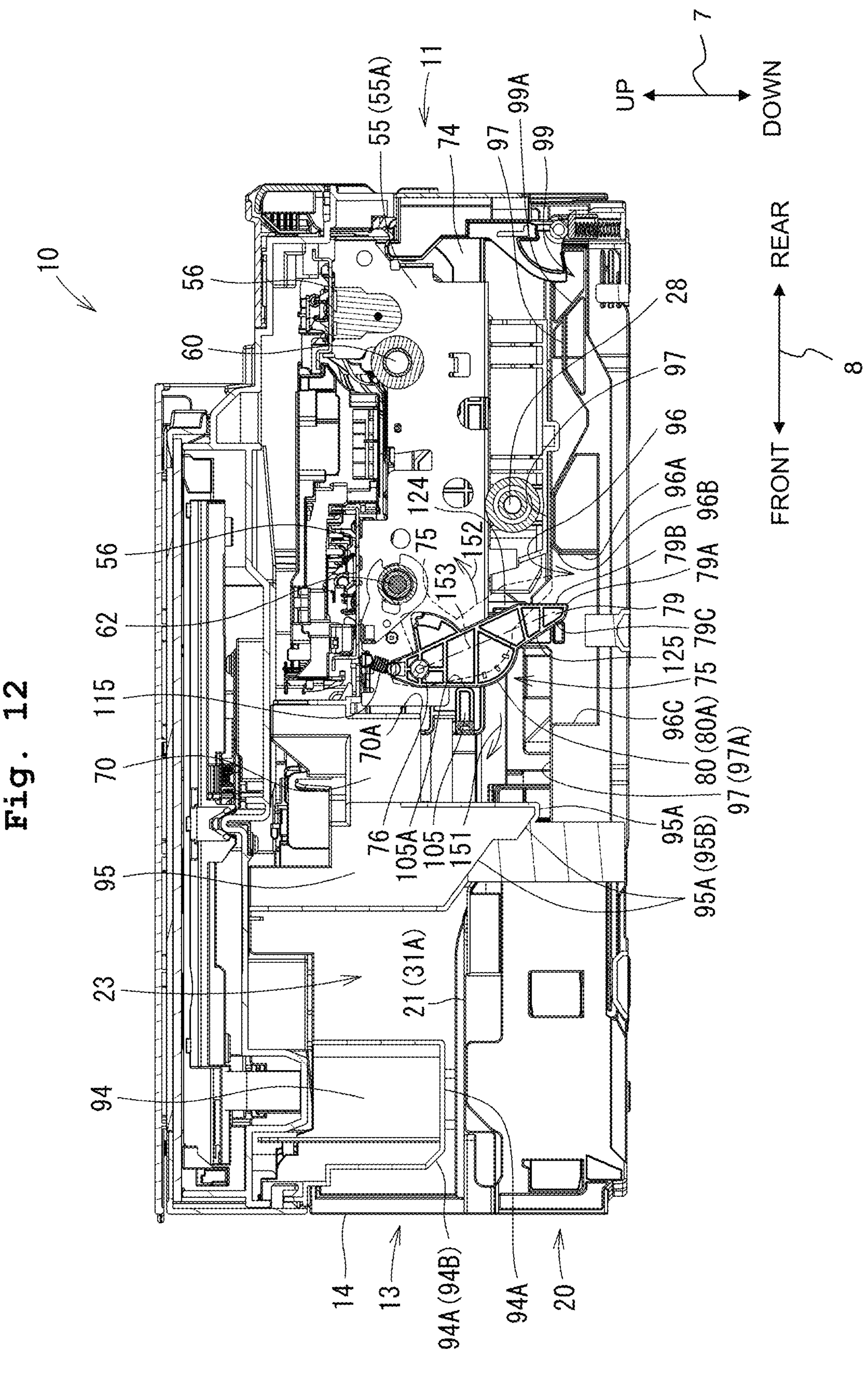
FIG. 12 is a vertical sectional view depicting the printer part 11 at a position at which the lever 75 on the right side can be seen from a right position in the state that the feed tray 20 is installed.

As depicted in FIGS. 3 and 12, each of the right part 91 and the left part 92 is provided with a first protrusion 94 and a second protrusion 95. The first protrusion 94 and the second protrusion 95, which are provided for the right part 91, protrude leftwardly from the left surface of the right part 91. The first protrusion 94 and the second protrusion 95, which are provided for the left part 92, protrude rightwardly from the right surface of the left part 92. The second protrusion 95 is positioned at the back of the first protrusion 94. The first protrusion 94 and the second protrusion 95 are provided while providing a spacing distance in the front-rear direction 8.

A lower surface 94A of the first protrusion 94 and a lower surface 95A of the second protrusion 95 are capable of making contact with the upper surface 97 of the side wall of the feed tray 20 and the upper surface 31 of the discharge tray 21 from thereabove (from the upper positon). The lower surface 94A has an inclined surface 94B. The inclined surface 94B is inclined downwardly further toward closely to the back. The lower surface 95A has an inclined surface 95B. The inclined surface 95B is inclined downwardly further toward closely to the back. The inclined surfaces 94B, 95B downwardly guide the feed tray 20 inserted into the casing 14.

As depicted in FIG. 12, each of the right part 91 and the left part 92 is provided with a third protrusion 70 which is disposed at the back of the second protrusion 95. The third protrusion 70 is continued to the second protrusion 95. A lower end of the third protrusion 70 is positioned upwardly as compared with the lower end of the second protrusion 95. A back lower end part 70A of the third protrusion 70 makes contact with the lever 75 so as to regulate the rotation of the lever 75 in the orientation of an arrow 151.

As depicted in FIG. 11, the connecting part 93 has a recess 118 which is disposed under or below the platen 42 and which is recessed downwardly. The bottom of the recess 118 is comparted by a surface 119. The surface 119 is sandwiched, in the front-rear direction 8, by walls 120, 121 which protrude upwardly from the surface 119 front-rear direction. The wall 120 is positioned in front of the wall 121. The walls 120, 121 extend in the left-right direction 9. The wall 120 has an inclined surface 122 on its upper surface. The inclined surface 122 is inclined upwardly further toward closely to the back.

[Side Frame 55]

Figure 5:
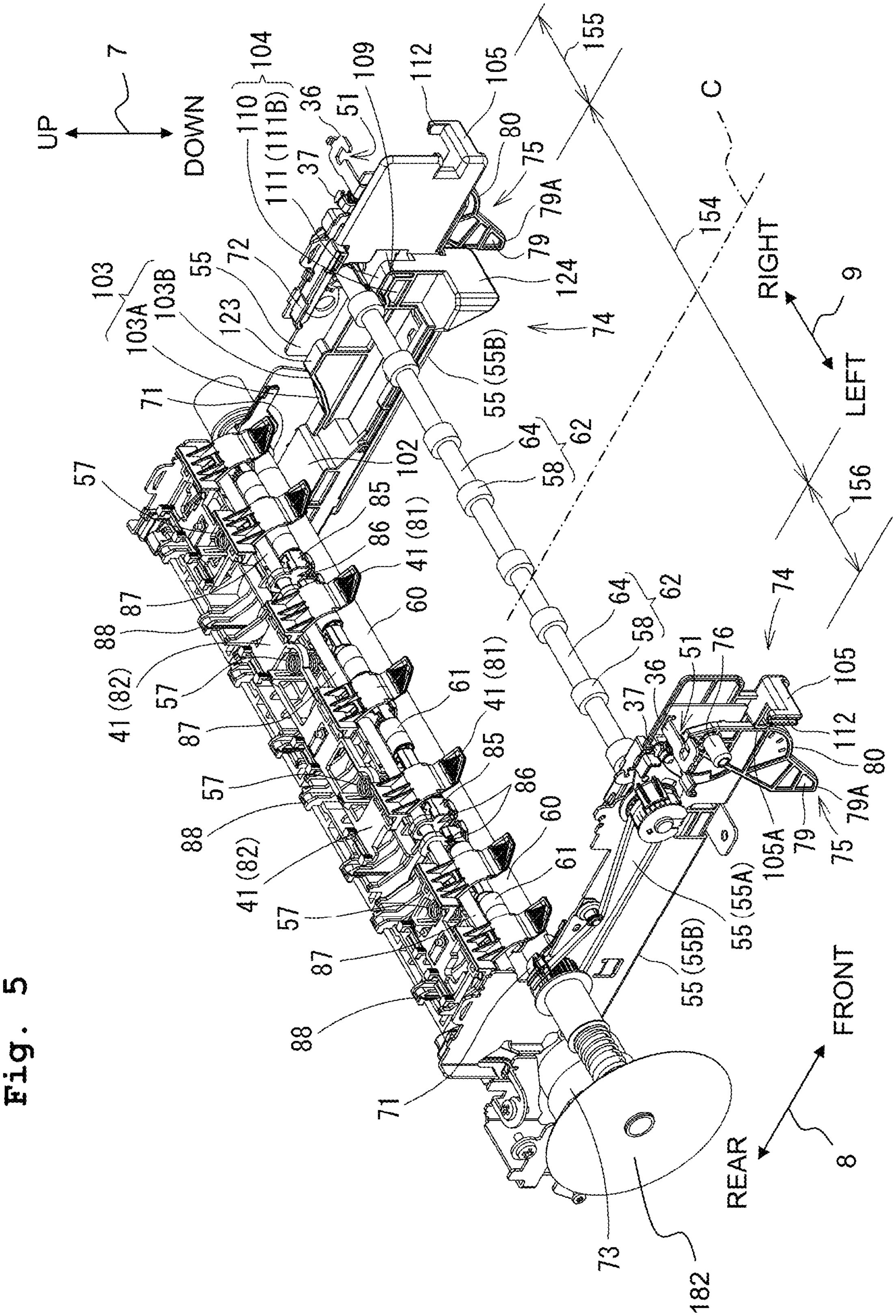
FIG. 5 is a perspective view depicting a conveying roller 60, a discharge roller 62, a roller holder 85, a side frame 55, a slide member 74, and those in the vicinity thereof.

As depicted in FIG. 5, a pair of side frames 55 are provided with a spacing distance therebetween in the left-right direction 9. Each of the side frames 55 is integrally formed with a metal material. Each of the side frames 55 is provided with a side plate 55A which expands in the up-down direction 7 and the front-rear direction 8 and a bottom plate 55B which extends inwardly in the left-right direction 9 from a lower end of the side plate 55A (leftwardly in the case of the side frame 55 on the right side and rightwardly in the case of the side frame 55 on the left side). The bottom plate 55B supports the slide member 74.

Each of the side frames 55 is provided with a projection 36 and a projection 37. The projection 36 and the projection 37 extend outwardly in the left-right direction 9 from an upper end of the side plate 55A (rightwardly in the case of the side frame 55 on the right side and leftwardly in the case of the side frame 55 on the left side). The projection 36 is positioned in front of the projection 37.

Figure 10B:
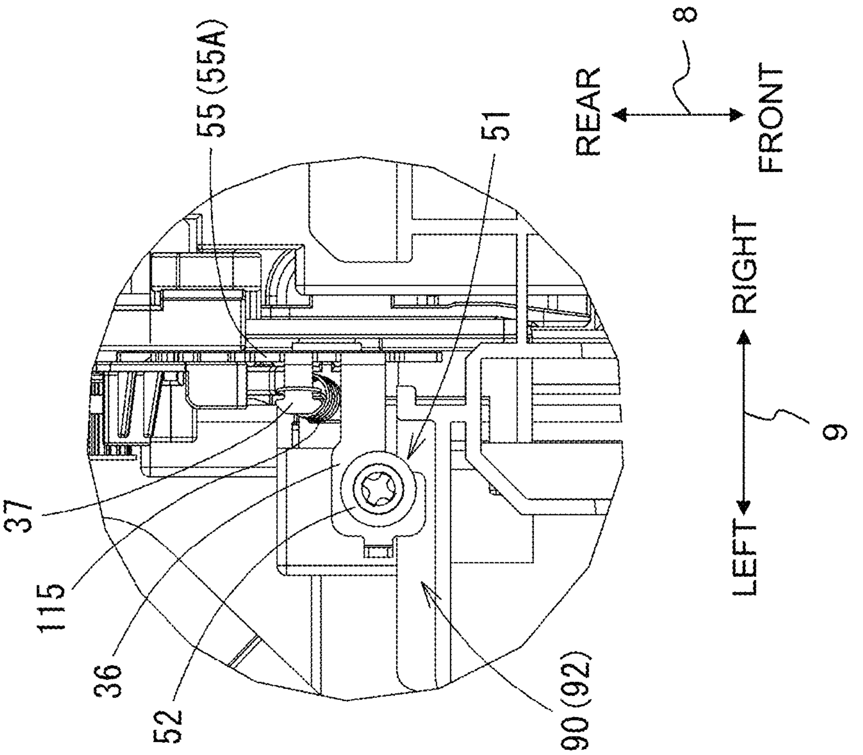
FIG. 10B depicts the side frame 55 as viewed from an upper position in order to depict the fixation between the side frame 55 and the base member 90.

The projection 36 has a cutout 51. As depicted in FIG. 10B, the base member 90 is positioned under or below the projection 36, and a screw hole (not depicted), which is formed in the base member 90, is positioned under or below the cutout 51. A screw 52 penetrates through the cutout 51 from thereabove, and the screw 52 is fastened to the screw hole. Accordingly, the side frame 55 is secured to the base member 90.

[Recording Part 24]

As depicted in FIG. 2, the recording part 24 is provided over or above the straight part 34. The recording part 24 is provided with a carriage 40 and a recording head 38 (example of a "head"). The platen 42 is provided at a position which is disposed under or below the recording part 24 and which is opposed to the recording part 24. The platen 42 is a member which supports the recording paper 12 conveyed through the straight part 34. The platen 42 will be explained in detail later on.

The carriage 40 is supported by two guide rails 56 which are arranged, with a spacing distance therebetween in the front-rear direction 8, so that the carriage 40 is reciprocatively movable in the left-right direction 9. The carriage 40 is moved by the driving force applied from a carriage motor 69 (see FIG. 27). Each of the two guide rails 56 is integrally formed with a metal material. The two guide rails 56 are supported by the side plates 55A of the pair of side frames 55 (see FIG. 3).

The recording head 38 is mounted on the carriage 40. Inks are supplied from ink cartridges 100 (see FIG. 1) to the recording head 38. A plurality of nozzles 39 are formed in the lower surface of the recording head 38. The plurality of nozzles 39, which are formed in the lower surface of the recording head 38, construct a plurality of nozzle arrays which are arranged side by side with a spacing distance therebetween in the left-right direction 9. Each of the plurality of nozzle arrays is constructed by a predetermined number (a plurality of) nozzles 39 which are aligned, with spacing distances therebetween, in the conveying orientation 15 (front-rear direction 8). In other words, the number of the nozzles 39 formed in the lower surface of the recording head 38 is a number obtained by multiplying the number of the nozzle arrays by the predetermined number. Note that FIG. 2 schematically depicts one nozzle array.

When the carriage 40 is moving in the left-right direction 9, the recording head 38 discharges ink droplets from the nozzles 39 toward the platen 42. Accordingly, the image is recorded on the recording paper 12 which is in the state of being supported by the platen 42.

The carriage 40 is movable to an opposing area 154 and retracted areas 155, 156 as depicted in FIG. 5. The retracted area 155 is an example of the first retracted area. The retracted area 156 is an example of the second retracted area.

The opposing area 154 is an area in which the carriage 40 is moved when the recording head 38 records the image on the recording paper 12. The opposing area 154 is an area which is opposed to the platen 42 in the up-down direction 7. In other words, the opposing area 154 is positioned over or above the platen 42 and the straight part 34 of the conveying passage 65. The opposing area 154 is the area which is disposed between the two slide members 74.

The retracted areas 155, 156 are areas which are disposed outside the slide members 74 in the left-right direction 9. The retracted area 155 is the area which is disposed rightwardly as compared with the slide member 74 on the right side), and the retracted area 156 is the area which is disposed leftwardly as compared with the slide member 74 on the left side).

A maintenance mechanism is arranged in the retracted area 155. The maintenance mechanism is provided with, for example, a cap which is movable upwardly/downwardly and which covers the nozzles 39 of the recording head 38, and a waste liquid storage part which is connected to the cap via a tube, etc. The maintenance for the recording head 38 includes, for example, a blank discharge of the ink. When the maintenance is executed, the carriage 40 is moved to the retracted area 155. The cap is moved upwardly to cover the nozzles 39. The inks are discharged from the nozzles 39. The discharged inks flow to the waste liquid storage part via the tube. Note that the maintenance mechanism may be arranged in the retracted area 156.

[Conveying Roller Pair 59 and Discharge Roller Pair 44]

As depicted in FIG. 2, the conveying roller pair 59 is arranged upstream in the conveying orientation from a support surface of the platen 42 and the recording head 38 in the straight part 34 of the conveying passage 65 (backwardly from the recording head 38).

The conveying roller pair 59 is provided with a conveying roller 60 (example of a "roller") which is arranged under or below the straight part 34 and a pinch roller 61 which is arranged over or above the straight part 34 while being opposed to the conveying roller 60 and which follows the conveying roller 60.

As depicted in FIG. 5, the conveying roller 60 is a columnar member which extends in the left-right direction 9. The conveying roller 60 is rotatably supported by the side plates 55A of the pair of side frames 55 by the aid of bearings 71. In this embodiment, each of the bearings 71 is fitted to a cutout which is formed on the side plate 55A, and the conveying roller 60 is inserted into the bearings 71.

The pinch roller 61 depicted in FIG. 2 is rotatably supported by roller holders 85 depicted in FIGS. 5 and 11. As depicted in FIG. 5, coil springs 57 are provided over or above the roller holders 85. Lower ends of the coil springs 57 are connected to the roller holders 85, and upper ends of the coil springs 57 are connected to a lower surface of the guide rail depicted in FIG. 3. Accordingly, the roller holders 85 are supported by the guide rail 56 by the aid of the coil springs 57. The roller holders 85 are biased downwardly by the coil springs 57. Accordingly, the pinch roller 61, which is supported by the roller holders 85, is biased by the conveying roller 60. Each of the roller holders 85 is provided with a projected part 88 which is provided at a back portion thereof and which extends upwardly. A forward end of the projected part 88 is placed or put on the guide rail 56 and the forward end is supported thereby (see FIGS. 3 and 11). Accordingly, the attitude of each of the roller holders 85 is stabilized. Each of the roller holders 85 has a through-hole 86 which penetrates through the roller holder 85 in the left-right direction 9. A shaft 87 is inserted into the through-holes 86.

The conveying roller pair 59 can undergo a state change to the nipping state and the separated state. When any external force is not applied to the shaft 87, the pinch roller 61 makes contact with the conveying roller 60 by being biased by the coil spring 57. In this situation, the conveying roller pair 59 is in the nipping state. When the shaft 87 is moved upwardly by being guided by the projection 106 of the slide member 74, the pinch roller 61 is separated from the conveying roller 60 against the urging force of the coil spring 57 (see FIG. 19). In this situation, the conveying roller pair 59 is in the separated state.

As depicted in FIG. 2, the discharge roller pair 44 is arranged downstream in the conveying orientation from the support surface of the platen 42 and the recording head 38 in the straight part 34 (in front of the recording head 38).

The discharge roller pair 44 is provided with a discharge roller 62 which is arranged under or below the straight part 34 and a spur 63 which is arranged opposingly to the discharge roller 62 at a location over or above the straight part 34 and which follows the discharge roller 62.

As depicted in FIG. 5, the discharge roller 62 is provided with a shaft 64 which extends in the left-right direction 9 and a roller part 58 which covers the outer circumference of the shaft 64. A plurality of pieces of the roller part 58 are provided with spacing distances therebetween in the left-right direction 9. The shaft 64 of the discharge roller 62 is rotatably supported by the side plates 55A of the pair of side frames 55 by the aid of bearings 72. In this embodiment, the bearing 72 is fitted to a cutout formed on each of the side plates 55A, and the shaft 64 is inserted into the bearing 72.

The spur 63 depicted in FIG. 2 is provided as a plurality of spurs 63, with spacing distances therebetween in the left-right direction 9. The respective spurs 63 are provided at positions opposed to the roller parts 58, respectively, in the left-right direction 9. Each of the spurs 63 is biased against one of the roller parts 58 by an unillustrated elastic member (for example, a coil spring).

The conveying roller 60 and the discharge roller 62 are rotated by the driving force transmitted from a conveying motor 73 (see FIG. 5). When the conveying roller 60 is rotated in a state (nipping state) in which the recording paper 12 is nipped by the conveying roller pair 59, the recording paper 12 is conveyed in the conveying orientation 15 by the conveying roller pair 59. Further, when the discharge roller 62 is rotated in the state in which the recording paper 12 is nipped by the discharge roller pair 44, the recording paper 12 is conveyed in the conveying orientation 15 by the discharge roller pair 44.

[Contact Member 41]

As depicted in FIG. 2, the contact member 41 is positioned upstream in the conveying orientation 15 from the nozzles 39 of the recording part 24 in the conveying passage 65.

As depicted in FIG. 5, the contact member 41 is provided with a plurality of extending parts 81 and one main body part 82. The main body part 82 extends in the left-right direction 9. The main body part 82 is attached to the guide rail 56 (see FIG. 3) by being fitted thereto from therebelow (from the lower position). The plurality of extending parts 81 extend frontwardly and downwardly from the main body part 82, with spacing distances therebetween in the left-right direction 9.

In this embodiment, the contact member 41 is an integrally formed or molded product containing, as a main component thereof, a resin such as polyacetal (POM), etc. Note that it is also allowable that the contact member 41 is not the integrally formed product. For example, the contact member 41 may be composed of a plurality of extending parts 81 without including the main body part 82, and the respective extending parts 81 may be attached to the guide rail 56.

As depicted in FIG. 2, each of the extending parts 81 extends up to the vicinity of the nozzles 39 in the conveying orientation 15. A forward end of each of the extending parts 81 is positioned under or below the nipping position at which the recording paper 12 is nipped by the conveying roller pair 59 (position at which the conveying roller 60 and the pinch roller 61 are brought in contact).

[Platen 42]

As depicted in FIG. 2, the platen 42 is positioned at a position which is disposed under or below the recording part 24 and which is opposed to the recording part 24. The platen 42 is a member which supports the recording paper 12 conveyed through the straight part 34 by the conveying roller pair 59.

Figure 6:
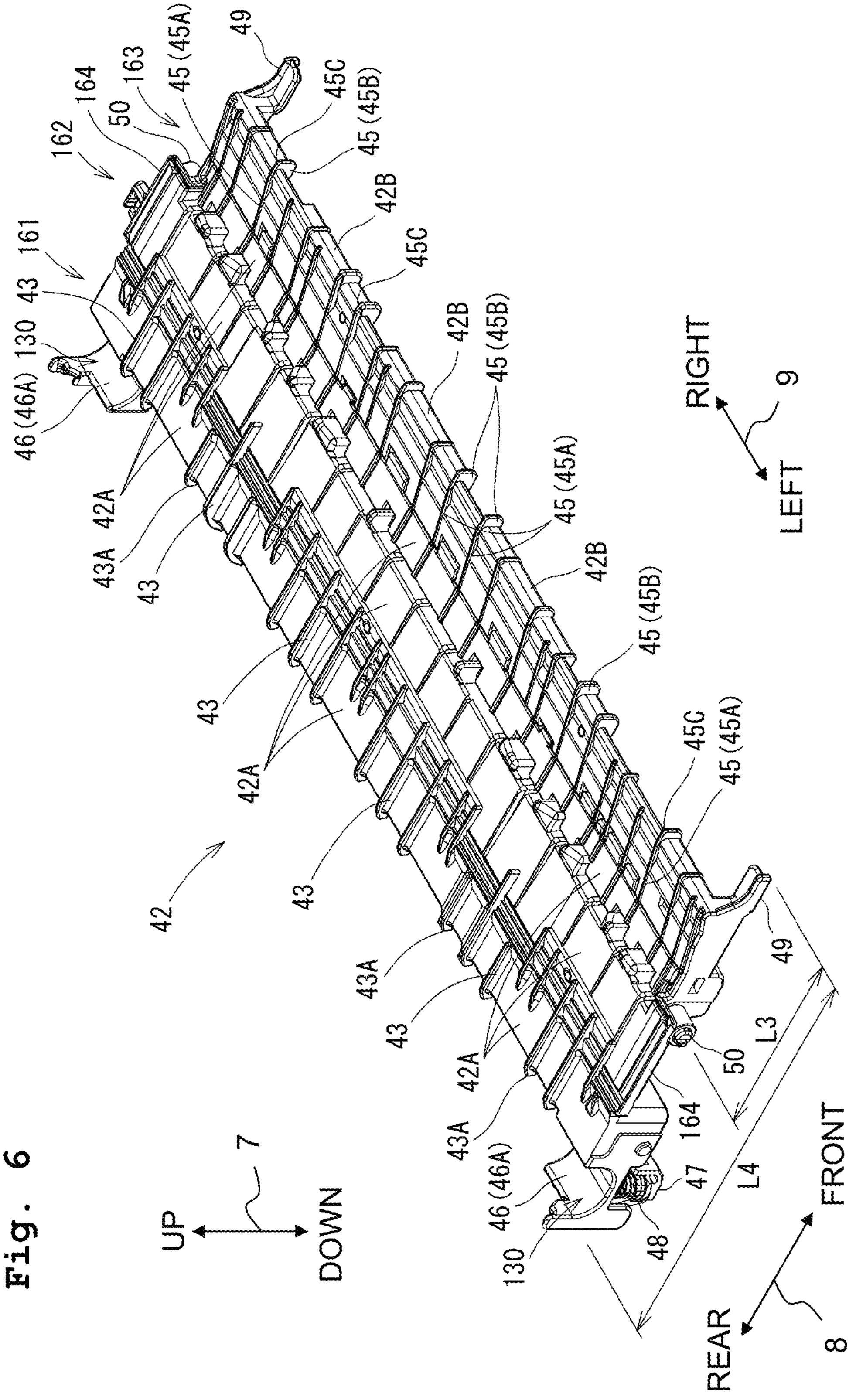
FIG. 6 is a perspective view depicting a platen 42 as viewed from an upper position.

As depicted in FIG. 6, the platen 42 is a generally plate-shaped member. The platen 42 is composed of a back part 161, a central part 162, and a front part 163. The back part 161 constitutes a back portion of the platen 42. The central part 162 is continued to a front end of the back part 161, and the central part 162 constitutes a central portion in the front-rear direction 8 of the platen 42. The front part 163 is continued to a front end of the central part 162, and the front part 163 constitutes a front portion of the platen 42.

The central part 162 is positioned between most upstream nozzles 39A in the conveying orientation 15 (see FIG. 2) and most downstream nozzles 39B in the conveying orientation 15 (see FIG. 2) which are included in the nozzles 39 constructing the nozzle arrays.

The back part 161 is positioned at the back of (upstream in the conveying orientation 15 from) the central part 162.

At least a part of the back part 161 is positioned in front of (downstream in the conveying orientation 15 from) the nozzles 39A. The front part 163 is positioned in front of the central part 162. At least a part of the front part 163 is positioned at the back of the nozzles 39B.

A plurality of ribs 43 and a plurality of ribs 45 are formed on the upper surface 42A of the platen 42.

The plurality of ribs 43 are formed to range from the back part 161 to the back portion of the central part 162. The respective ribs 43 extend in the conveying orientation 15 (front-rear direction 8). The respective ribs 43 are provided, with spacing distances therebetween in the left-right direction 9.

Figure 7:
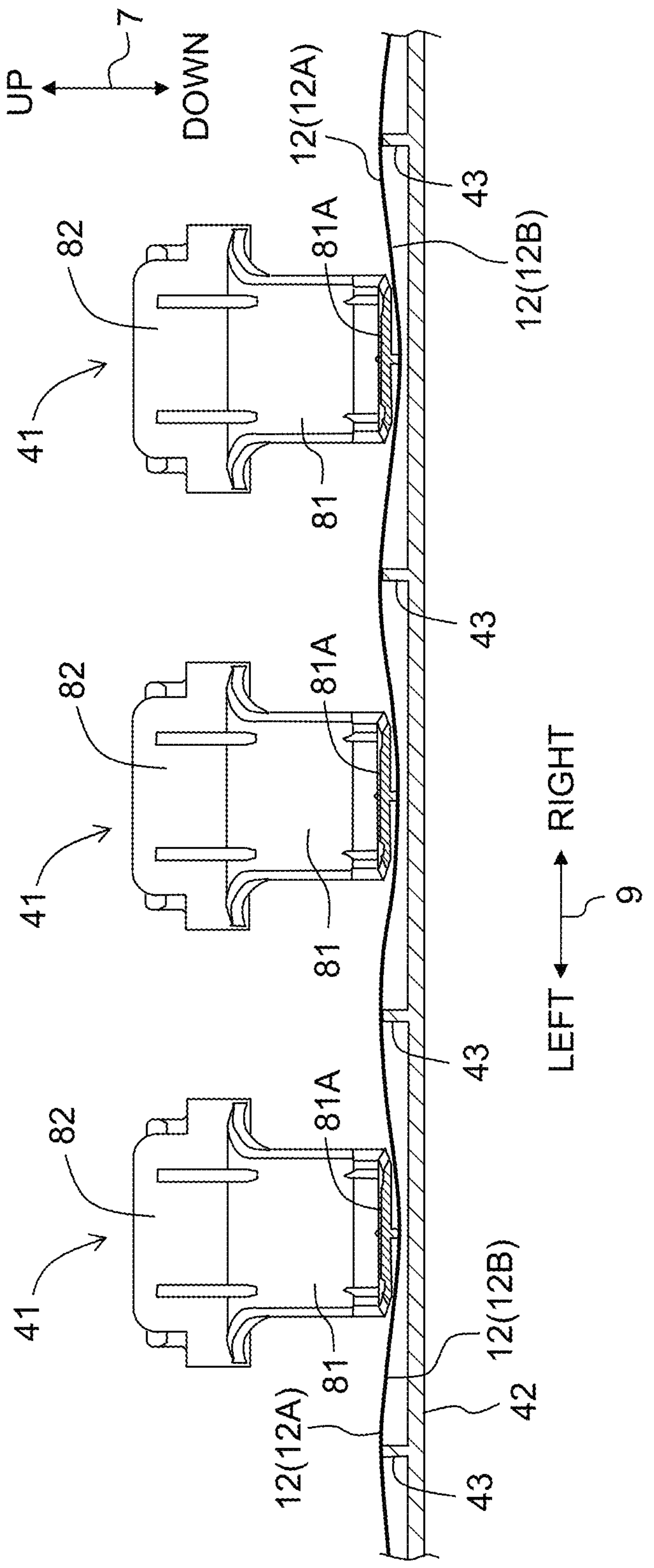
FIG. 7 is a schematic sectional view depicting a contact member 41, the platen 42, and recording paper 12.

As depicted in FIG. 7, the upper end of each of the ribs 43 is positioned over or above a forward end part 81A of each of the extending parts 81 of the contact member 41. The forward end part 81A makes contact with an upper surface 12A of the conveyed recording paper 12 between the conveying roller pair 59 and the nozzles 39 in the straight part 34. Further, the upper surface of each of the ribs 43 makes contact with a lower surface 12B of the conveyed recording paper 12 between the conveying roller pair 59 and the nozzles 39 in the straight part 34. The recording paper 12 has a wavy or wave-like shape continued in the left-right direction 9 by making contact with the forward end parts 81A of the extending parts 81 from thereabove and making contact with the ribs 43 from therebelow.

As depicted in FIG. 6, the plurality of ribs 45 are formed at the front part 163. The respective ribs 45 are provided, with spacing distances therebetween in the left-right direction 9. Each of the ribs 45 is composed of an upper part 45A and a side part 45B. The upper part 45A extends in the conveying orientation 15 (frontward orientation) on the upper surface 42A of the front part 163 up to a front end of the upper surface 42A of the front part 163. The side part 45B is continued to a downstream end (front end of the upper part 45A) in the conveying orientation 15 of the upper part 45A. The side part 45B extends downwardly in the up-down direction 7 on the front side surface 42B of the front part 163. An upper surface of the rib 45 (in particular, an upper surface of the upper part 45A of the rib 45) makes contact with the lower surface 12B of the conveyed recording paper 12. The upper surfaces of the ribs 43, 45 form or correspond to a "support surface", in the platen 42, which supports the recording paper 12 on the platen 42. In other words, in this embodiment, there is a plurality of pieces of the support surface which supports the recording paper 12. A back end part 43A of the upper surface of the rib 43 corresponds to an end portion in the first orientation of the support surface. A front end part 45C of the upper surface of the rib 45 corresponds to an end portion in the second orientation of the support surface.

As depicted in FIG. 11, when the platen 42 is located at the printing position (to be described later on), a lower end of the side part 45B is positioned over or above a lower end of the shaft 64 of the discharge roller 62.

As depicted in FIG. 6, the platen 42 has projected parts 49 (example of a "contact part") which protrude frontwardly from both of left and right end portions of the front side surface 42B.

The platen 42 has projected parts 46 which project or protrude backwardly from both of left and right end portions of the back part 161. Upper surfaces 46A of the projected parts 46 are each recessed downwardly while being curved in a circular arc-shaped form. In other words, recesses 130 are formed by the upper surfaces 46A.

The recesses 130, which are formed by the upper surfaces 46A of the projected parts 46, are arranged side by side in the left-right direction 9 with the cutouts of the side plates 55A of the side frames 55 to which the bearings 71 (see FIG. 3) are fitted. Specifically, a projected part 46, which is included in the projected parts 46 and which protrudes from the right end portion of the platen 42, is arranged side by side to the left position of the side plate 55A of the side frame 55 on the right side, and a projected part 46, which is included in the projected parts 46 and which protrudes from the left end portion of the platen 42, is arranged side by side to the right position of the side plate 55A of the side frame 55 on the left side. In other words, the projected parts 46 are positioned on the inner sides of the side plates 55A of the pair of side frames 55 in the left-right direction 9. As for the bearing 71, the outer portion thereof in the left-right direction 9 is fitted to the cutout of the side plate 55A of the side frame 55, and the inner portion thereof in the left-right direction 9 is fitted to the recess formed by the upper surface 46A of the projected part 46. In other words, the upper surface 46A makes contact with the bearing 71 along with the circumferential direction of the shaft of the conveying roller 60. Note that the upper surface 46A may make contact with the shaft of the conveying roller 60 and the side plate 55A of the side frame 55 along with the circumferential direction of the shaft of the conveying roller 60, rather than making contact with the bearing 71.

Accordingly, the platen 42 is rotatable about the bearings 71. In other words, the platen 42 is rotatable about the shaft or axis of the conveying roller 60. The platen 42 is rotatable between a printing position depicted in FIGS. 11 and 13 and a release position depicted in FIGS. 20 and 22.

The printing position is a position of the platen 42 at which the recording part 24 records the image on the recording paper 12. As depicted in FIG. 2, when the platen 42 is located at the printing position, then the upper surface 42A of the platen 42 generally expands in the front-rear direction 8 and the left-right direction 9, and the upper surface 42A of the platen 42 is opposed to the recording head 38.

Figure 20:
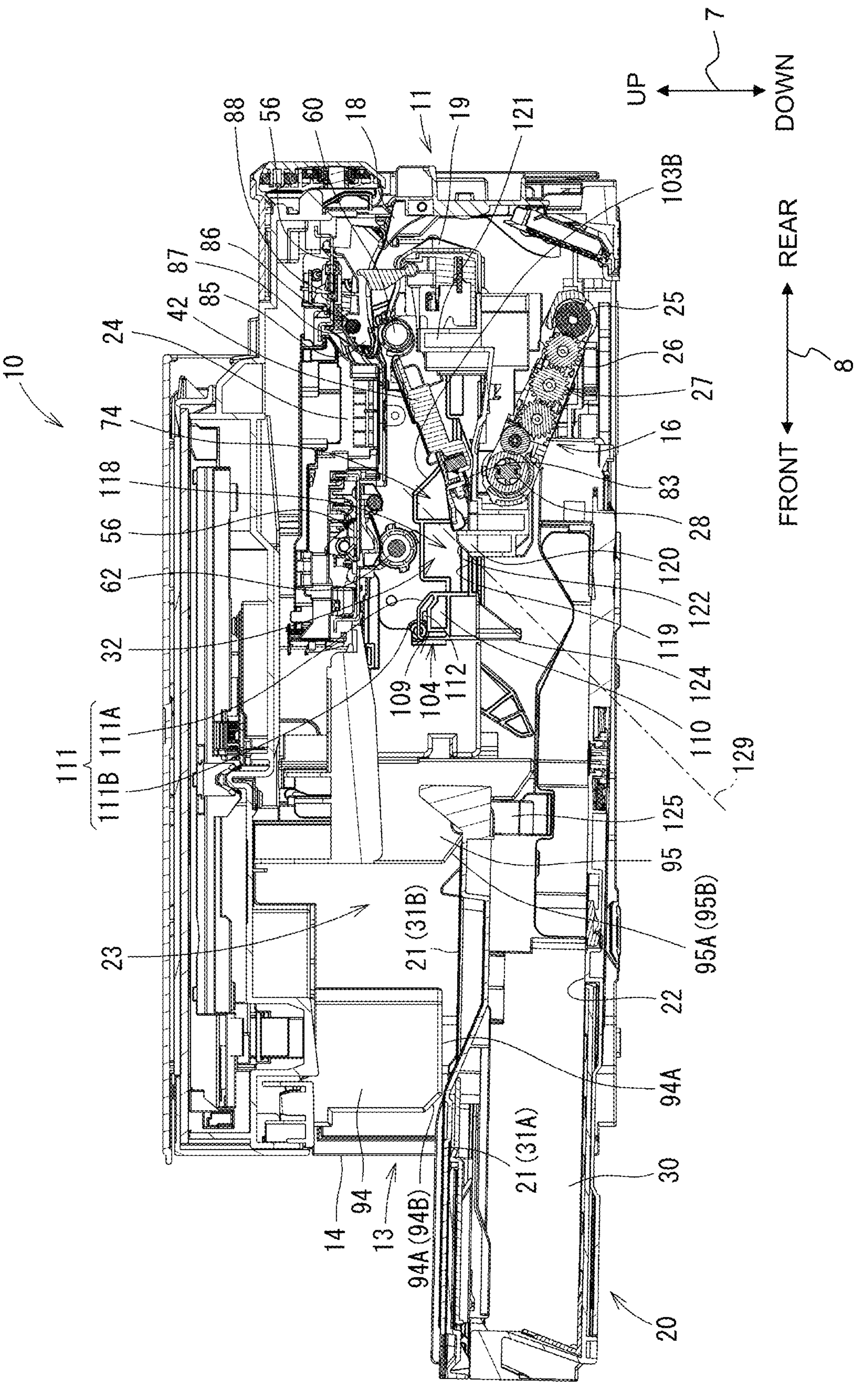
FIG. 20 is a vertical sectional view taken along the center in the left-right direction 9 of the printer part 11 in a case that the slide member 74 is located at a front position.
Figure 22:
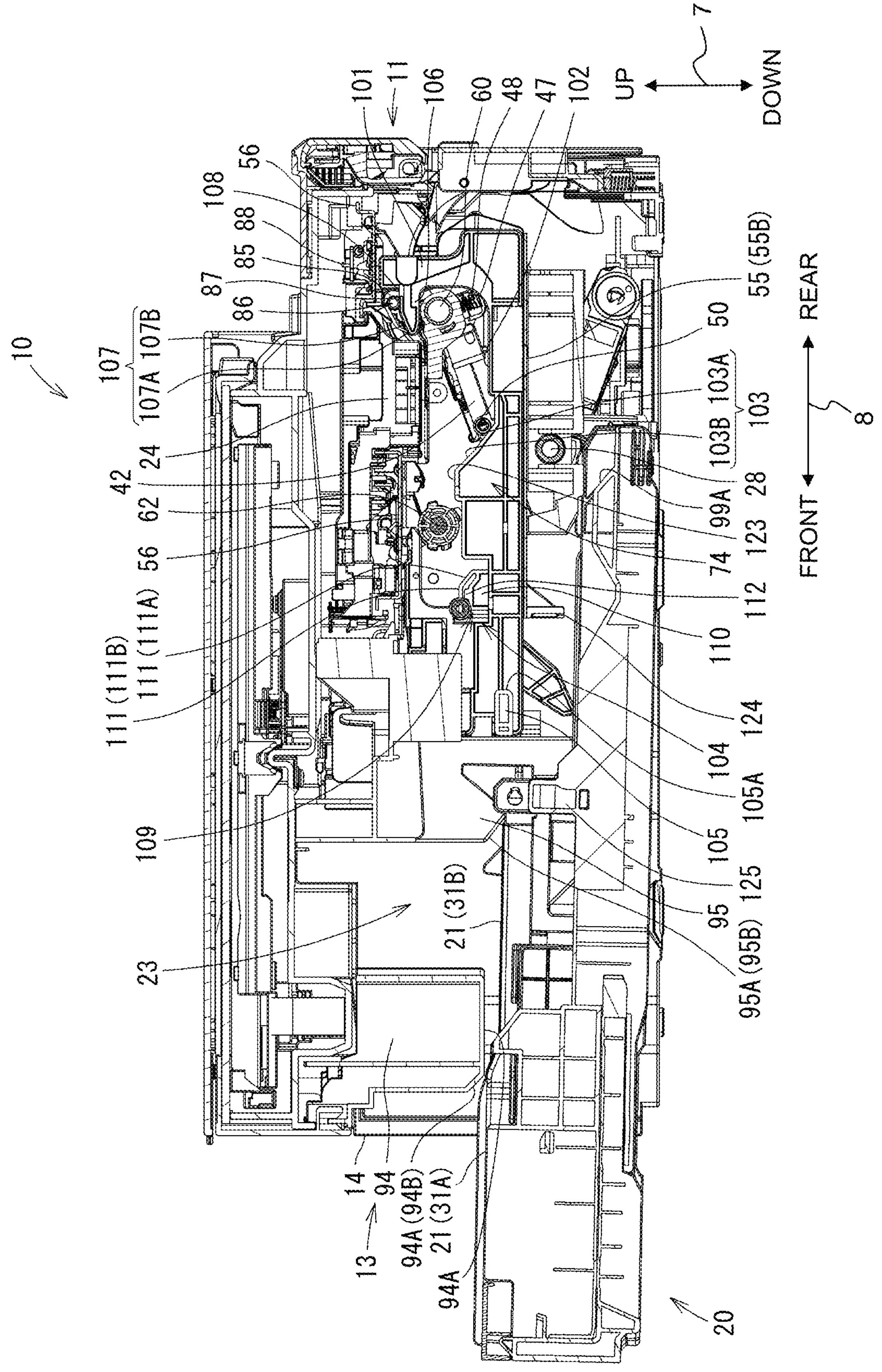
FIG. 22 is a vertical sectional view depicting the printer part 11 at a position at which the right side surface of the platen 42 is viewed when the slide member 74 is located at the front position.

The release position is a position of the platen 42 to be provided when the recording paper 12, which is jammed in the space between the recording part 24 and the platen 42, is taken out to the outside of the casing 14. As depicted in FIGS. 20 and 22, when the platen 42 is located at the release position, a front end portion of the platen 42 is positioned downwardly as compared with when the platen 42 is located at the printing position. In this situation, the support surface of the platen 42 for supporting the recording paper 12 is positioned downwardly as compared with when the platen 42 is located at the printing position. Accordingly, as depicted in FIG. 20, a gap 32 is generated between the front end portion of the platen 42 and the discharge roller pair 44. Accordingly, the space between the recording part 24 and the platen 42, which is included in the straight part 34, is communicated with the internal space 23 via the gap 32.

As depicted in FIG. 6, a contact piece 47 is provided at a location under or below the projected part 46. The contact piece 47 is attached to the projected part 46 with a coil spring 48 intervening therebetween. One end of the coil spring 48 is connected to a lower surface of the projected part 46, and the other end of the coil spring 48 is connected to the contact piece 47.

Figure 13:
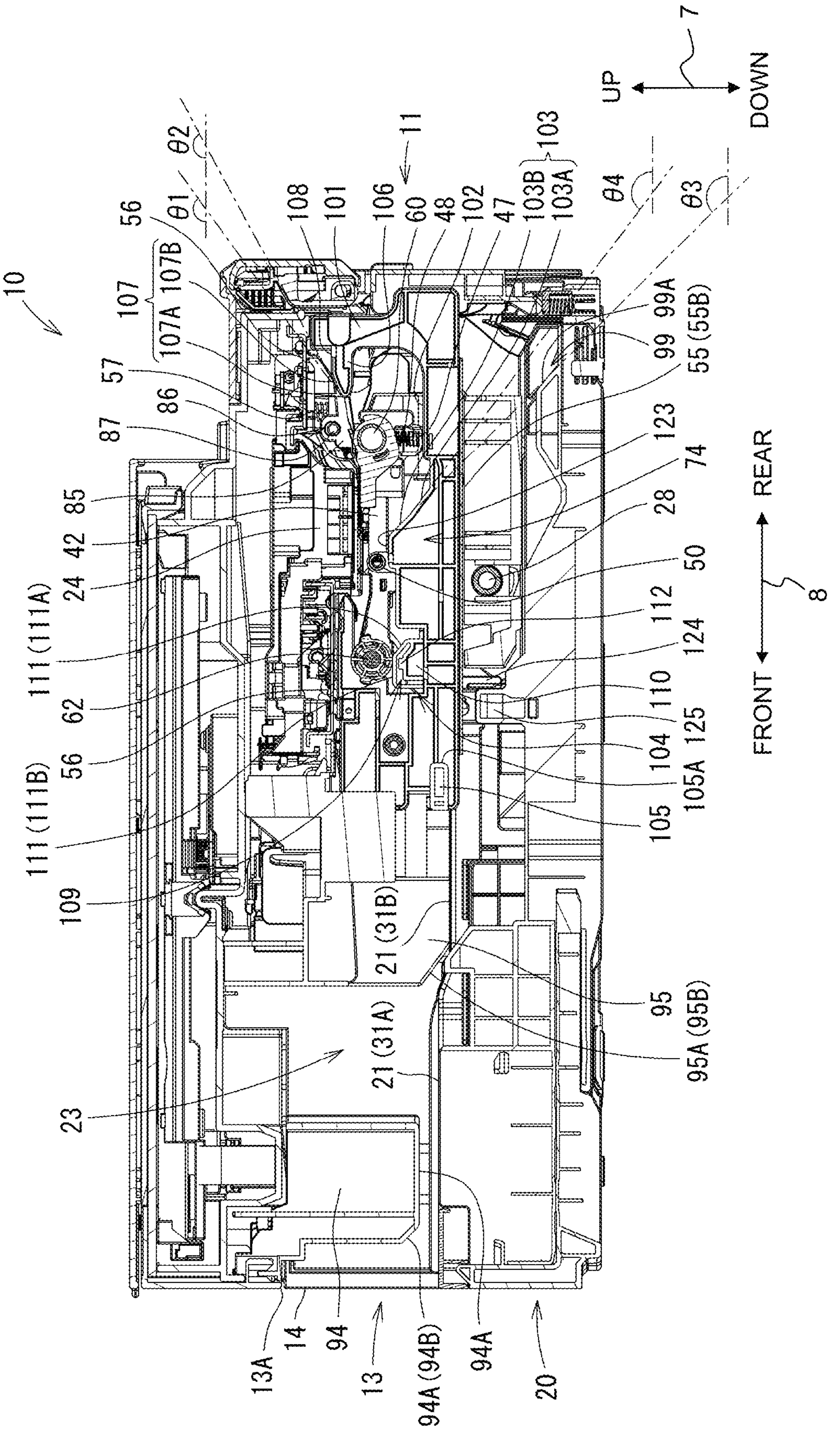
FIG. 13 is a vertical sectional view depicting the printer part 11 at a position at which a right side surface of the platen 42 can be seen in the state that the feed tray 20 is installed.

As depicted in FIG. 13, the contact piece 47 is supported by making contact with a support surface 102 of the slide member 74 from therebelow. Further, as depicted in FIG. 11, the projected part 49 is supported by a protrusion 104 of the slide member 74 from therebelow. Accordingly, the platen 42, which is located at the printing position, is supported by the slide member 74.

Figure 19:
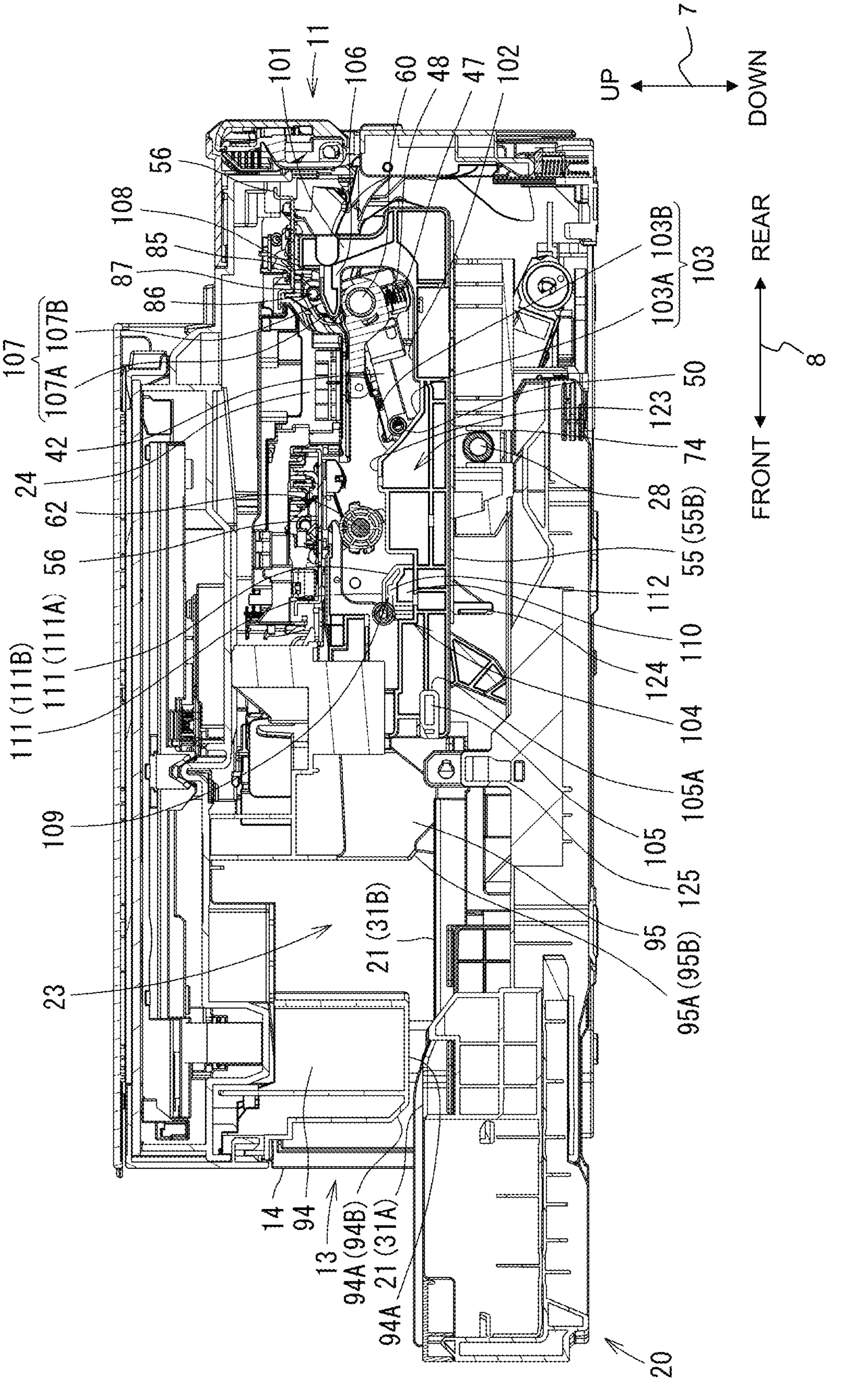
FIG. 19 is a vertical sectional view depicting the printer part 11 at a position at which the right side surface of the platen 42 can be seen in the state that the conveying roller pair 59 is changed to be in the separated state.

As depicted in FIG. 6, the platen 42 has projections 50 which project or protrude in the left-right direction 9 from a right side surface and a left side surface of the central part 162. As depicted in FIG. 19, the projections 50 are guided by making contact with inclined surfaces 103 (example of a "second guide part") of the slide members 74, and thus the platen 42 is rotated.

As depicted in FIG. 6, the projections 50 are provided on the central part 162 not on the back part 161 and the front part 163. In other words, the projections 50 are provided at the central portion of the platen 42 in the front-rear direction 8. In this embodiment, a length L3, which ranges in the front-rear direction 8 from the front end of the platen 42 to the projection 50, is not less than ¼ of a length L4 which ranges in the front-rear direction 8 from the front end to the back end of the platen 42.

The central part 162 of the platen 42 has protrusions 164 which protrude in the left-right direction 9 from the upper end portions of the right side surface and the left side surface. Upper surfaces of the protrusions 164 constitute parts of the upper surface 42A of the platen 42. The projections 50 are positioned under or below the protrusions 164. In other words, the protrusions 164 cover upper portions of the projections 50. In other words, the upper surfaces 42A of the protrusions 164 of the platen 42 are positioned over or above the projections 50, and the upper surfaces 42A cover the upper portions of the projections 50.

The dimension or size in the left-right direction 9 of the central part 162 is longer by the dimensions or sizes of the protrusions 164 than the dimension or size in the left-right direction 9 of the front part 163.

Figure 8:
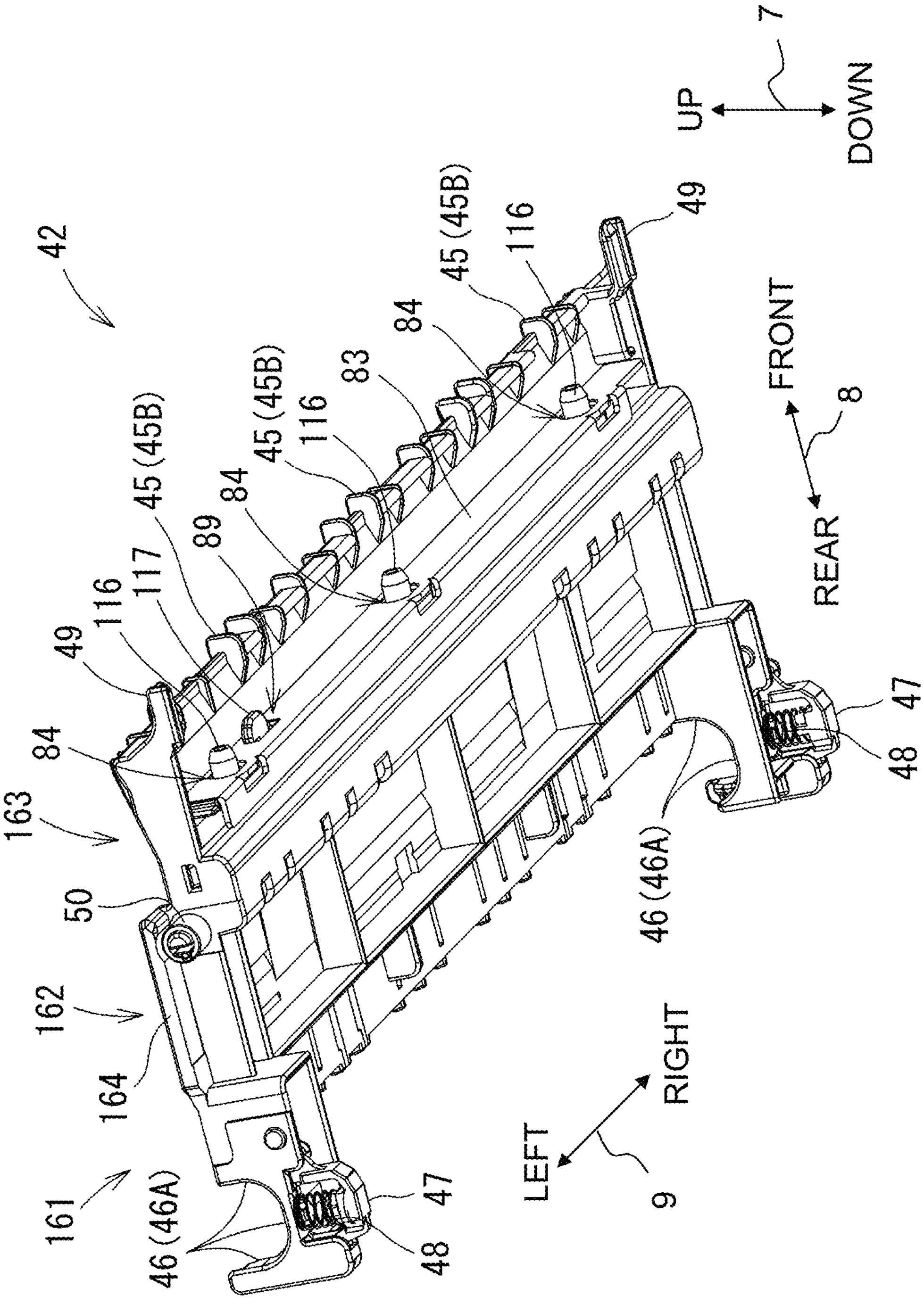
FIG. 8 is a perspective view depicting the platen 42 as viewed from a lower position.

As depicted in FIG. 8, the platen 42 is provided with a plate member 83 which is composed of a metal such as iron, etc. In this embodiment, the plate member 83 is bent, and the plate member 83 has holes 84, 89. The platen 42 has, on the lower surface, projections 116 and a projection 117 which project or protrude frontwardly. The projections 116 are inserted into the holes 84, and the projection 117 is inserted into the hole 89. Thus, the plate member 83 is attached to the platen 42. The plate member 83 is positioned on the front side as compared with the center in the front-rear direction 8 of the platen 42. In other words, the plate member 83 is attached to a position nearer to a downstream end in the conveying orientation 15 of the platen 42 as compared with an upstream end in the conveying orientation 15 of the platen 42.

As depicted in FIG. 20, when the platen 42 is located at the release position, a part of the front end portion of the platen 42 enters the recess 118 of the base member 90. In this situation, the platen 42 is supported by the surface 119 of the base member 90. In this embodiment, the plate member 83, which is attached to the platen 42, makes contact with the surface 119 from thereabove. Thus, the plate member 83 is supported by the surface 119. Accordingly, the platen 42 is supported by the base member 90.

Note that in this embodiment, the plate member 83 is supported by the surface 119 over the range ranging from the left end to the right end thereof, i.e., over the entire range in the left-right direction 9 thereof. However, it is sufficient, regarding the plate member 83, that at least a central portion in the left-right direction 9 of the plate member 83 is supported by the surface 119. Further, it is also allowable that any portion of the platen 42 other than the plate member 83 is supported by the surface 119.

As depicted in FIG. 20, when the platen 42 is located at the release position, a virtual plane 129, which includes the inclined surface 122 of the wall 120, is positioned over or above the platen 42. In other words, when the platen 42 is located at the release position, the virtual plane 129, which includes the inclined surface 122 of the wall 120, covers the platen 42 from the upper position.

The platen 42 is positioned under or below the upper end 13A of the opening 13 (see FIG. 11) and the platen 42 is positioned over or above the lower end 13B of the opening 13 (see FIG. 11), regardless of the position of the platen 42.

[Interlocking Mechanism]

The interlocking mechanism is such a mechanism which causes the platen 42 to rotate from the printing position to the release position while being interlocked with withdrawal or removal of the feed tray 20 from the casing 14 (movement of the feed tray 20 toward the front), and which causes the platen 42 to rotate from the release position to the printing position while being interlocked with the insertion of the feed tray 20 into the casing 14 (movement of the feed tray 20 toward the back). As depicted in FIGS. 5, 12, and 13, the interlocking mechanism is provided with the slide members 74, the levers 75, and the coil springs 115.

[Slide Member 74]

As depicted in FIG. 5, the slide members 74 are supported slidably in the front-rear direction 8 by the bottom plates 55B of the pair of side frames 55. In other words, two pieces of the slide member 74 are provided, which are positioned inside the side plates 55A in the left-right direction 9. That is, the slide members 74 are provided on the left side of the side frame 55 on the right side and on the right side of the side frame 55 on the left side. The slide members 74 are adjacent to the side plates 55A of the pair of side frames 55.

Each of the slide members 74 slides between a back position depicted in FIG. 13 (example of a "first position") and a front position depicted in FIG. 22 (example of a "second position").

As described later on, each of the slide members 74 slide from the back position to the front position while being interlocked with the withdrawal of the feed tray 20 from the casing 14, and the slide members 74 slide from the front position to the back position while being interlocked with the insertion of the feed tray 20 into the casing 14. Further, the platen 42 is rotated from the printing position to the release position while being interlocked with the slide (sliding movement) of the slide members 74 from the back position to the front position, and the platen 42 is rotated from the release position to the printing position while being interlocked with the slide (sliding movement) of the slide members 74 from the front position to the back position.

As depicted in FIGS. 5 and 13, each of the slide members 74 is provided with a protrusion 101, the support surface 102, the inclined surface 103, a horizontal surface 123, the protrusion 104, a protrusion 105, and the protrusion 124.

As depicted in FIG. 13, the protrusion 101 protrudes upwardly from a back end portion of the slide member 74. The projection 106, which protrudes frontwardly, is provided at an upper end portion of the protrusion 101. An upper surface of the projection 106 is composed of an inclined surface 107 and a horizontal surface 108. The inclined surface 107 is positioned on the side of a forward end of the projection 106, and the inclined surface 107 is inclined downwardly further toward closely to the front (forward end of the projection 106). The horizontal surface 108 is positioned on the side of a proximal end of the projection 106, and the horizontal surface 108 is continued to a back end of the inclined surface 107. The horizontal surface 108 is a surface which expands in the front-rear direction 8 and the left-right direction 9.

The inclined surface 107 is provided with a forward end side inclined surface 107A and a proximal end side inclined surface 107B. The forward end side inclined surface 107A is positioned frontwardly as compared with the proximal end side inclined surface 107B, and the forward end side inclined surface 107A is continued to a front end of the proximal end side inclined surface 107B. In other words, the forward end side inclined surface 107A is positioned in front of and under or below the proximal end side inclined surface 107B. An angle of inclination θ1 of an obtuse angle of the forward end side inclined surface 107A with respect to a horizontal plane (plane expanding in the front-rear direction 8 and the left-right direction 9) is smaller than an angle of inclination θ2 of an obtuse angle of the proximal end side inclined surface 107B with respect to the horizontal plane. In other words, the forward end side inclined surface 107A is inclined sharply with respect to the horizontal plane as compared with the proximal end side inclined surface 107B. Note that in this embodiment, the upper surface 42A of the platen 42 and the support surface 102 are surfaces parallel to the horizontal plane.

When each of the slide members 74 is located at the back position depicted in FIG. 13, the projection 106 is positioned at the back of the shaft 87. The inclined surface 107 makes contact with the shaft 87 to guide the shaft 87 in a sliding process of the slide member 74 from the back position to the front position. When the slide member 74 is located at the front position depicted in FIG. 22, the horizontal surface 108 supports the shaft 87. When the slide member 74 is located at the front position, the upper surface of the projection 106 (inclined surface 107 and horizontal surface 108) is positioned just over the bearing 71 of the conveying roller 60 (see FIG. 5).

The projection 106 is overlapped with the retracted area in the left-right direction 9. In other words, the projection 106 is overlapped in the left-right direction 9 with a positionable space in which the movable carriage 40 is positionable. Further, an upper end of the projection 106 is positioned over or above a lower end of the carriage 40. In other words, the projection 106 is overlapped in the up-down direction 7 with the positionable space. On the other hand, the projection 106 is positioned at the back of the carriage 40, regardless of a slide position of the slide member 74. Therefore, the projection 106 is not overlapped in the front-rear direction 8 with the positionable space. According to the above, the projection 106 is overlapped in the left-right direction 9 and in the up-down direction 7 with the positionable space, but the projection 106 is located at the position at which the projection 106 is offset backwardly from the positionable space in the front-rear direction 8. Therefore, the projection 106 is located at the position which is different from the positionable space in which the movable carriage 40 is positionable, regardless of the position of the slide member 74.

As depicted in FIG. 13, the support surface 102 is positioned in front of the protrusion 101. The support surface 102 is a surface which expands in the front-rear direction 8 and the left-right direction 9. The support surface 102 supports the contact piece 47 of the platen 42 from therebelow, regardless of the position of the slide member 74.

As depicted in FIGS. 5 and 13, the inclined surface 103 is positioned in front of the support surface 102. The inclined surface 103 is inclined upwardly further toward closely to the front.

The inclined surface 103 is provided with a lower inclined surface 103A and an upper inclined surface 103B. The upper inclined surface 103B is positioned in front of the lower inclined surface 103A, and the upper inclined surface 103B is continued to a front end of the lower inclined surface 103A. In other words, the upper inclined surface 103B is positioned in front of and over or above the lower inclined surface 103A. An angle of inclination θ3 of an obtuse angle of the upper inclined surface 103B with respect to a horizontal plane (plane expanding in the front-rear direction 8 and the left-right direction 9) is smaller than an angle of inclination θ4 of an obtuse angle of the lower inclined surface 103A with respect to the horizontal plane. In other words, the upper inclined surface 103B is inclined sharply with respect to the horizontal plane as compared with the lower inclined surface 103A. Note that in this embodiment, the upper surface 42A of the platen 42 and the support surface 102 are surfaces parallel to the horizontal plane.

When the slide member 74 is located at the back position depicted in FIG. 13, the inclined surface 103 is positioned at the back of the projection 50 of the platen 42. As depicted in FIG. 19, the inclined surface 103 makes contact with the projection 50 to guide the projection 50 in the sliding process of the slide member 74 from the back position to the front position. Accordingly, the platen 42 is rotated from the printing position (see FIG. 11) to the release position (see FIG. 20).

Figure 16:
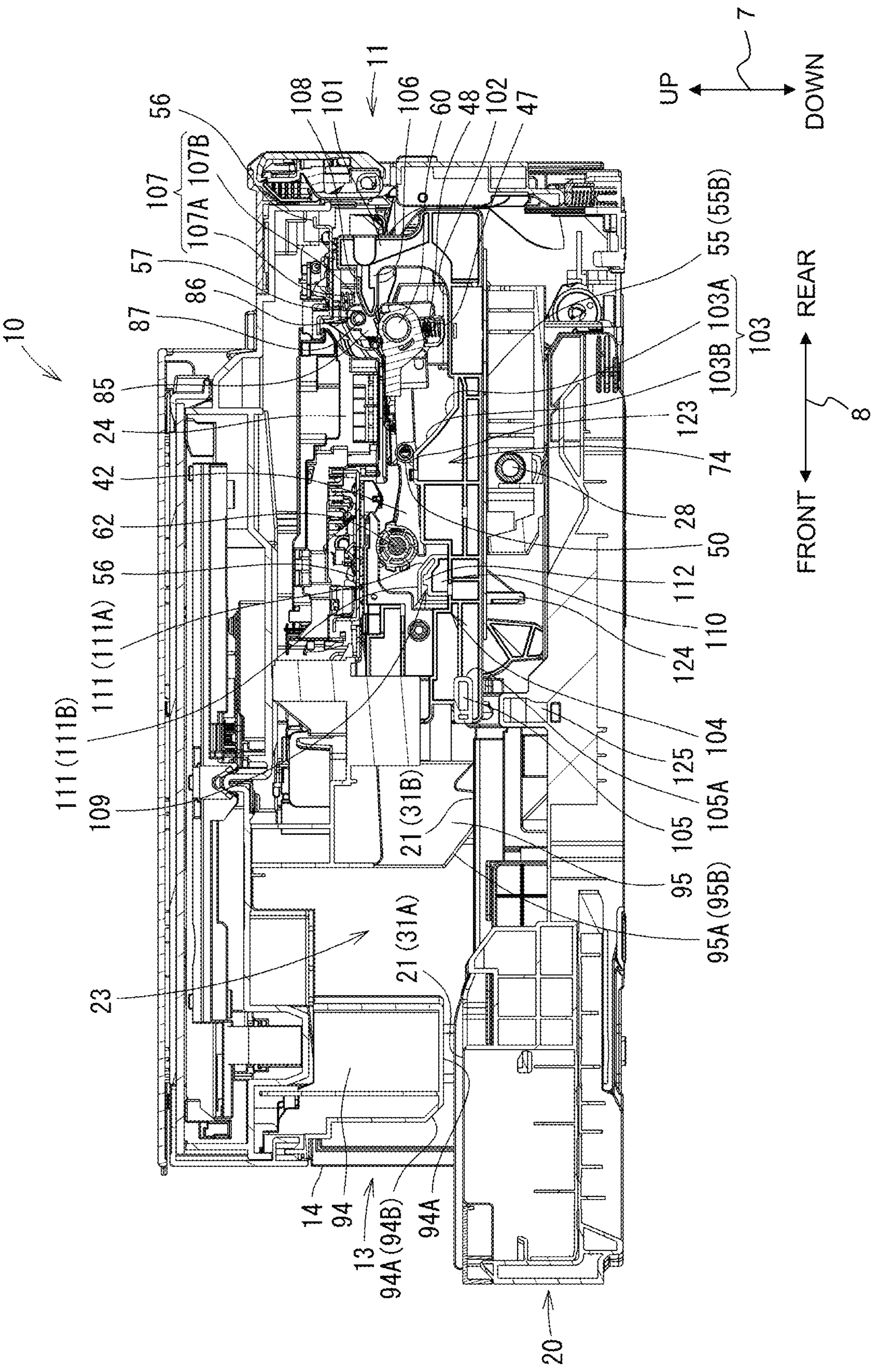
FIG. 16 is a vertical sectional view depicting the printer part 11 at a position at which the right side surface of the platen 42 is viewed in a case that the feed tray 20 makes contact with the lever 75 from therebehind.

As depicted in FIGS. 5 and 13, the horizontal surface 123 extends frontwardly from a front end of the upper inclined surface 103B of the inclined surface 103. When the slide member 74 is located at the back position depicted in FIG. 13, then the horizontal surface 123 is positioned under or below the projection 50 of the platen 42, and the horizontal plane 123 is separated from the projection 50. As depicted in FIG. 16, the horizontal surface 123 makes contact with the projection 50 to guide the projection 50 toward the inclined surface 103 in the sliding process of the slide member 74 from the back position to the front position.

As depicted in FIGS. 5 and 13, the protrusion 104 is positioned in front of the horizontal plane 123. The protrusion 104 is positioned under or below the discharge roller 62. In other words, the protrusion 104 protrudes upwardly toward the discharge roller 62 from the upper surface of the slide member 74.

The protrusion 104 is hollowed by a through-hole 109 which penetrates the protrusion 104 in the left-right direction 9. Accordingly, the protrusion 104 is divided into a forward end part 111 and a proximal end part 110 with the through-hole 109 intervening therebetween.

The forward end part 111 is positioned over or above and at the back of the through-hole 109. The forward end part 111 is constructed to have a thin plate-shaped form provided to extend from a back upper end portion via a front upper end portion to a front lower end portion of the protrusion 104. Accordingly, the forward end part 111 can be flexibly bent or warped in a direction crossing an extending direction thereof, and the forward end part 111 functions as a plate spring (leaf spring).

As depicted in FIG. 13, an upper surface of the forward end part 111 has an inclined surface 111A and a horizontal surface 111B. The inclined surface 111A extends upwardly further as the inclined surface 111A extends more frontwardly from a back end of the protrusion 104. In other words, the inclined surface 111A extends further toward closely to the discharge roller 62 as the inclined surface 111A extends more frontwardly. The horizontal surface 111B is continued to a front end of the inclined surface 111A, and the horizontal surface 111B extends frontwardly from the front end of the inclined surface 111A.

The proximal end part 110 is positioned under or below and in front of the through-hole 109. The proximal end part 110 has a projection 112 which projects or protrudes upwardly and which is provided on an upper surface thereof (surface which is included in the inner surface of the through-hole 109 and which comparts a location under or below the through-hole 109). The projection 112 is positioned under or below the horizontal surface 111B of the forward end part 111. Accordingly, a vertical gap is small at a location of the through-hole 109 at which the projection 112 is provided as compared with the other location of the through-hole 109. Accordingly, a flexible bending amount of the forward end part 111 is made to be small by the projection 112.

As depicted in FIG. 5, the protrusion 105 is positioned in front of the protrusion 104 and at a forward end portion of the slide member 74. The protrusion 105 protrudes outwardly in the left-right direction 9 from the forward end portion of the slide member 74. In other words, the protrusion 105 of the slide member 74 which is included in the two slide members 74 and which is positioned on the right side protrudes rightwardly, and the protrusion 105 of the slide member 74 which is included in the two slide members 74 and which is positioned on the left side protrudes leftwardly.

Figure 9:
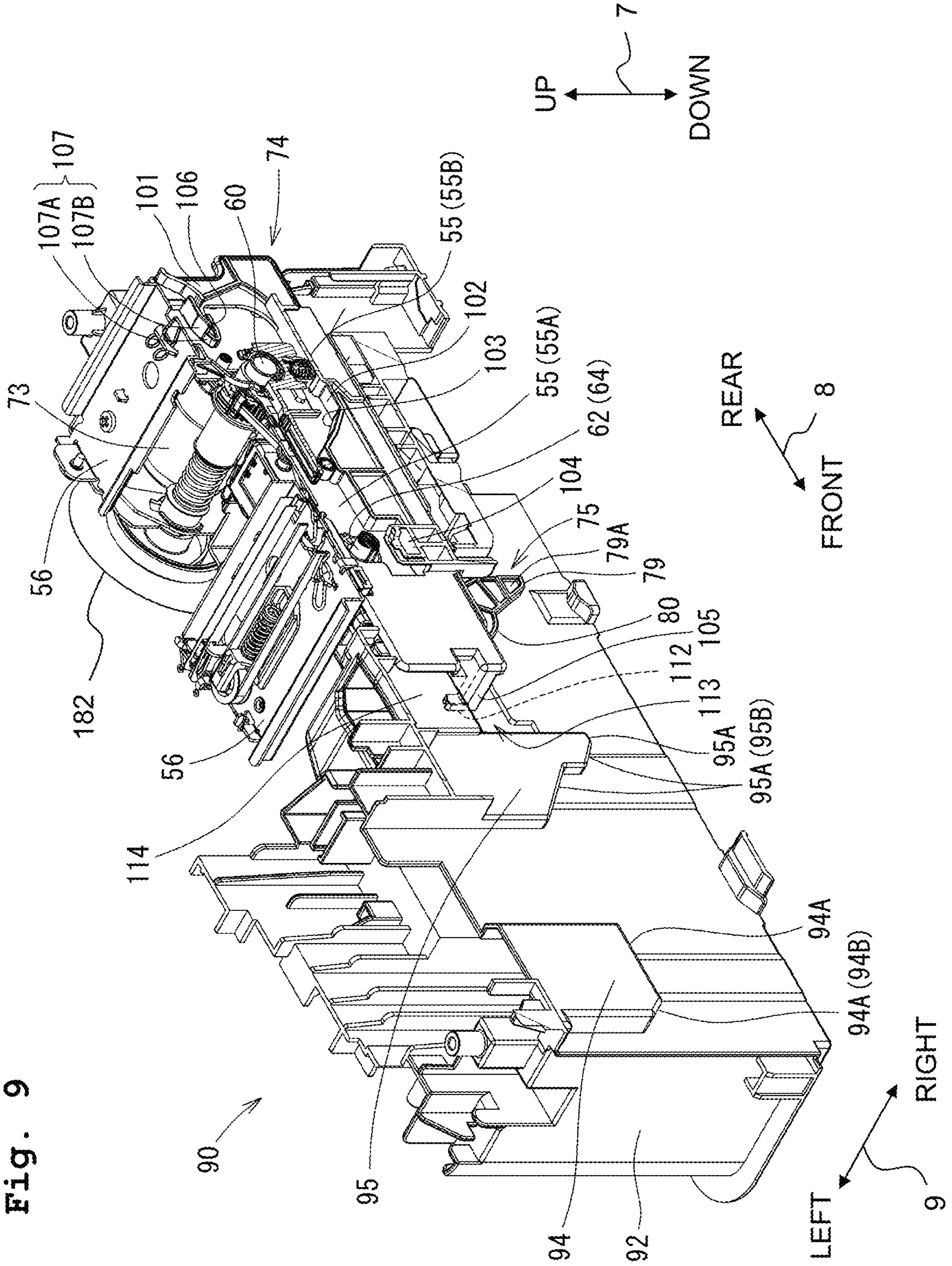
FIG. 9 is a perspective view depicting those in the vicinity of a left part 92 of a base member 90.

The protrusion 105 has a projection 112 which protrudes upwardly and which is provided at the forward end portion thereof. As depicted in FIG. 9, the protrusion 105 penetrates through an opening 113 which is formed through the base member 90. Accordingly, a proximal end portion and a forward end portion (projection 112) of the protrusion 105 are positioned on the mutually opposite sides of the wall 114 of the base member 90 in the left-right direction 9. The projection 112 extends up to an upper position from the opening 113, and the projection 112 is adjacent the wall 114 in the left-right direction. Accordingly, the slide member 74 is engaged with the base member 90 by means of the protrusion 105. Note that FIG. 9 depicts the left part 92 of the base member 90. However, the right part 91 of the base member 90, which is not depicted in the drawing, is also engaged with the slide member 74 in a similar manner to the left part 92.

As depicted in FIG. 5, a proximal end portion of the protrusion 105 is longer than the forward end portion of the protrusion 105 in the front-rear direction 8. Specifically, the proximal end portion of the protrusion 105 extends to the back as compared with the forward end portion of the protrusion 105. The lever 75 (to be described later on) makes contact with a back surface 105A of the proximal end portion of the protrusion 105.

As depicted in FIG. 5, the protrusion 124 is provided under or below the protrusion 104. The protrusion 124 protrudes downwardly. The feed tray 20, which is to be inserted into the casing 14, has the projected part 125 which makes contact with the protrusion 124. Accordingly, the slide member 74 slides backwardly.

[Lever 75]

As depicted in FIG. 5, the lever 75 is supported rotatably about the shaft 76 by the side plate 55A of each of the pair of side frames 55. In other words, two pieces of the lever 75 are provided. Each of the levers 75 is positioned on the outer side of the side plate 55A in the left-right direction 9. In other words, the levers 75 are provided at the right side of the side frame 55 on the right side and at the left side of the side frame 55 on the left side.

Figure 10A:
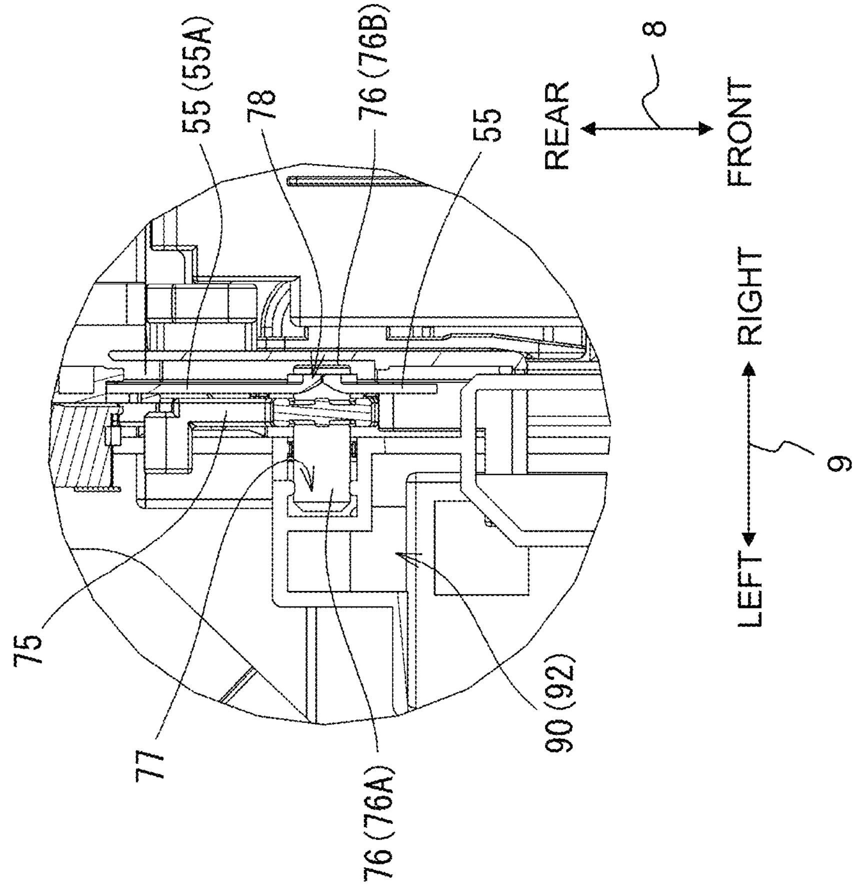
FIG. 10A depicts a lever 75 and those in the vicinity thereof as viewed from an upper position in order to depict the connection between a shaft 76 of the lever 75 and the base member 90 and the side frame.

Each of the levers 75 is supported rotatably about the shaft 76 by the base member 90 as well. In other words, each of the levers 75 is supported by both of the base member 90 and the side frame 55. The shaft 76 protrudes from the upper portion of each of the levers 75 to both of the outer side and the inner side in the left-right direction 9. As depicted in FIG. 10A, a shaft 76A, which is included in the shaft 76 and which protrudes outwardly in the left-right direction 9 from the lever 75, is inserted into a hole 77 which is formed in the base member 90. A shaft 76B, which is included in the shaft 76 and which protrudes inwardly in the left-right direction 9 from the lever 75, is inserted into an aperture 78 which is formed for the side frame 55. The diameter of the hole 77 is larger than the diameter of the aperture 78.

Figure 21:
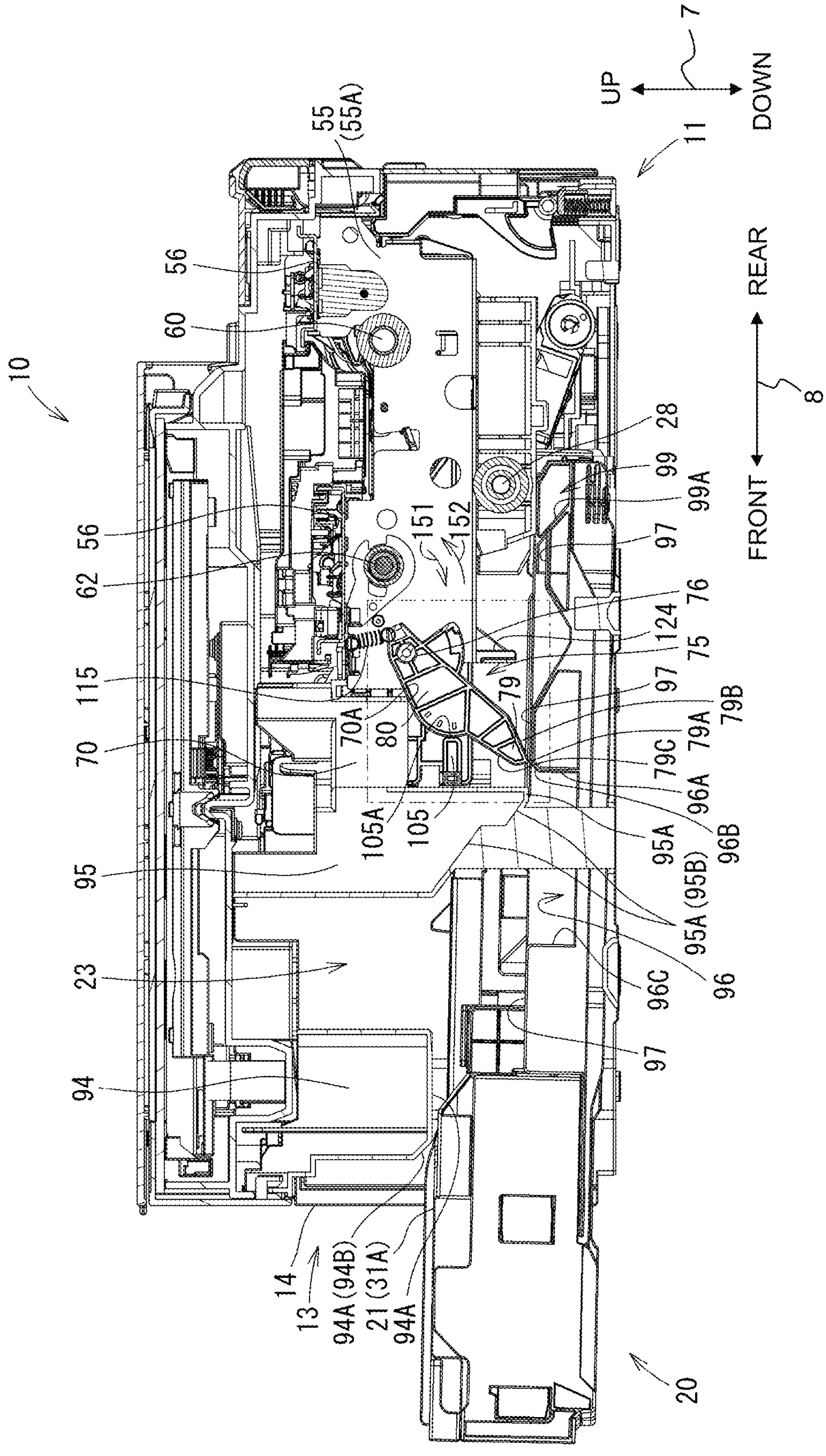
FIG. 21 is a vertical sectional view depicting the printer part 11 at a position at which the lever 75 on the right side can be seen from a right position when the slide member 74 is located at the front position.
Figure 24:
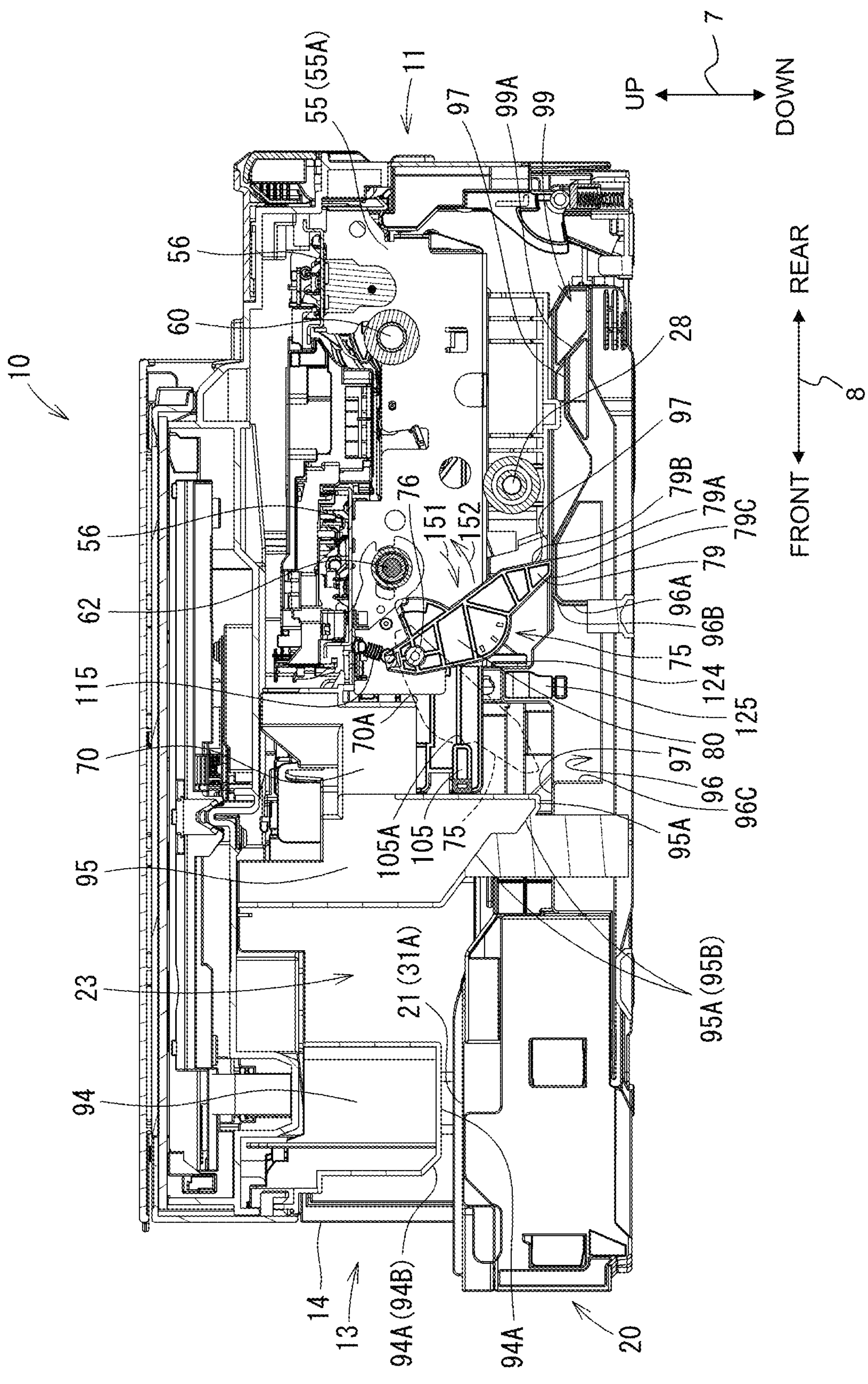
FIG. 24 is a vertical sectional view depicting the printer part 11 at a position at which the lever 75 on the right side is viewed from a right position when the feed tray 20 makes contact with the slide member 74 from the front position.

The lever 75 is rotatable to s reference position depicted in FIG. 12, a front rotation position depicted in FIG. 21, and a back rotation position depicted in FIG. 24. The lever 75 is rotatable between the front rotation position and the back rotation position. The lever 75 is positioned at the front rotation position by being rotated in the orientation of the arrow 151 from the reference position. The lever 75 is positioned at the back rotation position by being rotated in the orientation of an arrow 152 (orientation opposite to the arrow 151) from the reference position.

As depicted in FIG. 12, when the lever 75 is located at the reference position, a forward end part 79 of the lever 75 is positioned under or below the shaft 76. The forward end part 79 includes a forward end 79A of the lever 75 (lower end of the lever 75 when the lever is located at the reference position).

As depicted in FIG. 21, when the lever 75 is located at the front rotation position, the forward end 79A is positioned frontwardly and upwardly as compared with when the lever 75 is located at the reference position (see FIG. 12). The lever 75, which is located at the front rotation position, makes contact with the back lower end part 70A of the third protrusion 70 of the base member 90 from the back. Accordingly, the lever 75, which is located at the front rotation position, is regulated for the rotation in the orientation of the arrow 151 by the back lower end part 70A of the third protrusion 70. In other words, the lever 75, which is located at the front rotation position, is regulated for the rotation in the orientation to make separation from the reference position by the back lower end part 70A of the third protrusion 70.

As depicted in FIG. 24, when the lever 75 is located at the back rotation position, the forward end 79A is positioned backwardly and upwardly as compared with when the lever 75 is located at the reference position (see FIG. 12).

As depicted in FIG. 12, a lower end of the coil spring 115 is connected to the upper end portion of the lever 75. An upper end of the coil spring 115 is connected to the projection 37 of the side frame 55 (see FIG. 10B). When the lever 75 is positioned at the reference position, the coil spring 115 has an equilibrium length. If the lever 75 is rotated from the reference position toward the front rotation position or the back rotation position, the coil spring 115 is expanded or shrunk. Accordingly, the lever 75 is biased toward the reference position by the elastic force of the coil spring 115.

The lever 75 is provided over or above the side wall 30 and at a same position as that of the side wall 30 of the feed tray 20 in the left-right direction 9. As depicted in FIG. 12, when the lever 75 is positioned at the reference position, the forward end part 79 of the lever 75 enters into the cutout 96 formed for the side wall 30 of the feed tray 20.

When the lever 75 is positioned at the reference position, the forward end part 79 of the lever 75 (portion of the lever

75 entering into the cutout 96) is positioned at the back of the shaft 76. The forward end part 79 has a back surface 79B and a front surface 79C. The back surface 79B is brought into contact with the back surface 96A and the inclined surface 96B of the feed tray 20 to be moved frontwardly during a process of withdrawing (removing) the feed tray 20 from the casing 14 (see FIGS. 15 and 18). The front surface 79C makes contact with the inclined surface 99A of the side wall 30 of the feed tray 20 which is being inserted into the casing 14 (see FIGS. 4 and 12).

As depicted in FIG. 12, the lever 75 has a protrusion 80. The protrusion 80 protrudes in the orientation of the arrow 151 from a virtual surface 153 expanding in an orientation directed from the shaft 76 to the forward end 79A and in the left-right direction 9. The arrow 151 indicates an orientation in which the lever 75 is rotated toward the contact position with respect to the slide member 74 (position of the back surface 105A of the protrusion 105). A protruding end surface 80A of the protrusion 80 is curved.

As depicted in FIG. 12, the lever 75 located at the back rotation position (indicated by broken lines in FIG. 12) is positioned in front of the back surface 96A of the cutout 96 of the feed tray 20 located at the position (position depicted in FIG. 12) at which the feed tray 20 is installed to the casing 14.

As depicted in FIG. 24, the lever 75 located at the front rotation position (indicated by broken lines in FIG. 24) is positioned at the back of the front surface 96C of the cutout 96 of the feed tray 20 at a predetermined position (position depicted in FIG. 24). The predetermined position is a position at which the feed tray 20 is located provided that the slide member 74 (in particular, the back surface 105A of the protrusion 105) makes contact with the lever 75 located at the front rotation position under a condition that the lever 75 is positioned at the front rotation position in the process in which the feed tray 20 is (being) inserted into the casing 14.

Figure 30:
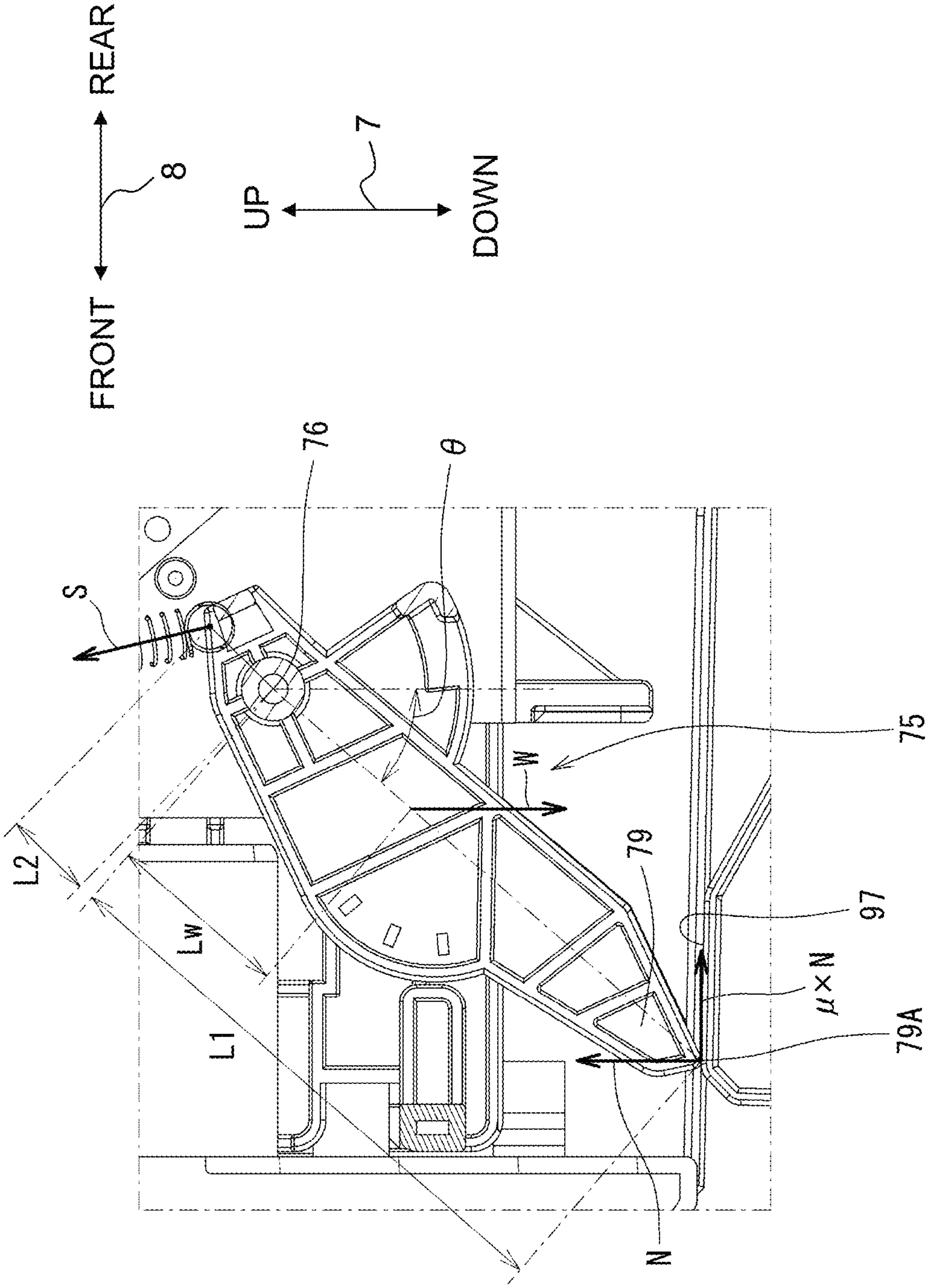
FIG. 30 depicts an enlarged view of the lever 75 and surroundings thereof depicted in FIG. 21.
Figure 31:
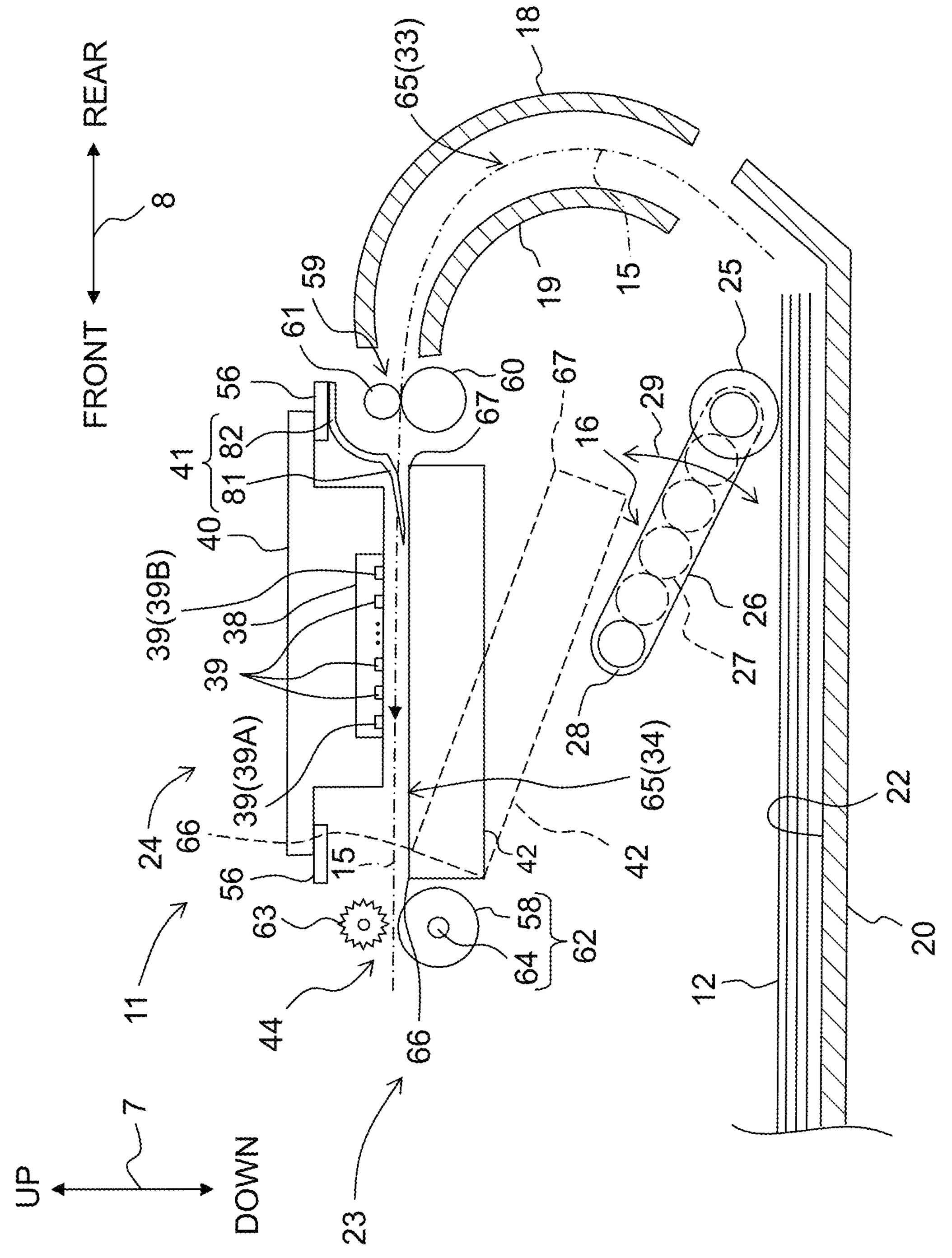
FIG. 31 is a vertical sectional view schematically depicting the internal structure of a printer part 11 in another modification.
Figure 32:
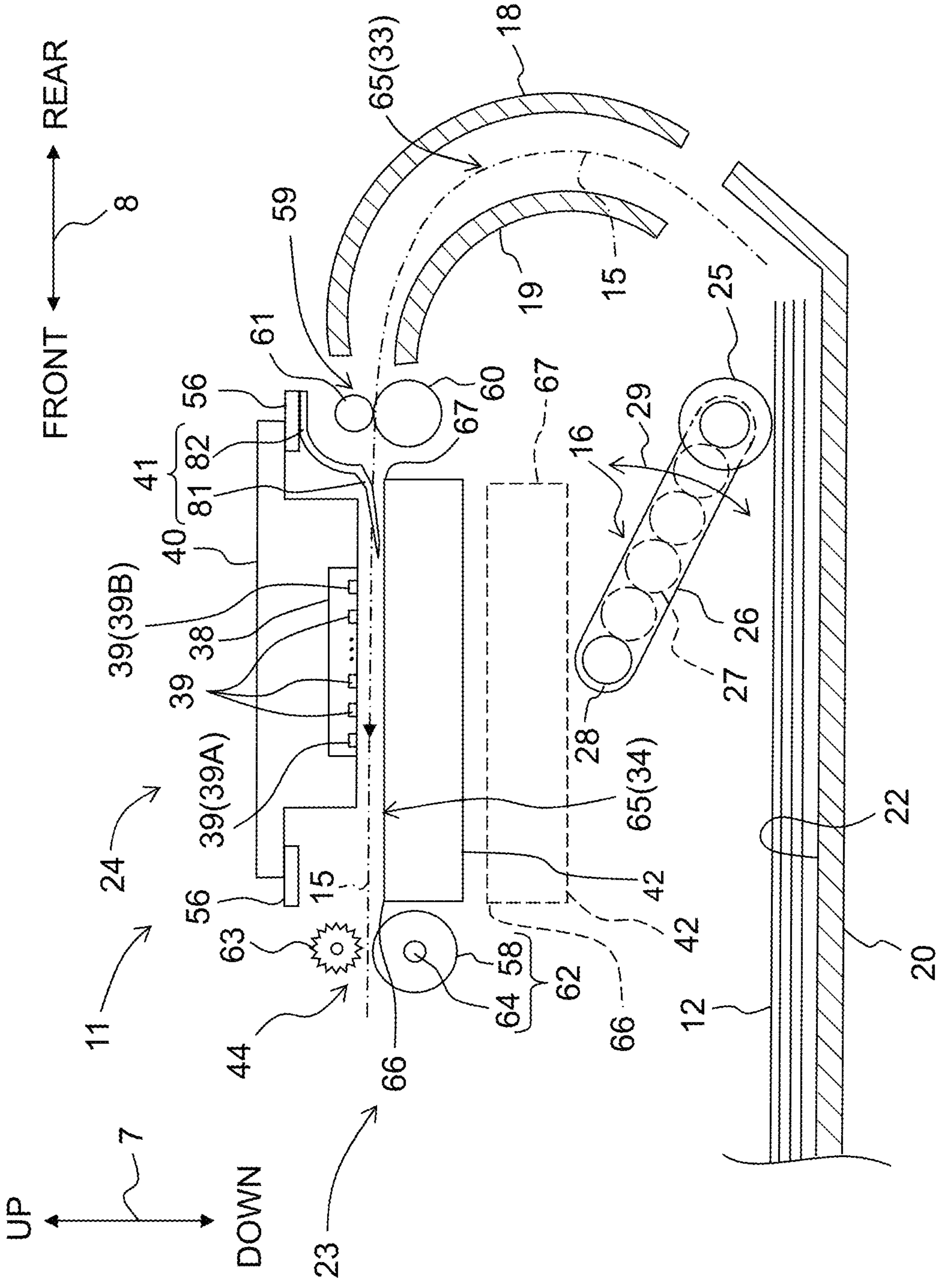
FIG. 32 is a vertical sectional view schematically depicting the internal structure of a printer part 11 in still another modification.

An angle of rotation θ (unit: degree) of the lever 75 toward the front and the back with respect to the vertical direction (see FIG. 30) fulfills the following relationship of Expression 1 in a state in which the lever 75 makes contact with the upper surface 97 of the side wall 30 of the feed tray 20 (for example, a state depicted in FIG. 30). In Expression 1, "μ" represents the coefficient of friction between the forward end 79A of the lever 75 and the upper surface 97 of the feed tray 20 (see FIG. 30).

$$\theta > \arctan \mu \quad \text{(Expression 1)}$$

Expression 1 is derived as follows. As depicted in FIG. 30, the balance of moments around the shaft 76 of the lever 75 is expressed by Expression 2 as follows.

$$W \times Lw \times \sin\theta - N \times L1 \times \sin\theta + \mu \times N \times L1 \times \cos\theta + L2 \times S = 0 \quad \text{(Expression 2)}$$

In Expression 2, "W" (unit: N) is the own weight of the lever 75. "Lw" (unit: mm) is a distance from the shaft 76 of the lever 75 to the center of gravity of the lever 75. "N" (unit: N) is the vertical drag acting on the forward end 79A of the lever 75 from the upper surface 97 of the feed tray 20. "L1" (unit: mm) is a distance from the shaft 76 of the lever 75 to the forward end 79A of the lever 75. "L2" (unit: mm) is a distance from the shaft 76 of the lever 75 to the connecting position of the lever 75 and the coil spring 115. "S" (unit: N) is the force acting on the coil spring 115.

In a case that Expression 2 is deformed, Expression 3 is obtained as follows.

$$N = (W \times Lw \times \sin\theta + L2 \times S) / (L1 \times (\sin\theta - \cos\theta)) \quad \text{(Expression 3)}$$

According to Expression 3, if $\sin\theta - \mu\cos\theta = 0$ is given, N is infinite. Accordingly, if it is intended to move the feed tray 20 frontwardly from the state depicted in FIG. 30, the frontward movement of the feed tray 20 is inhibited by the lever 75. In order to avoid this situation, it is appropriate that $\sin\theta - \mu\cos\theta > 0$ is given. In other words, it is appropriate that Expression 1 is fulfilled. Note that the relationship, which is fulfilled by the angle of backward and upward rotation of the lever 75 with respect to the vertical direction, can be also decided in a similar manner to that described above.

[Tray Sensor 170]

The tray sensor 170 depicted in FIG. 2 is provided to judge whether or not the feed tray 20 is inserted until arrival at the inner part of the casing 14, i.e., whether or not the feed tray 20 is installed to the casing 14.

As depicted in FIG. 2, the tray sensor 170 is provided at the back portion of the casing 14. The tray sensor 170 is provided with a shaft 171 which is supported, for example, by the casing 14 and/or the base member 90, a detecting element 172 which is rotatable about the center of the shaft 171, and an optical sensor 173 which has a light-emitting element and a light-receiving element for receiving the light emitted from the light-emitting element.

If the feed tray 20 is not inserted until arrival at the inner part of the casing 14, i.e., if the feed tray 20 is not installed to the casing 14 (for example, in the case of the state depicted in FIGS. 14 to 25), then the detecting element 172 is biased frontwardly by an unillustrated biasing member (for example, a coil spring), and the detecting element 172 is disposed at the position depicted by the broken line in FIG. 2. In this situation, the optical path, which arrives at the light-receiving element from the light-emitting element of the optical sensor 173, is not intercepted. Therefore, an electric signal at the high level (level larger than a previously set threshold value) is outputted from the optical sensor 173 to the controller 190 (see FIG. 27). The electric signal at the high level is an example of the second signal.

In the process in which the feed tray 20 is inserted into the casing 14, the detecting element 172 is pushed by the feed tray 20, and the detecting element 172 is rotated backwardly against the urging force of the biasing member. The detecting element 172 is disposed at the position depicted by the solid line in FIG. 2 in the state in which the feed tray 20 is inserted until arrival at the inner part of the casing 14, i.e., in the state in which the feed tray 20 is installed to the casing 14 (state depicted in FIGS. 2 and 11 to 13). In this situation, the optical path, which arrives at the light-receiving element from the light-emitting element of the optical sensor 173, is intercepted. Therefore, an electric signal at the low level (level smaller than the previously set threshold value) is outputted from the optical sensor 173 to the controller 190 (see FIG. 27). The electric signal at the low level is an example of the first signal.

Note that conversely to the above, the optical sensor 173 may output the electric signal at the low level in the state in which the feed tray 20 is not installed to the casing 14, and the optical sensor 173 may output the electric signal at the high level in the state in which the feed tray 20 is installed to the casing 14. Further, it is also allowable that the optical sensor 173 does not output the electric signal in place of the output of the electric signal at the low level. Further, the configuration of the tray sensor 170 is not limited to the configuration described above. It is possible to adopt various types of known configuration.

[Sheet Sensor 174]

The sheet sensor 174 depicted in FIG. 2 is the sensor which is provided to detect the presence of the recording paper 12 at the arrangement position of the sheet sensor 174.

As depicted in FIG. 2, the sheet sensor 174 is provided upstream in the conveying orientation 15 from the conveying roller pair 59 in the conveying passage 65. The sheet sensor 174 is provided with a shaft 175 which is supported, for example, by the casing 14 and/or the base member 90, a detecting element 176 which is rotatable about the center of the shaft 175, and an optical sensor 177 which has a light-emitting element and a light-receiving element for receiving the light emitted from the light-emitting element. The detecting element 176 is biased to the position depicted in FIG. 2 by an unillustrated biasing member (for example, a coil spring).

The recording paper 12, which is conveyed by the feed unit 16, passes through the arrangement position of the sheet sensor 174, and the recording paper 12 arrives at the conveying roller pair 59.

When the recording paper 12 is present at the arrangement position, then the detecting element 176 is pushed by the recording paper 12, and the detecting element 176 is rotated counterclockwise as viewed in FIG. 2 from the position depicted in FIG. 2 against the urging force of the biasing member. Accordingly, the optical path, which arrives at the light-receiving element from the light-emitting element of the optical sensor 177, is not intercepted. An electric signal at the high level is outputted from the optical sensor 173 to the controller 190 (see FIG. 27). The electric signal at the high level is an example of the detection signal.

When the recording paper 12 is not present at the arrangement position, the detecting element 176 is disposed at the position depicted in FIG. 2 by being biased by the biasing member. Accordingly, the optical path, which arrives at the light-receiving element from the light-emitting element of the optical sensor 177, is intercepted. An electric signal at the low level is outputted from the optical sensor 177 to the controller 190 (see FIG. 27).

Note that conversely to the above, the optical sensor 177 may output the electric signal at the low level when the recording paper 12 is present at the arrangement position, and the optical sensor 177 may output the electric signal at the high level when the recording paper 12 is not present at the arrangement position. Further, it is also allowable that the optical sensor 177 does not output the electric signal in place of the output of the electric signal at the low level. Further, the configuration of the sheet sensor 174 is not limited to the configuration described above. It is possible to adopt various types of known configuration.

[Encoder 181]

As depicted in FIGS. 2 and 3, the printer unit 11 is provided with a known encoder 181 which generates a pulse signal in accordance with the rotation of the conveying roller 60. The encoder 181 is provided with an encoder disk 182 and an optical sensor 183. The encoder disk 182 is rotated in cooperation with the rotation of the conveying roller 60. The optical sensor 183 reads the rotating encoder disk 182 to generate the pulse signal, and the generated pulse signal is outputted to the controller 190 (see FIG. 27). In other words, the encoder 181 outputs the signal corresponding to the amount of rotation of the conveying roller 60. In this case, the conveying roller 60 is rotated in accordance with the rotation of the conveying motor 73 (see FIGS. 3 and 27, an example of the motor). Therefore, the encoder 181 outputs the signal corresponding to the amount of rotation of the conveying motor 73. Note that the encoder disk 182 may be attached to those other than the conveying roller 60, for example, to the conveying motor 73 or the discharge roller 62.

[Encoder 184]

Figure 27:
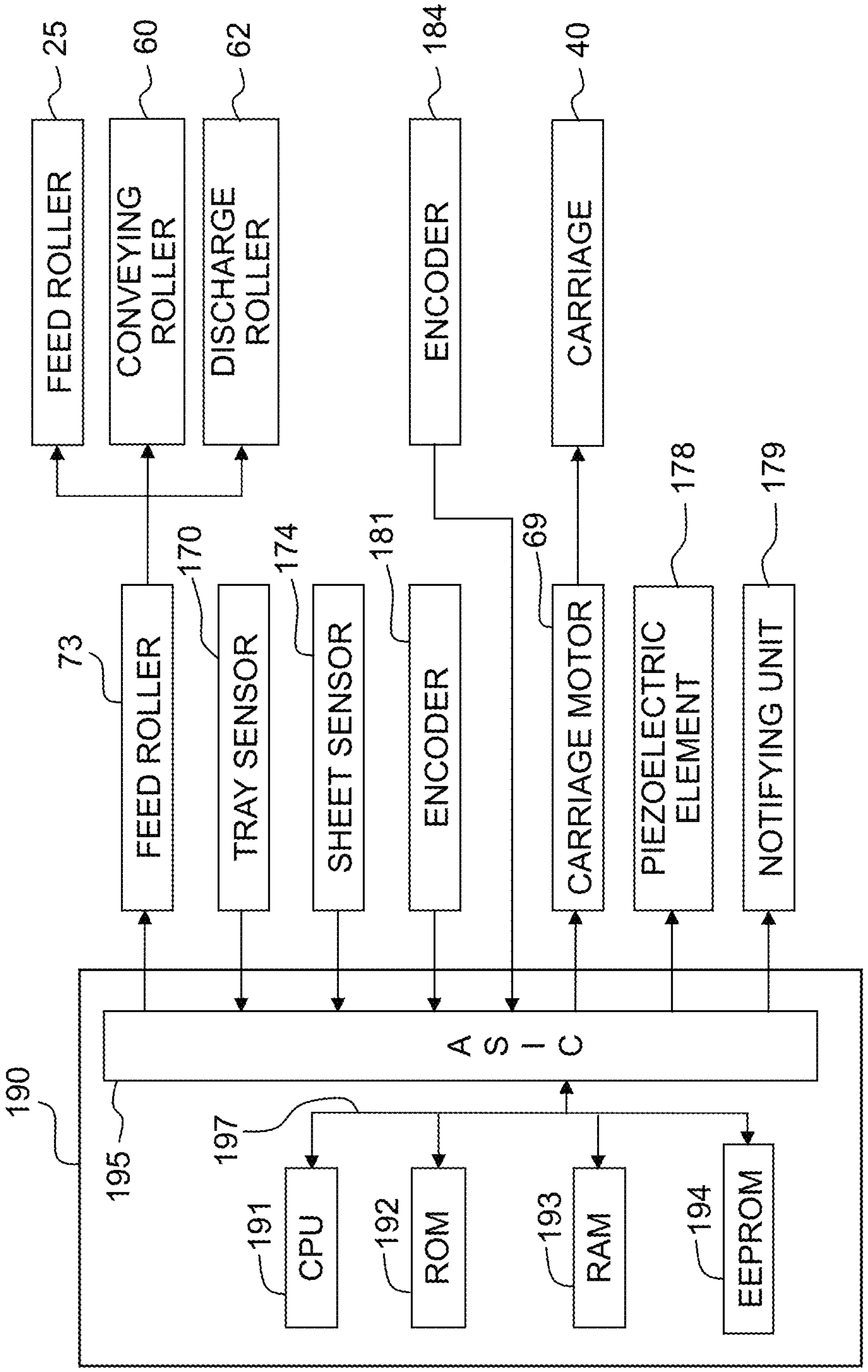
FIG. 27 is a functional block diagram of the printer unit 11.

An encoder 184 depicted in FIG. 27 is provided with an encoder strip (not depicted) and an optical sensor (not depicted). The encoder strip is arranged on the guide rail 56, and the encoder strip extends in the left-right direction 9. The encoder strip is subjected to the marking with a pattern in which light transmitting portions for transmitting the light and light shielding portions for shielding the light are alternately arranged at equal pitches in the left-right direction 9. The optical sensor is provided at the position on the carriage 40 opposed to the encoder strip. An electric signal, which is detected by the optical sensor, is outputted to the controller 190 (see FIG. 27).

[Controller 190]

As depicted in FIG. 27, the controller 190 is provided with CPU 191, ROM 192, RAM 193, EEPROM 194, and ASIC 195, and these components are connected to one another by means of an internal bus 197. For example, programs, with which CPU 191 controls various operations, are stored in ROM 192. RAM 193 is used as a storage area for temporarily storing, for example, data and signals to be used when CPU 19 executes the programs as described above, or a working area for performing the data processing. For example, settings and flags, which are to be retained even after turning OFF the power source, are stored in EEPROM 194.

The conveying motor 73 and the carriage motor 69 are connected to ASIC 195. ASIC 195 generates driving signals in order to rotate the respective motors, and ASIC 195 controls the respective motors on the basis of the driving signals. For example, the controller 190 controls the driving of the conveying motor 73 to drive the respective rollers (feed roller 25, conveying roller 60, discharge roller 62). Further, the controller 190 controls the driving of the carriage motor 69 to move the carriage 40 in the left-right direction 9.

The tray sensor 170, the sheet sensor 174, the encoder 181, and the encoder 184 are connected to ASIC 195.

The controller 190 judges whether or not the feed tray 20 is installed to the casing 14 on the basis of the electric signal outputted from the tray sensor 170. The controller 190 judges whether or not the recording paper 12 is present at the arrangement position of the sheet sensor 174 on the basis of the electric signal outputted from the sheet sensor 174. The controller 190 recognizes the position of the recording paper 12 in the conveying passage 65 on the basis of the pulse signal outputted from the encoder 181 after the acquisition of the electric signal outputted from the sheet sensor 174. Note that the controller 190 may judge the position of the recording paper 12 in the conveying passage 65 on the basis of the pulse signal outputted from the encoder 181 after the start of the feeding of the recording paper 12 by the feed roller 25. The controller 190 judges the position of the carriage 40 in the left-right direction 9 on the basis of the electric signal received from the encoder 184.

A piezoelectric element 178 is connected to ASIC 195. The piezoelectric element 178 is provided in the recording head 38. The piezoelectric element 178 allows the ink droplets to be discharged from the nozzles 39 by deforming a part of the ink flow passage (not depicted) formed in the recording head 38. The piezoelectric element 178 is operated by supplying the electric power by the controller 190 by the aid of an unillustrated drive circuit. The controller 190 control the electric power supply to the piezoelectric element 178 so that the ink droplets are selectively discharged from the plurality of nozzles 39.

[Operations of Respective Members in Insertion/Withdrawal Process of Feed Tray 20]

An explanation will be made below about states and operations of the respective members in a process in which the feed tray 20 is inserted/withdrawn with respect to the casing 14.

At first, an explanation will be made about the states and the operations of the respective members in the process in which the feed tray 20 is withdrawn from the casing 14.

As depicted in FIGS. 11 to 13, when the feed tray 20 is installed to the casing 14, the respective members are in the states described in detail below.

As depicted in FIG. 12, the lever 75 is positioned at the reference position. The protrusion 80 of the lever 75 makes contact with the back surface 105A of the protrusion 105 of the slide member 74 from therebehind. Note that in this situation, the lever 75 may be separated from the back surface 105A of the protrusion 105 of the slide member 74.

As depicted in FIG. 13, the slide member 74 is positioned at the back position. The projection 106 is positioned at the back of the shaft 87, and the projection 106 is separated from the shaft 87. In this situation, the pinch roller 61 makes contact with the conveying roller 60 by being biased by the coil spring 57 (see FIGS. 2 and 5). In other words, the conveying roller pair 59 is in the nipping state.

As depicted in FIG. 12, the back surface 96A of the cutout 96 of the feed tray 20 is positioned at the back of the lever 75 located at the reference position. The back surface 96A of the cutout 96 of the feed tray 20 is positioned at the back of the lever 75 located at the back rotation position indicated by the broken line in FIG. 12. The front surface 96C of the cutout 96 of the feed tray 20 is positioned in front of the lever 75 located at the reference position. The forward end part 79 of the lever 75 is positioned under or below the upper surface 97 of the side wall 30, and the forward end part 79 of the lever 75 enters the cutout 96.

The first protrusion 94 of the base member 90 is opposed in the up-down direction 7 to the front upper surface 31A of the discharge tray 21. The second protrusion 95 of the base member 90 is opposed in the up-down direction 7 to the horizontal surface 97A of the upper surface 97 of the side wall 30 of the feed tray 20. Therefore, when the feed tray 20 is lifted upwardly by the user in the state depicted in FIGS. 11 to 13, the lifting of the feed tray 20 is regulated by the contact of the front upper surface 31A with or against the lower surface 94A of the first protrusion 94 from the lower position, or by the contact of the horizontal surface 97A with or against the lower surface 95A of the second protrusion 95 from the lower position.

As depicted in FIGS. 11 and 13, the platen 42 is positioned at the printing position. The platen 42 is definitely positioned in the up-down direction 7 as described in detail below.

As depicted in FIG. 13, the contact piece 47, which is provided at the back end portion of the platen 42, is supported by the support surface 102 of the slide member 74. The projected part 46 is positioned over or above the support surface 102 (see FIG. 6). The bearing 71 of the conveying roller 60 (see FIG. 5) is fitted to the recess formed by the upper surface 46A of the projected part 46. In this situation, the projected part 46 is biased upwardly by the coil spring 48, and the projected part 46 is pressed against the bearing 71 of the conveying roller 60. In other words, the platen 42 is biased with respect to the conveying roller 60. Accordingly, the back end portion of the platen 42 is definitely positioned in the up-down direction 7 by the side frame 55 to which the bearing 71 is attached.

The projected part 49, which is provided at the front end portion of the platen 42, is supported by the forward end part 111 of the protrusion 104 of the slide member 74. In this situation, the projected part 49 is biased upwardly by the forward end part 111 which functions as the plate spring, and the projected part 49 is pressed against the discharge roller 62. In other words, the projected part 49 is in a state of being vertically sandwiched or interposed by the protrusion 104 and the discharge roller 62. Accordingly, the front end portion of the platen 42 is definitely positioned in the up-down direction 7 by the side frame 55 by which the discharge roller 62 is supported by the aid of the bearing 72. As described above, the platen 42 is definitely positioned in the up-down direction 7 by definitely positioning the back end portion and the front end portion thereof by the side frame 55.

Note that even when the slide member 74 is moved from the back position depicted in FIG. 13 to the front position depicted in FIG. 22, the contact piece 47 maintains the state of being supported by the slide member 74. Therefore, the projected part 46 is biased upwardly by the coil spring 48 regardless of the position of the slide member 74, and the projected part 46 is pressed against the bearing 71. Accordingly, the platen 42 is rotatable about the bearing 71 (about the axis of the conveying roller 60) regardless of the position of the slide member 74.

As depicted in FIG. 13, the projection 50 of the platen 42 is separated from the slide member 74. In other words, the projection 50 is not supported by the slide member 74.

Figure 14:
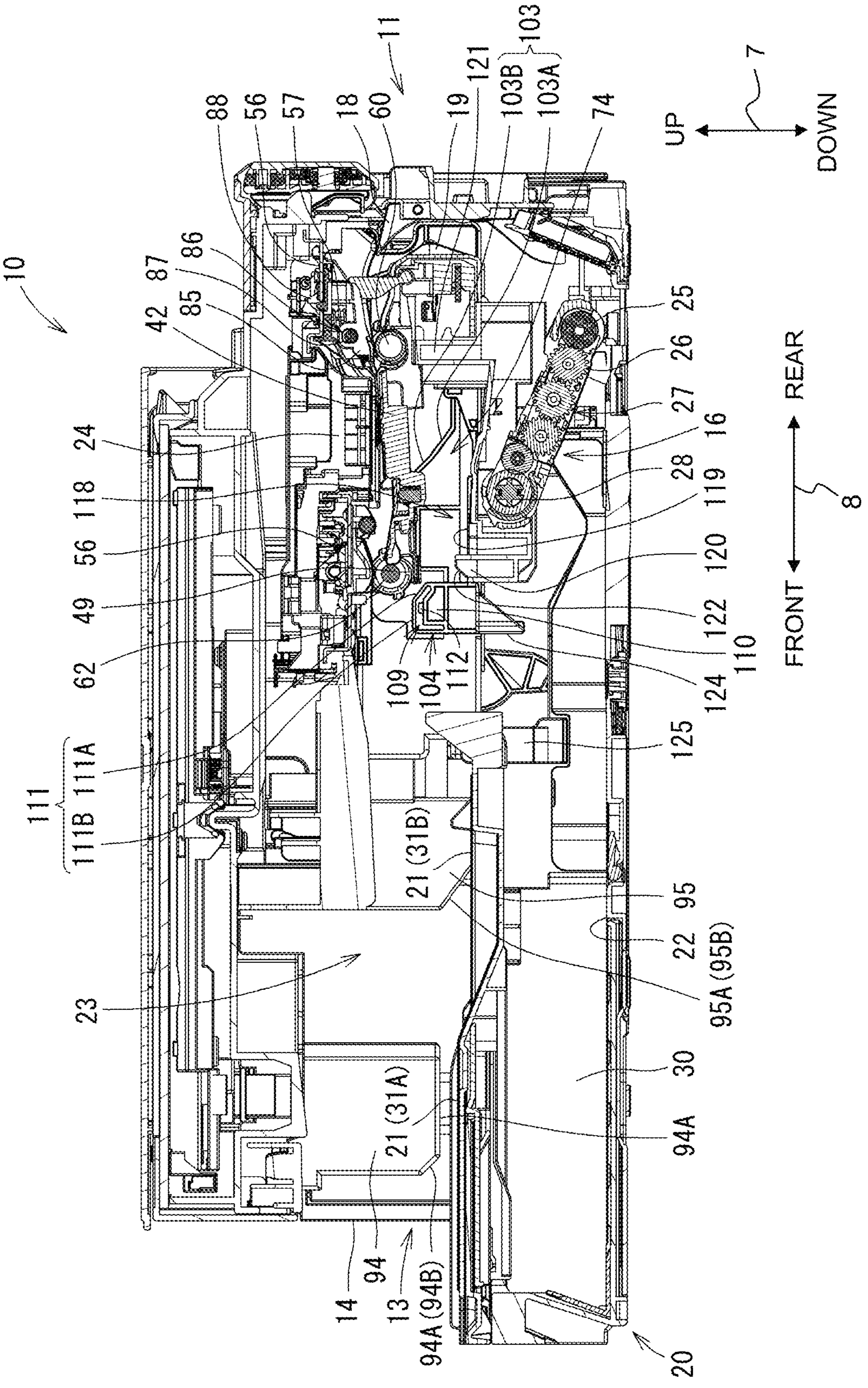
FIG. 14 is a vertical sectional view taken along the center in the left-right direction 9 of the printer part 11 in a case that the feed tray 20 makes contact with or abuts against the lever 75 from a back position or from therebehind.
Figure 15:
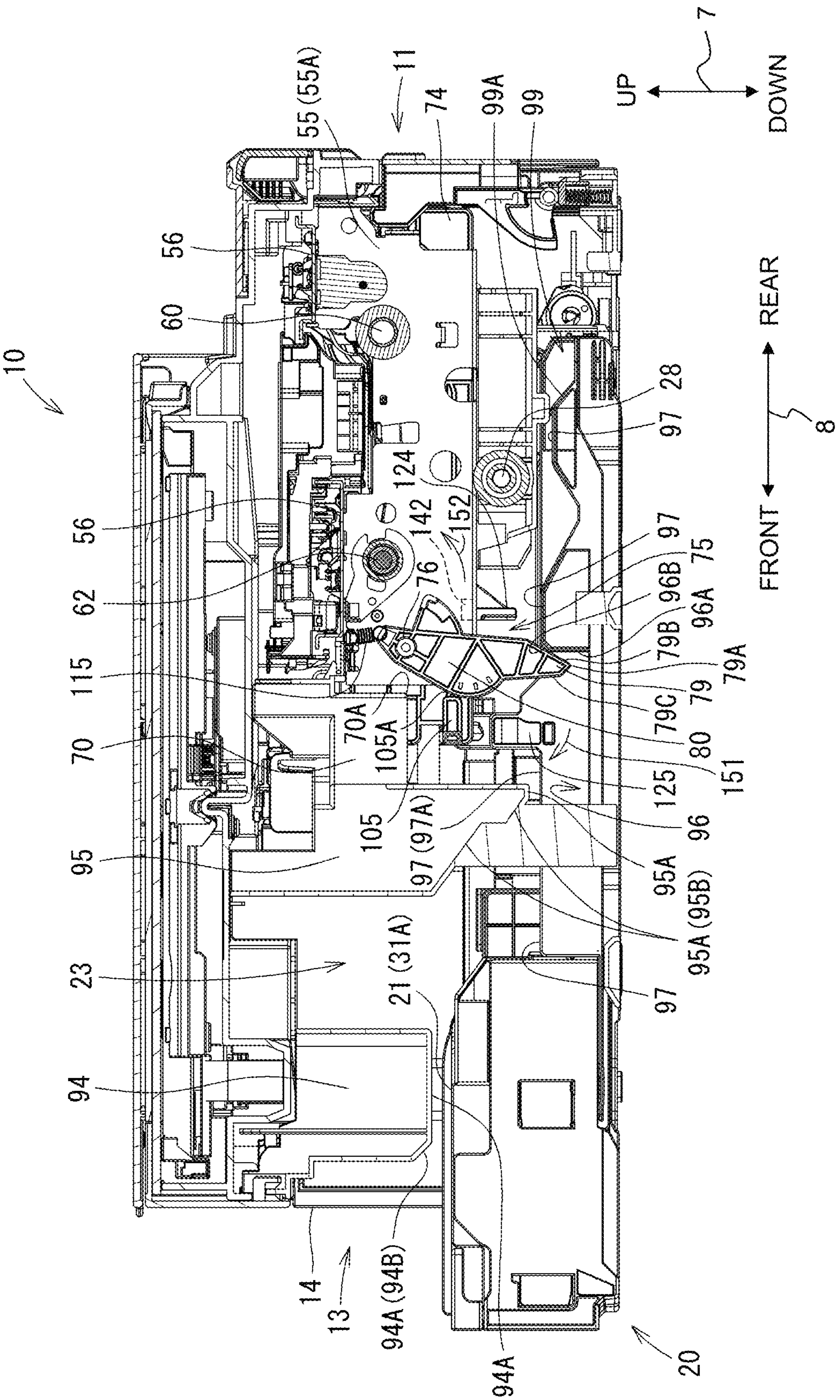
FIG. 15 is a vertical sectional view depicting the printer part 11 at a position at which the lever 75 on the right side is viewed from a right position in a case that the feed tray 20 makes contact with the lever 75 from therebehind.

When the withdrawal of the feed tray 20 from the casing 14 is started, the feed tray 20 is moved frontwardly from the position depicted in FIGS. 11 to 13 to the position depicted in FIGS. 14 to 16. In this situation, the respective members are operated as described in detail below, and the respective members are in the states described in detail below.

As depicted in FIG. 15, the back surface 96A of the cutout 96 of the feed tray 20 makes contact with the back surface 79B of the forward end part 79 of the lever 75 from the back, and the back surface 96A pushes the lever 75 frontwardly. Accordingly, the lever 75 is pushed by the feed tray 20, and the lever 75 is rotated in the orientation of the arrow 151 from the reference position, i.e., from the reference position toward the side of the front rotation position against the urging force of the coil spring 115. The protrusion 80 of the rotating lever 75 pushes the back surface 105A of the protrusion 105 of the slide member 74 frontwardly. Accordingly, the slide member 74 slides frontwardly from the back position, i.e., from the back position toward the front position.

The first protrusion 94 of the base member 90 is opposed in the up-down direction 7 to the front upper surface 31A of the discharge tray 21. The front portion of the second protrusion 95 of the base member 90 is opposed in the up-down direction 7 to the horizontal surface 97A of the upper surface 97 of the side wall 30 of the feed tray 20. The back portion of the second protrusion 95 of the base member 90 is opposed in the up-down direction 7 to the cutout 96 of the feed tray 20. Therefore, when the feed tray 20 is lifted upwardly by the user during the frontward movement of the feed tray 20, the lifting of the feed tray 20 is regulated by the contact of the front upper surface 31A with or against the lower surface 94A of the first protrusion 94 from the lower position, or by the contact of the horizontal surface 97A with or against the lower surface 95A of the second protrusion 95 from the lower position.

As depicted in FIGS. 14 and 16, the platen 42 is rotated downwardly from the printing position. In other words, the platen 42 is rotated from the printing position toward the release position. A description will be made in detail below.

The state, in which the projected part 46 is pressed against the bearing 71, is maintained. Therefore, the platen 42 maintains the state in which the platen 42 is rotatable about the axis of the conveying roller 60.

On the other hand, the protrusion 104 of the slide member 74 is separated from the projected part 49 by allowing the slide member 74 to slide frontwardly. Accordingly, the projected part 49 is not supported by the protrusion 104. As a result, the platen 42 is rotated about the axis of the conveying roller 60 so that the forward end portion thereof is moved downwardly, and the projected part 49 of the platen 42 is separated from the bearing 72. After that, as depicted in FIG. 16, when the platen 42 is rotated, then the projection 50 is moved downwardly, the projection 50 makes contact with the horizontal surface 123 of the slide member 74 from the upper position, and the projection 50 is guided by the horizontal surface 123. After that, the projection 50 is guided by the inclined surface 103 and the horizontal surface 123 of the slide member 74 in accordance with the frontward sliding movement of the slide member 74, and thus the platen 42 is rotated toward the release position.

Note that the protrusion 104 of the slide member 74 is separated from the projected part 49, and thus the front end portion of the platen 42 is not definitely positioned in the up-down direction 7.

In the state depicted in FIGS. 14 to 16, the projection 106 is still positioned at the back of the shaft 87, and the projection 106 is separated from the shaft 87. Therefore, the conveying roller pair 59 is still in the nipping state.

When the feed tray 20 is moved frontwardly from the position depicted in FIGS. 14 to 16 to the position depicted in FIGS. 17 to 19, then the respective members are operated as described in detail below, or the respective members are in states described in detail below.

Figure 18:
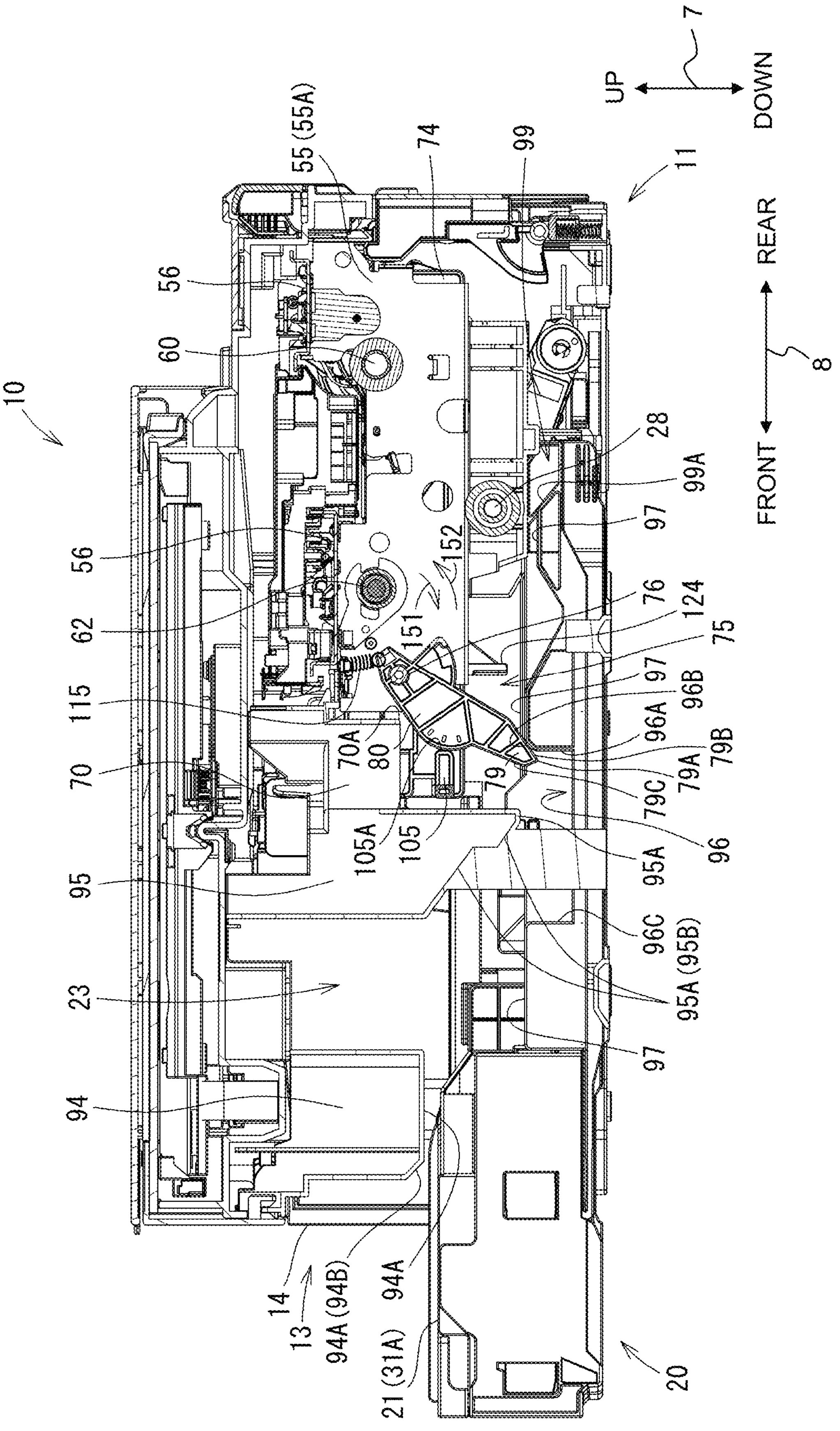
FIG. 18 is a vertical sectional view depicting the printer part 11 at a position at which the lever 75 on the right side can be seen from a right position in the state that the conveying roller pair 59 is changed to be in the separated state.

As depicted in FIG. 18, the lever 75 is pushed by the feed tray 20, and the lever 75 is rotated in the orientation of the arrow 151 from the position depicted in FIG. 15, i.e., toward the side of the front rotation position. As depicted in FIG. 19, the slide member 74 is pushed by the rotating lever 75, and the slide member 74 slides frontwardly as compared with the position depicted in FIG. 16, i.e., toward the side of the front position.

Figure 17:
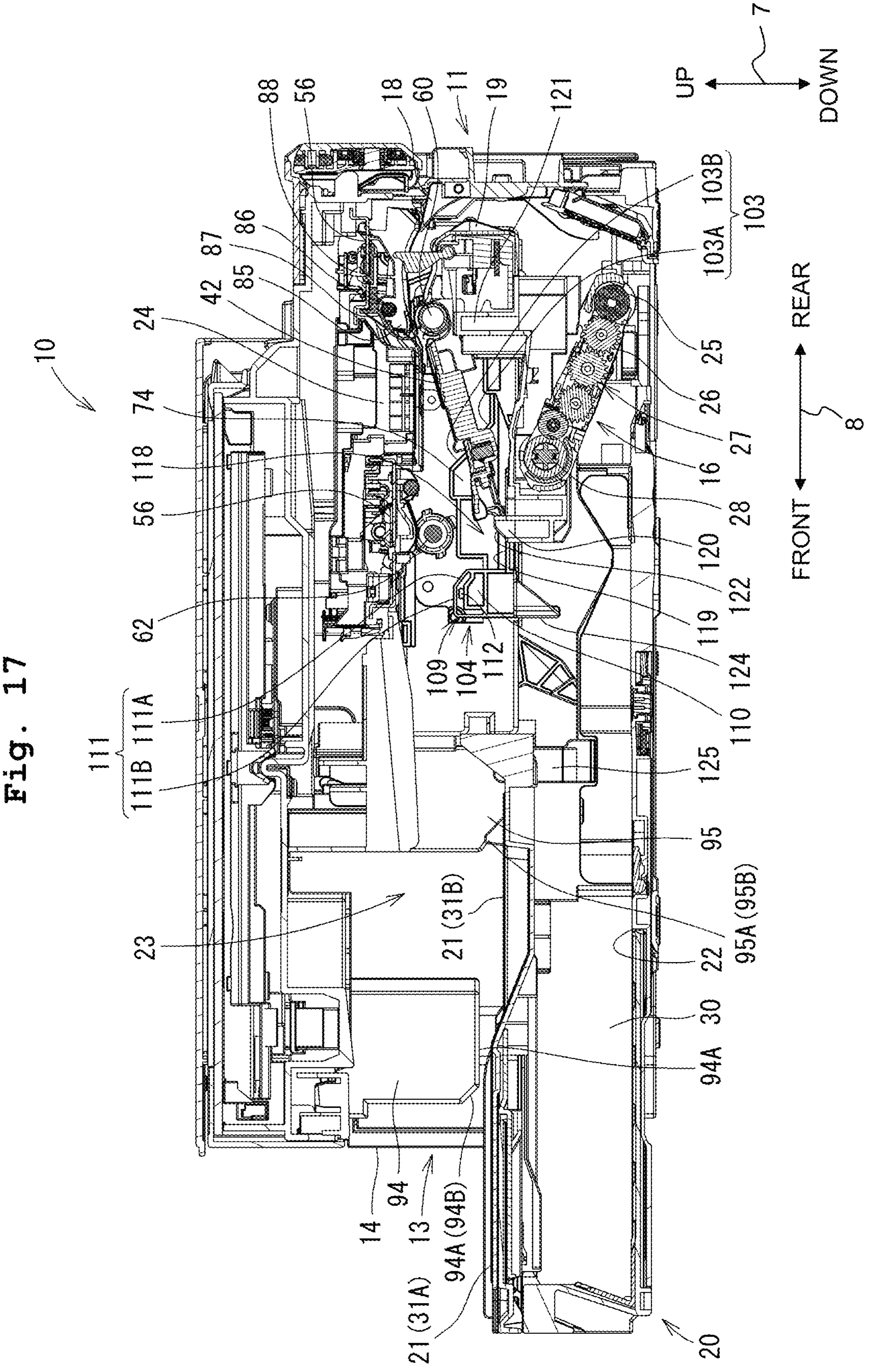
FIG. 17 is a vertical sectional view taken along the center in the left-right direction 9 of the printer part 11 in a state that a conveying roller pair 59 is changed to be in a separated state.

As depicted in FIG. 19, the projection 106 makes contact with the shaft 87 from the back position, and the inclined surface 107 of the projection 106 guides the shaft 87 upwardly in the process in which the slide member 74 slides frontwardly from the position depicted in FIGS. 14 to 16 to the position depicted in FIGS. 17 to 19. Accordingly, the shaft 87 is moved upwardly against the urging force of the coil spring 57 (see FIG. 16). The shaft 87, which moves upwardly, pushes upwardly the surface of the roller holder 85 which comparts the through-hole 86. Accordingly, the roller holder 85 and the pinch roller 61 are moved upwardly, and the pinch roller 61 is separated from the conveying roller 60. As a result, the conveying roller pair 59 undergoes a state change from the nipping state to the separated state.

The guide of the shaft 87 by the inclined surface 107 is started after starting the guide of the projection 50 by the inclined surface 103 and the horizontal surface 123 of the slide member 74. Further, the platen 42 does not arrive at the release position yet at a point in time at which the state change of the conveying roller pair 59 from the nipping state to the separated state is completed. In other words, the rotation of the platen 42 from the printing position to the release position is completed after the completion of the state change of the conveying roller pair 59 from the nipping state to the separated state.

The shaft 87 is firstly guided by the forward end side inclined surface 107A, and then the shaft 87 is guided by the proximal end side inclined surface 107B in the process in which the shaft 87 is guided by the inclined surface 107. The shaft 87, which is in the situation of being guided by the proximal end side inclined surface 107B, is positioned upwardly as compared with the shaft 87 which is in the situation of being guided by the forward end side inclined surface 107A. In other words, the pinch roller 61, which is in such a situation that the forward end side inclined surface 107A makes contact with the shaft 87, is positioned near to the conveying roller 60 as compared with the pinch roller 61 which is in such a situation that the proximal end side inclined surface 107B makes contact with the shaft 87. Therefore, the coil spring 57, which is in such a situation that the shaft 87 is guided by the proximal end side inclined surface 107B, is elongated further as compared with the coil spring 57 which is in such a situation that the shaft 87 is guided by the forward end side inclined surface 107A, wherein the large elastic force acts as the resistance force against the guide of the shaft 87. In this case, the proximal end side inclined surface 107B is inclined gently with respect to the horizontal plane as compared with the forward end side inclined surface 107A. In other words, when the large elastic force acts, the shaft 87 is guided by the gentle proximal end side inclined surface 107B. Therefore, it is possible to decrease the load exerted on the shaft 87. On the other hand, when the large elastic force does not act, the shaft 87 is guided by the steep forward end side inclined surface 107A. Therefore, the shaft 87 can quickly move upwardly.

When the slide member 74 is located at the position depicted in FIGS. 17 to 19, then the shaft 87 passes over the inclined surface 107 of the projection 106, and the shaft 87 is supported by the horizontal surface 108 of the projection 106.

As for the discharge roller pair 44, the discharge roller 62 and the spur 63 are not separated from each other, unlike the conveying roller pair 59. In other words, the discharge roller 62 mutually makes contact with the spur 63 regardless of the positions of the slide member 74 and/or the platen 42, and the discharge roller 62 and the spur 63 maintain the nipping state capable of nipping the recording paper 12.

As depicted in FIG. 18, the first protrusion 94 of the base member 90 is opposed in the up-down direction 7 to the front upper surface 31A of the discharge tray 21. The second protrusion 95 of the base member 90 is opposed in the up-down direction 7 to the cutout 96 of the feed tray 20. Therefore, when the feed tray 20 is lifted upwardly by the user during the frontward movement of the feed tray 20, then the front upper surface 31A makes contact with the lower surface 94A of the first protrusion 94 from the lower position, and thus the lifting of the feed tray 20 is regulated.

As depicted in FIG. 19, the platen 42 is rotated so that the forward end portion thereof is positioned further downwardly, i.e., the platen 42 is further rotated toward the release position by allowing the projection 50 to be guided by the inclined surface 103 of the slide member 74, in the process in which the slide member 74 slides frontwardly from the position depicted in FIGS. 14 to 16 to the position depicted in FIGS. 17 to 19.

The projection 50 is firstly guided by the upper inclined surface 103B, and then the projection 50 is guided by the lower inclined surface 103A in the process in which the projection 50 is guided by the inclined surface 103. The projection 50, which is in the situation of being guided by the lower inclined surface 103A, is positioned downwardly as compared with the projection 50 which is in the situation of being guided by the upper inclined surface 103B. Therefore, the coil spring 48, which is in such a situation that the projection 50 is guided by the lower inclined surface 103A, is shrunk as compared with the coil spring 48 which is in such a situation that projection 50 is guided by the upper inclined surface 103B, wherein the large elastic force acts as the resistance force against the guide of the projection 50. In this case, the lower inclined surface 103A is inclined gently with respect to the horizontal plane as compared with the upper inclined surface 103B. In other words, when the large elastic force acts, the projection 50 is guided by the gentle lower inclined surface 130A. Therefore, it is possible to decrease the load exerted on the projection 50. On the other hand, when the large elastic force does not act, the projection 50 is guided by the steep upper inclined surface 103B. Therefore, the platen 42 can be quickly rotated toward the release position.

When the feed tray 20 is moved frontwardly from the position depicted in FIGS. 17 to 19 to the position depicted in FIGS. 20 to 22, then the respective members are operated as described in detail below, or the respective members are in states described in detail below.

As depicted in FIG. 21, the lever 75 is pushed by the feed tray 20, the lever 75 is moved in the orientation of the arrow 151 from the position depicted in FIG. 18, and the lever 75 is positioned at the front rotation position. In this situation, the lever 75 is positioned outside the cutout 96. The forward end 79A of the lever 75 is supported by the horizontal surface 97A of the upper surface 97 of the side wall 30 of the feed tray 20. The lever 75 can smoothly move to the outside of the cutout 96 by allowing the forward end 79A of the lever 75 to be guided by the inclined surface 96B of the back surface 96A of the cutout 96. The lever 75, which is located at the front rotation position, makes contact with the back lower end part 70A of the third protrusion 70 of the base member 90. Accordingly, the rotation in the orientation of the arrow 151 of the lever 75 at the front rotation position is regulated.

As depicted in FIG. 22, the slide member 74 is pushed by the rotating lever 75, the slide member 74 slides frontwardly from the position depicted in FIGS. 17 to 19, and the slide member 74 is positioned at the front position.

The conveying roller pair 59 is in the separated state.

As depicted in FIG. 21, the front portion of the first protrusion 94 of the base member 90 is opposed in the up-down direction 7 to the front upper surface 31A of the discharge tray 21. The back portion of the first protrusion 94 of the base member 90 is opposed in the up-down direction 7 to the back upper surface 31B of the discharge tray 21. The second protrusion 95 of the base member 90 is opposed in the up-down direction 7 to the cutout 96 of the feed tray 20. Therefore, when the feed tray 20 is lifted upwardly by the user during the frontward movement of the feed tray 20, then the front upper surface 31A makes contact with the lower surface 94A of the first protrusion 94 from the lower position, and thus the lifting of the feed tray 20 is regulated.

Note that when the feed tray 20 is further moved frontwardly from the position depicted in FIG. 21, the back surface 96A, which is the back end of the cutout 96, is located at the same position in the front-rear direction 8 as that of the back end of the lower surface 95A of the second protrusion 95. In this situation, the back end of the front upper surface 31A of the discharge tray 21 is still positioned backwardly as compared with the front end of the lower surface 94A of the first protrusion 94. In other words, when the back surface 96A, which is the back end of the cutout 96, is positioned backwardly from the back end of the lower surface 95A of the second protrusion 95, the back end of the front upper surface 31A of the discharge tray 21 is positioned backwardly from the front end of the lower surface 94A of the first protrusion 94. That is, the first protrusion 94 is opposed in the up-down direction 7 to the front upper surface 31A of the discharge tray 21 in the state in which the second protrusion 95 is opposed in the up-down direction 7 to the cutout 96. Accordingly, when the feed tray 20 is lifted upwardly by the user, then the front upper surface 31A makes contact with the lower surface 94A of the first protrusion 94 from the lower position, and thus the second protrusion 95 is suppressed from deeply entering the cutout 96.

As depicted in FIGS. 20 and 22, the platen 42 is rotated so that the forward end portion thereof is positioned further downwardly and the platen 42 is positioned at the release position by allowing the projection 50 to be guided by the inclined surface 103 of the slide member 74 in the process in which the slide member 74 slides frontwardly from the position depicted in FIGS. 17 to 19 to the position depicted in FIGS. 20 to 22.

As depicted in FIG. 20, the platen 42, which is located at the release position, is positioned backwardly (upstream in the conveying orientation 15) from the wall 120 of the base member 90. The lower portion of the front end portion of the platen 42 enters the recess 118 of the base member 90. The platen 42 is supported by the surface 119 of the base member 90. In this embodiment, the plate member 83, which is attached to the platen 42, makes contact with the surface 119 from the upper position, and thus the plate member 83 is supported by the surface 119. Accordingly, the platen 42 is supported by the base member 90.

The platen 42, which is located at the release position, is positioned below the virtual plane 129 including the inclined surface 122 of the wall 120 of the base member 90 (surface which is inclined upwardly further toward closely to the back in the same manner as the inclined surface 122). In other words, the virtual plane 129 covers the platen 42 located at the release position from the upper position.

After that, although not depicted, the feed tray 20 is further moved frontwardly, and the feed tray 20 is withdrawn from the casing 14. In this situation, when the feed tray 20 is lifted upwardly by the user during the frontward movement of the feed tray 20, then the inclined surface 31C and the back upper surface 31B of the discharge tray 21 and the horizontal surface 97A of the upper surface 97 of the side wall 30 of the feed tray 20 make contact with the lower surface 94A of the first protrusion 94 from the lower positions, and thus the lifting of the feed tray 20 is regulated. When the lever 75 is not supported by the feed tray 20 by further moving the feed tray 20 frontwardly, then the lever 75 is biased by the coil spring 115, and the lever 75 is rotated to the reference position.

Next, an explanation will be made about the operations and the states of the respective members in the process in which the feed tray 20 is inserted into the casing 14. Note that the operations of the respective members in the process in which the feed tray 20 is inserted into the casing 14 (hereinafter referred to as "operations during the insertion") are the operations which are generally converse to the operations of the respective members in the process in which the feed tray 20 is withdrawn from the casing 14 (hereinafter referred to as "operations during the withdrawal"). On this account, the following explanation will be made as follows. That is, if the operation during the insertion is the operation converse to the operation during the withdrawal, the explanation about the operation will be simplified or omitted. If the operation during the insertion is different from the operation which is converse to the operation during the withdrawal, the operation will be explained in detail.

When the back end portion of the side wall 30 of the feed tray 20 approaches the lever 75 located at the reference position in the process in which the feed tray 20 is inserted into the casing 14 by being moved backwardly with respect to the casing 14, the lever 75 enters the recess 99 at the back end portion of the side wall 30 of the feed tray 20 (see FIG. 12). When the feed tray 20 is moved further backwardly, the inclined surface 99A of the feed tray 20 (see FIG. 12) makes contact with the front surface 79C of the forward end part 79 of the lever 75 located at the reference position from the front. The front surface 79C of the forward end part 79 of the lever 75 is pushed backwardly by the inclined surface 99A of the feed tray 20. Accordingly, the lever 75 is rotated in the orientation of the arrow 152 from the reference position, i.e., in the direction directed from the reference position to the side of the back rotation position. After that, the lever 75 passes over the inclined surface 99A in accordance with the backward movement of the feed tray 20, and then the lever 75 is guided by the upper surface 97. In this situation, the lever 75 is guided while being rotated in the orientation of the arrow 151 or the arrow 152 depending on the height of the upper surface 97 with which the lever 75 makes contact.

Figure 23:
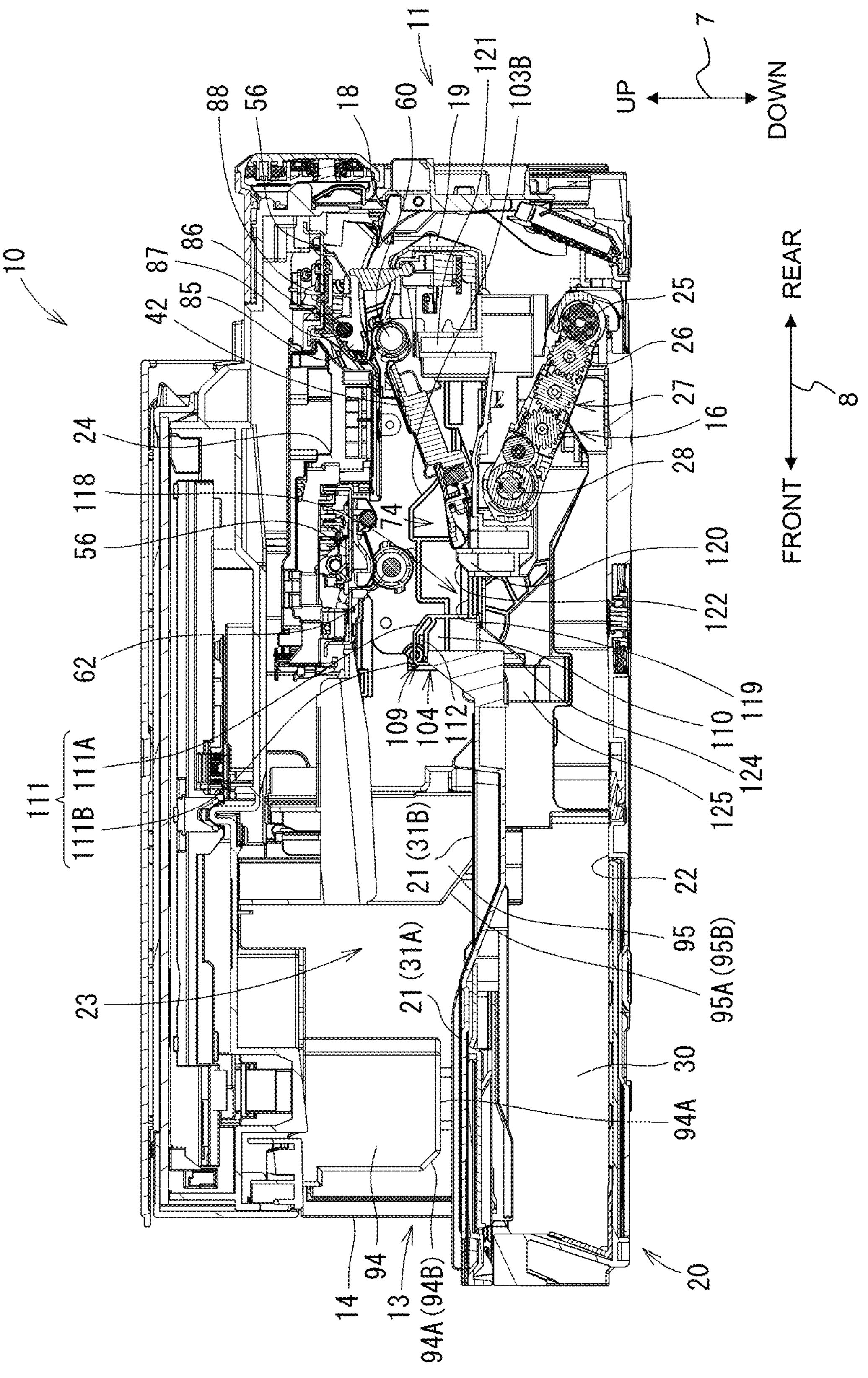
FIG. 23 is a vertical sectional view taken along the center in the left-right direction 9 of the printer part 11 when the feed tray 20 makes contact with the slide member 74 from a front position.
Figure 25:
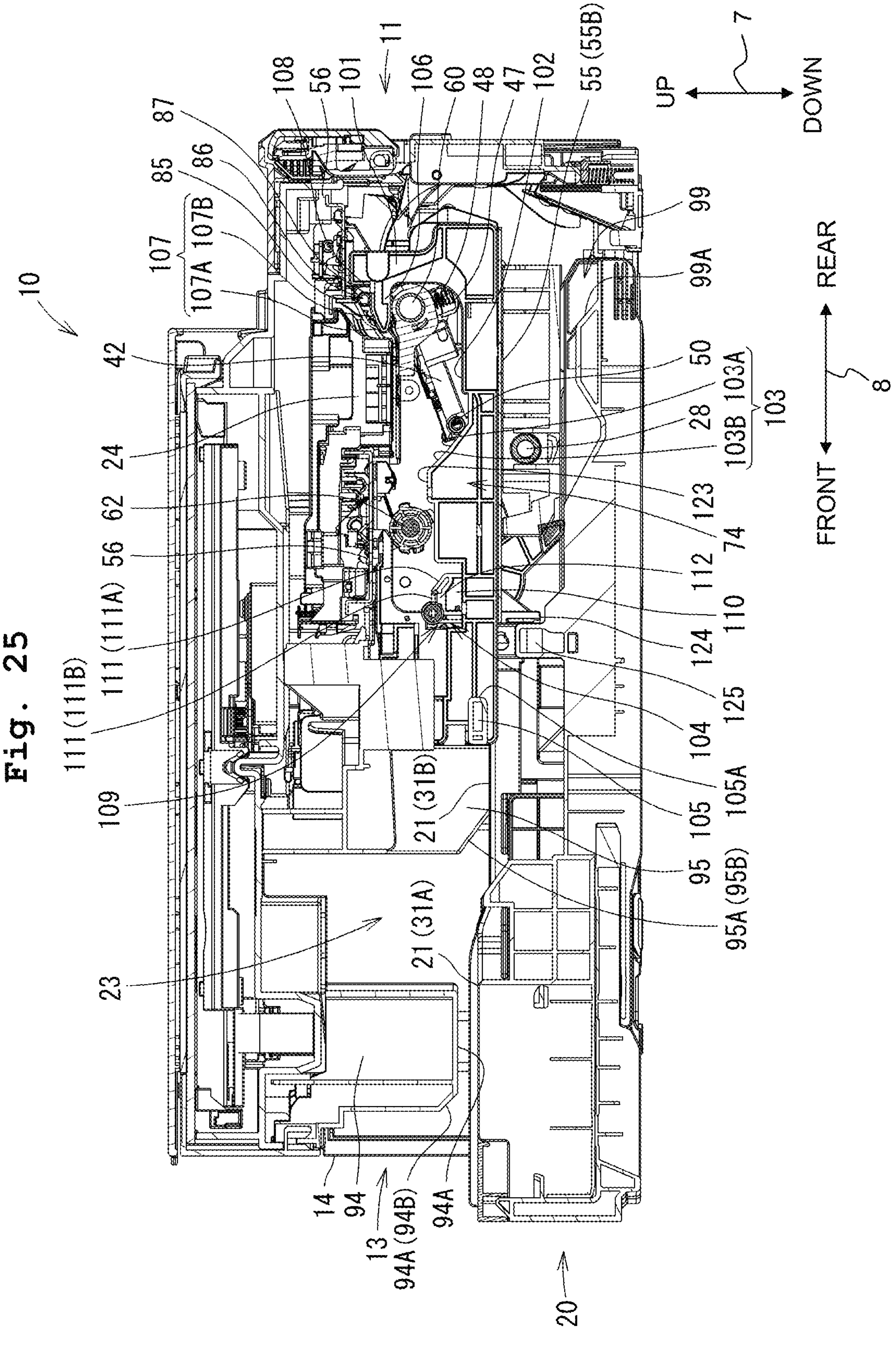
FIG. 25 is a vertical sectional view depicting the printer part 11 at a position at which the right side surface of the platen 42 is viewed when the feed tray 20 makes contact with the slide member 74 from the front position.

When the feed tray 20 is moved further backwardly after the contact of the inclined surface 99A of the feed tray 20 against the lever 75, and the feed tray 20 is inserted until arrival at the position depicted in FIGS. 23 to 25, then the projected part 125 of the feed tray 20 makes contact with the protrusion 124 of the slide member 74 from the front as depicted in FIG. 24. In this situation, the front surface 96C of the cutout 96 of the feed tray 20 is positioned in front of the lever 75 located at the front rotation position indicated by the broken line in FIG. 24. Note that the lever 75 is actually positioned at the reference position in this situation. The lever 75 is not positioned at the front rotation position unless any contingent situation arises, for example, such that the lever 75 is caught by any foreign matter.

When the feed tray 20 is moved further backwardly, the projected part 125 pushes the protrusion 124 backwardly. Accordingly, the slide member 74 slides backwardly from the front position, i.e., from the front position toward the back position.

When the slide member 74 slides backwardly, the projection 50 which is in the state of being supported by the lower inclined surface 103A (see FIG. 22), is guided along the lower inclined surface 103A (see FIG. 19). After that, the projection 50 is guided to the horizontal surface 123 by the aid of the upper inclined surface 103B (see FIG. 16). Accordingly, the platen 42 is rotated from the release position toward the printing position.

The projection 106 is separated from the shaft 87 when the projection 50 is guided by the upper inclined surface 103B, i.e., in the process in which the slide member 74 slides backwardly from the position depicted in FIGS. 17 to 19 to the position depicted in FIGS. 14 to 16. Accordingly, the shaft 87 is biased by the coil spring 57, and the shaft 87 is moved downwardly. Accordingly, the roller holder 85 and the pinch roller 61 are also moved downwardly on account of own weights, and the pinch roller 61 makes contact with the conveying roller 60. As a result, the conveying roller pair 59 undergoes a state change from the separated state to the nipping state.

When the conveying roller pair 59 undergoes the state change to the nipping state, then the protrusion 104 of the slide member 74 is still separated from the projected part 49 of the platen 42, and the protrusion 104 does not support the projected part 49.

When the slide member 74 slides further backwardly to arrive at a predetermined position after the conveying roller pair 59 undergoes the state change to the nipping state, then the protrusion 104 of the slide member 74 makes contact with the projected part 49 of the platen 42. The predetermined position is the position between the front position and the back position. The projected part 49 is guided to the horizontal surface 111B by the aid of the inclined surface 111A of the forward end part 111 of the protrusion 104, and the projected part 49 is finally supported by the horizontal surface 111B of the forward end part 111. In this situation, the projected part 49 is biased upwardly and lifted by the forward end part 111 which functions as the plate spring, and the projected part 49 is pressed against the discharge roller 62. In other words, the projected part 49 is in the state of being vertically sandwiched or interposed by the protrusion 104 and the discharge roller 62. Accordingly, the forward end portion of the platen 42 is definitely positioned in the up-down direction 7 by the side frame 55 by which the discharge roller 62 is supported by the aid of the bearing 72. As a result, as for the platen 42, the forward end portion is also definitely positioned in addition to the back end portion which is definitely positioned regardless of the position of the slide member 74. In this situation, the platen 42 (at the position depicted in FIGS. 11 to 13) is located at the printing position.

When the projected part 49 is lifted by the forward end part 111, the projection 50 is moved upwardly as well. Accordingly, the projection 50 is separated from the horizontal surface 123 of the slide member 74. In other words, when the platen 42 is located at the printing position, then the back end portion and the front end portion thereof are definitely positioned vertically by the side frame 55, and the projection 50 is separated from the slide member 74.

As described above, the inclined surface 103 makes contact with the projection 50 of the platen 42 between the front position and the predetermined position to guide the platen 42 from the release position to the printing position. Further, the protrusion 104 makes contact with the projected part 49 of the platen 42 between the predetermined position and the back position, and thus the platen 42 is guided to the printing position while separating the projection 50 from the inclined surface 103. Then, the protrusion 104 biases the projected part 49 toward the discharge roller 62 when the slide member 74 is located at the back position.

[Retracting Process for Carriage 40]

The controller 190 executes the process (retracting process for the carriage 40) for moving the carriage 40 to the retracted area in accordance with the withdrawal of the feed tray 20 from the casing 14. An explanation will be made below about the retracting process for the carriage 40 with reference to flow charts depicted in FIGS. 28A, 28B, 29A and 29B.

When the feed tray 20 is installed to the casing 14, the electric signal at the low level is outputted to the controller 190 from the optical sensor 173 of the tray sensor 170 (S10: No). When the feed tray 20 is withdrawn from the casing 14, the electric signal at the high level is outputted to the controller 190 from the optical sensor 173 of the tray sensor 170.

If the electric signal, which is acquired from the tray sensor 170, is changed from the low level to the high level, the controller 190 judges that the feed tray 20 is withdrawn from the casing 14 (S10: Yes). As described above, when the feed tray 20 is withdrawn from the casing 14, the platen 42 is rotated from the printing position to the release position.

If the controller 190 judges that the feed tray 20 is withdrawn from the casing 14 (S10: Yes), the controller 190 judges whether or not the carriage 40 is positioned in the opposing area 154 (S20). The process of Step S20 corresponds to the first judging process.

If it is judged that the carriage 40 is not positioned in the opposing area 154 (S20: No), i.e., if it is judged that the carriage 40 is positioned in the retracted area 155 or the retracted area 156, then the carriage 40 stays at the present position (S30), and Step S150 is executed as described later on.

On the other hand, if it is judged that the carriage 40 is positioned at the opposing area 154 (S20: Yes), the controller 190 judges whether or not any machine error occurs. The machine error indicates that the multifunction machine 10 is abnormal. The abnormal situation includes, for example, the clogging with the recording paper 12 in the casing 14 and the abnormal state of the carriage 40. If the machine error occurs (S40: Yes), Step S150 is executed as described later on. If the machine error does not occur (S40: No), the process of Step S50 is executed as described later on.

If the machine error occurs (S40: Yes), for example, such a situation is assumed that the feed tray 20 is withdrawn in order to take out the clogging recording paper 12 on account of the occurrence of the clogging with the recording paper 12 during the printing operation. Usually, if the machine error occurs, the controller 190 moves the carriage 40 to the retracted area 155 or the retracted area 156. In other words, the situation, in which the machine error occurs (S40: Yes), resides in such a case that the carriage 40 cannot be moved to the retracted area 155 or the retracted area 156 on account of the inhibition, for example, by the clogging recording paper 12, although the controller 190 intends to move the carriage 40 to the retracted area 155 or the retracted area 156 upon the occurrence of the machine error. Therefore, in this case, Steps S50 to S140, which accompany the movement of the carriage 40 to the retracted area 155, 156, are skipped.

On the other hand, if the machine error does not occur (S40: No), such a situation is assumed that the feed tray 20 is withdrawn when the printing operation is not executed or when the clogging with the recording paper 12 does not occur although the printing operation is being performed.

If the machine error does not occur (S40: No), the controller 190 judges whether or not the recording paper 12 is present on the platen 42, i.e., whether or not the recording paper 12 is present in the space between the platen 42 and the recording unit 24 (S50). This judgment is made on the basis of the present position of the recording paper 12 on the conveying passage 65 recognized by the pulse signal outputted from the encoder 181 after the acquisition of the electric signal outputted from the sheet sensor 174. Note that this judgment may be made on the basis of the electric signal outputted from the sheet sensor 174. In other words, if it is judged that the recording paper 12 is present at the arrangement position of the sheet sensor 174 by allowing the controller 190 to acquire the high level signal outputted from the sheet sensor 174, it may be judged that the recording paper 12 is positioned on the platen 42 as well. The process of Step S50 corresponds to the first judging process.

When the recording paper 12 is present on the platen 42 (S50: Yes), the controller 190 moves the carriage 40 from the opposing area 154 to the retracted area 155, 156. In this embodiment, the controller 190 decides to what position in any one of the retracted areas 155, 156 the carriage 40 is to be moved as follows.

The controller 190 judges whether the carriage 40 is positioned on the right side (side of the retracted area 155) from the center C (see FIG. 5) of the opposing area 154 in the left-right direction 9 or the carriage 40 is positioned on the left side (side of the retracted area 156) from the center C (S60). The process of Step S60 corresponds to the first judging process.

If the carriage 40 is positioned on the left side from the center C (S60: Yes), the controller 190 moves the carriage 40 leftwardly toward the retracted area 156 (S70). If the carriage 40 arrives at the retracted area 156, i.e., if the movement of the carriage 40 is terminated normally (S80: Yes), then Step S150 is executed as described later on. If the carriage 40 does not arrive at the retracted area 156, i.e., if the movement of the carriage 40 is not terminated normally (S80: No), then the controller 190 moves the carriage 40 rightwardly toward the retracted area 155 (S90). If the carriage 40 arrives at the retracted area 155, i.e., if the movement of the carriage 40 is terminated normally (S130: Yes), then Step S150 is executed as described later on. If the carriage 40 does not arrive at the retracted area 155, i.e., if the movement of the carriage 40 is not terminated normally (S130: No), then the controller 190 stops the carriage 40 then and there to notify the machine error (S140), and then Step S190 is executed as described later on.

The notification is executed by a notifying unit 179 (see FIG. 27). The notifying unit 179 is, for example, a speaker (not depicted) and/or a liquid crystal display (not depicted) provided for the multifunction machine 10. The controller 190 allows the notifying unit 179 to execute the notification as described above. For example, if the notifying unit 179 is the speaker, the notifying unit 179, which receives the instruction of the controller 190, notifies that the machine error occurs by means of any language or any beep sound. Further, for example, if the notifying unit 179 is the liquid crystal display, the notifying unit 179, which receives the instruction of the controller 190, notifies that the machine error occurs by using a screen.

In Step S60, if the carriage 40 is positioned on the right side from the center C (S60: No), the controller 190 moves the carriage 40 rightwardly toward the retracted area 155 (S100). If the carriage 40 arrives at the retracted area 155, i.e., if the movement of the carriage 40 is terminated normally (S110: Yes), then Step S150 is executed as described later on. If the carriage 40 does not arrive at the retracted area 155, i.e., if the movement of the carriage 40 is not terminated normally (S110: No), then the controller 190 moves the carriage 40 leftwardly toward the retracted area 156 (S120). If the carriage 40 arrives at the retracted area 156, i.e., if the movement of the carriage 40 is terminated normally (S130: Yes), then Step S150 is executed as described later on. If the carriage 40 does not arrive at the retracted area 156, i.e., if the movement of the carriage 40 is not terminated normally (S130: No), then the controller 190 stops the carriage 40 then and there to notify the machine error (S140) in the same manner as described above, and then Step S190 is executed as described later on. The processes of Steps S70 to S130 correspond to the movement process.

Note that if the carriage 40 is positioned in the retracted area 155 in the operation up to Step S130, then the cap of the maintenance mechanism is moved upwardly, and the cap covers the nozzles 39 of the recording head 38.

In Step S50, if the recording paper 12 is not present on the platen 42 (S50: No), the processes of Step S100 and followings are executed. In other words, the processes are executed in the same manner as the case (S60: No) in which the carriage 40 is positioned on the right side from the center C in Step S60.

Step S150 is executed after Steps S30, S80, S110, S130. In other words, Step S150 is executed if the carriage 40 is moved to the retracted area 155, 156 (S80, S110, S130), or if the carriage 40 cannot be moved to the retracted area 155, 156 upon the machine error, and the carriage 40 stays in the opposing area 154 (S30).

In Step S150, the controller 190 judges whether or not the recording paper 12 is present on the platen 42, i.e., whether or not the recording paper 12 is present in the space between the platen 42 and the recording unit 24 on the basis of the present position of the recording paper 12 in the conveying passage 65 (S150).

If the recording paper 12 is not present on the platen 42 (S150: No), the controller 190 does not drive the discharge roller 62. After that, Step S190 is executed.

If the recording paper 12 is present on the platen 42 (S150: Yes), the controller 190 drives the discharge roller 62. Accordingly, the discharge roller pair 44 nips the recording paper 12 which is present on the platen 42, and the recording paper 12 is conveyed in the conveying orientation 15 toward the internal space 23. In other words, the controller 190 allows the discharge roller pair 44 to execute the discharge process for discharging the recording paper 12 (S160). The process of Step S160 corresponds to the first conveyance process.

In this situation, the controller 190 controls the conveying motor 73 by generating the driving signal which is at the level lower than the ordinary level of the driving signal. Accordingly, the driving force, which is based on the driving signal at the low level, is transmitted from the conveying motor 73 to the discharge roller 62. The driving signal at the ordinary level is the signal which is generated by the controller 190 in order to control the conveying motor 73 when the recording paper 12 after the image recording performed by the recording unit 24 is conveyed by the discharge roller pair 44 in the conveying orientation 15.

The discharge roller 62, which is rotated by the transmission of the driving force based on the driving signal at the low level, has the rotation speed which is slower than the ordinary rotation speed. The ordinary rotation speed is the rotation speed of the discharge roller 62 which is rotated by the transmission of the driving force based on the driving signal at the ordinary level. In other words, the controller 190 slows the conveying speed of the recording paper 12 brought about by the discharge roller pair 44 in Step S160 as compared with the conveying speed brought about when the discharge roller pair 44 conveys, in the conveying orientation 15, the recording paper 12 after the image recording performed by the recording unit 24.

The controller 190 makes reference to the electric signal acquired from the sheet sensor 174 after the discharge process for the recording paper 12 is executed in Step S160. The controller 190 judges whether or not the electric signal acquired from the sheet sensor 174 is at the high level even when a predetermined time elapses after the execution of the discharge process for the recording paper 12 in Step S160. The predetermined time is, for example, the time which is longer than the time required for the recording paper 12 positioned at the arrangement position of the sheet sensor 174 to be conveyed and discharged into the internal space 23.

After the elapse of the predetermined time, if the electric signal, which is acquired from the sheet sensor 174, is at the high level, i.e., if the sheet sensor 174 is turned ON (S170: Yes), then the controller 190 judges that the recording paper 12, which is judged to be present on the platen 42 in Step S150, still remains on the platen 42. In this case, the controller 190 notifies that the recording paper 12 is subjected to the clogging on the platen 42 (in the space between the platen 42 and the recording unit 24) (S180). The notification is executed in accordance with the means which is the same as or equivalent to that used when the machine error occurs as described above. After that, Step S190 is executed.

After the elapse of the predetermined time, if the electric signal, which is acquired from the sheet sensor 174, is at the low level, i.e., if the sheet sensor 174 is turned OFF (S170: No), then it is judged that the recording paper 12, which is judged to be present on the platen 42 in Step S150, is discharged normally in Step S160. In this case, Step S190 is executed without executing the notification described above.

The controller 190 judges whether or not the feed tray 20 is installed to the casing 14 by making reference to the electric signal acquired from the tray sensor 170 (S190).

If the electric signal, which is acquired from the tray sensor 170, is still at the high level after the change into the high level in Step S10 (S10: Yes), i.e., if the feed tray 20 is not installed to the casing 14 (S190: No), then the controller 190 judges whether or not the carriage 40 is present in the retracted area 155 (S200).

If the carriage 40 is present in the retracted area 155 (S200: Yes), the controller 190 continuously makes reference to the electric signal acquired from the tray sensor 170 (S190).

If the carriage 40 is not present in the retracted area 155 (S200: No), the controller 190 judges whether or not the count time is not less than a threshold time (S210). The count time is the time which undergoes the start of the count-up when the cap of the maintenance mechanism, which has covered the nozzles 39 of the recording head 38, is separated from the nozzles 39 of the recording head 38 and which is reset when the cap covers the nozzles 39. The threshold time is the preset time. The threshold time is set to the time which is obtained by subtracting a certain degree of the allowance time from the time in which the meniscus of the ink of the nozzles 39 may be destroyed, for example, by the drying of the ink in the state in which the nozzles 39 of the recording head 38 are not covered with the cap.

If the count time is less than the threshold time (S210: No), the controller 190 continuously makes reference to the electric signal acquired from the tray sensor 170 (S190). If the count time is not less than the threshold time (S210: Yes), Step S220 is executed. In other words, if the count time is less than the threshold time, the controller 190 waits for the installation of the feed tray 20 to the casing 14. On the other hand, if the count time is not less than the threshold time, the controller 190 executes the processes of Step S220 and followings in order to execute the movement of the carriage 40 to the retracted area 155 (S260) without waiting for the installation of the feed tray 20 to the casing 14 so that the nozzles 39 are covered with the cap in order to avoid the destruction of the meniscus of the ink of the nozzles 39.

In Step S190, if the electric signal, which is acquired from the tray sensor 170, undergoes the change from the high level to the low level, i.e., if the feed tray 20 is installed to the casing 14 (S190: Yes), then Step S220 is executed.

In Step S220, the controller 190 judges whether or not the recording paper 12 is present on the platen 42, i.e., whether or not the recording paper 12 is present in the space between the platen 42 and the recording unit 24, on the basis of the present position of the recording paper 12 in the conveying passage 65. The process of Step S220 corresponds to the second judging process.

If the recording paper 12 is not present on the platen 42 (S220: No), the controller 190 does not drive the discharge roller 62. After that, Step S260 is executed.

If the recording paper 12 is present on the platen 42 (S220: Yes), the controller 190 executes the processes which are approximately the same as or equivalent to those of Steps S160 to S180 described above (S230 to S250). In other words, the controller 190 allows the discharge roller pair 44 to execute the discharge process for the recording process 12 at the speed which is slower than the conveying speed brought about when the recording paper 12 is discharged after the image recording (S230). Then, if the sheet sensor is turned ON after the elapse of the predetermined time (S240: Yes), the retracting process for the carriage 40 is terminated on condition that the notification of the clogging with the recording paper 12 is executed (S250). In this case, the rightward movement of the carriage 40 toward the retracted area 155 (S260) is not executed. On the other hand, if the sheet sensor is turned OFF after the elapse of the predetermined time (S240: No), Step S260 is executed without executing the notification described above. The process of Step S230 corresponds to the second conveyance process. The process of Step S240 corresponds to the third judging process. The process of Step S250 corresponds to the notifying process.

In Step S260, the controller 190 moves the carriage 40 rightwardly toward the retracted area 155.

After that, the controller 190 executes the processes which are the same as or equivalent to those performed in Steps S130, S140 described above (S270, S280). In other words, if the carriage 40 arrives at the retracted area 155, i.e., if the movement of the carriage 40 is terminated normally (S270: Yes), then the controller 190 terminates the retracting process for the carriage 40. If the carriage 40 does not arrive at the retracted area 155, i.e., if the movement of the carriage 40 is not terminated normally (S270: No), then the controller 190 stops the carriage 40 then and there to notify the machine error in the same manner as Step S140 (S270), and then the retracting process for the carriage 40 is terminated.

In the retracting process for the carriage 40 described above, if it is judged in Step S20 that the carriage 40 is positioned in the retracted area 155 or the retracted area 156 (S20: No), the carriage 40 stays at the present position. However, if it is judged in Step S20 that the carriage 40 is positioned in the retracted area 156 (retracted area in which the maintenance mechanism is not arranged), the carriage 40 may be moved toward the retracted area 155 at the timing at which Steps S70, S100 are executed, without allowing the carriage 40 to stay at the present position.

In the retracting process for the carriage 40 described above, when the carriage 40 is positioned in the opposing area 154 (S20), then the carriage 40 is moved leftwardly toward the retracted area 156 (S70) if the carriage 40 is disposed on the left side from the center C (see FIG. 5) (S60: Yes), or the carriage 40 is moved rightwardly toward the retracted area 155 (S100) if the carriage 40 is disposed on the right side from the center C (see FIG. 5) (S60: No). However, if the carriage 40 is positioned in the opposing area 154, the carriage 40 may be moved rightwardly toward the retracted area 155, irrelevant to the position of the carriage 40 in the opposing area 154. Further, if the carriage 40 is positioned in the opposing area 154, the carriage 40 may be moved leftwardly toward the retracted area 156, irrelevant to the position of the carriage 40 in the opposing area 154.

In the retracting process for the carriage 40 described above, if the carriage 40 is positioned in the opposing area 154 (S20: Yes), the controller 190 allows the carriage to be retracted to the retracted area 155, 156 (S70, S100), irrelevant to whether or not the recording paper 12 is present on the platen 42 (S50: Yes, No). However, if the carriage 40 is positioned in the opposing area 154 (S20: Yes), the controller 190 may allow the carriage 40 to be retracted to the retracted area 155, 156 if the recording paper 12 is present on the platen 42. In this case, if the recording paper 12 is not present on the platen 42, it is also allowable that the carriage 40 is not retracted to the retracted area 155, 156.

In the retracting process for the carriage 40 described above, the controller 190 allows, in Steps S160, S230, the discharge roller pair 44 to execute the discharge process for the recording paper 12 at the speed which is slower than the conveying speed brought about when the recording paper 12 is discharged after the image recording performed by the recording unit 24. However, in Steps S160, S230, the controller 190 may allow the discharge roller pair 44 to execute the discharge process for the recording paper 12 at the same speed as the conveying speed brought about when the recording paper 12 is discharged after the image recording performed by the recording unit 24.

Effect of Embodiment

In this embodiment, when the feed tray 20 is withdrawn from the casing 14, the platen 42 is moved to the release position. In other words, it is unnecessary to provide any switch and/or any lever which is/are exclusively usable to move the platen 42 to the release position and which is/are to be operated by the user. The platen 42 can be reliably moved to the release position by merely withdrawing the feed tray 20 from the casing 14.

It is possible to access the space between the platen 42 and the recording unit 24 from the opening 13 via the internal space 23 and the gap 32 by merely withdrawing the feed tray 20 from the casing 14.

When the platen 42 is directly interlocked with the movement of the feed tray 20, for example, when the platen 42 is moved in accordance with the abutment of the moving feed tray 20 against the platen 42, then the occupied space of the feed tray 20 extends to the vicinity of the platen 42. In other words, the feed tray 20 is large-sized. According to this embodiment, the platen 42 is interlocked with the movement of the feed tray 20 by the aid of the slide member 74. In other words, the feed tray 20 can be interlocked with the platen 42 by arranging the slide member 42 between the platen 42 and the feed tray 20. Therefore, it is possible to suppress the feed tray 20 from being large-sized.

According to this embodiment, the lever 75 is rotated to the reference position by the coil spring 115 when the feed tray 20 does not abut thereagainst. Therefore, it is possible to decrease such a possibility that the lever 75 does not return to the reference position while being rotated to the front rotation position and the lever 75 cannot slide the slide member 74.

The side wall 30 is positioned under or below the upper end 13A of the opening 13, and hence it is possible to easily perform the withdrawal of the feed tray 20 from the casing 14 via the opening 13.

According to this embodiment, the platen 42 can be interlocked with the slide (sliding movement) of the slide member 74 by means of the simple configuration based on the use of the inclined surface 103.

Usually, when the image is recorded on the recording paper 12, the feed tray 20 is installed to the casing 14 of the printer unit 11. In this embodiment, the platen 42 is moved to the printing position while being interlocked with the insertion of the feed tray 20 into the casing 14. Therefore, it is possible to avoid such a situation that the printing process is executed without returning the platen 42 to the printing position.

According to this embodiment, the platen 42 is rotated to the release position so that the space is enlarged only on the side near to the opening 13. Therefore, it is possible to maintain the easiness of the access to the space between the recording unit 24 and the platen 42, while suppressing the increase in the range of the space occupied by the rotating platen 42.

According to this embodiment, the upper end 13A of the opening 13 is positioned over or above the platen 42, and the lower end 13B of the opening 13 is positioned under or below the platen 42. Therefore, it is easy to access the space between the recording unit 24 and the platen 42 from the opening 13.

When the electric signal, which is acquired by the controller 190, undergoes the change from the low level to the high level, then the feed tray 20 is withdrawn from the casing 14 (S10), and the platen 42 is moved from the printing position to the release position. If the carriage 40 is positioned in the opposing area 154 when the platen 42 is positioned at the release position, then it is feared that the hand of the user who accesses the space between the platen 42 and the recording unit 24 via the opening 13 and the internal space 23 may touch the recording head 38.

In view of the above, in this embodiment, the carriage 40 is moved to the retracted area 155 (S70 to S130) on condition that the platen 42 is moved from the printing position to the release position (S10). Accordingly, it is possible to prevent the hand of the user from touching the recording head 38.

When the electric signal, which is acquired by the controller 190, undergoes the change from the low level to the high level, then the feed tray 20 is withdrawn from the casing 14, and the platen 42 is moved from the printing position to the release position. When the platen 42 is moved, it is feared that the attitude of the recording paper 12 supported by the platen 42 may be changed, and the recording paper 12 may touch the recording head 38.

In view of the above, in this embodiment, the carriage 40 is moved to the retracted area 155 (S70 to S130) on condition that the platen 42 is moved from the printing position to the release position (S10). Accordingly, it is possible to prevent the recording paper 12 from touching the recording head 38.

If the discharge roller pair 44 is driven although the recording paper 12 to be conveyed is absent, the discharge roller pair 44 does not exhibit the function to convey the recording paper 12. In this embodiment, when the recording paper 12 is not present on the platen 42, the controller 190 does not drive the discharge roller 62. It is possible to avoid any useless driving of the discharge roller pair 44 as described above.

If the recording paper 12, which is present in the space between the platen 42 and the recording unit 24, is conveyed when the platen 42 is positioned at the release position, the recording paper 12 is not conveyed in the assumed orientation (orientation in which the recording paper 12 is to be conveyed when the platen 42 is positioned at the printing position). For example, it is feared that the recording paper 12, which is to be conveyed horizontally, may be conveyed obliquely upwardly or obliquely downwardly. In this situation, if the carriage 40 is positioned in the opposing area 154, it is feared that the conveyed recording paper 12 may abut against the recording head 38 and the nozzles 39 may be damaged.

In view of the above, in this embodiment, the recording paper 12, which is present in the space between the platen 42 and the recording unit 24, is conveyed frontwardly (S160) after the carriage 40 is moved to the retracted area 155 (S70 to S130). Accordingly, it is possible to prevent the conveyed recording paper 12 from abutting against the recording head 38.

If the recording paper 12, which is present in the space between the platen 42 and the recording unit 24, is conveyed when the platen 42 is positioned at the release position, the recording paper 12 is not conveyed in the assumed orientation (orientation in which the recording paper 12 is to be conveyed when the platen 42 is positioned at the printing position). Accordingly, it is feared that the space may be clogged with the conveyed recording paper 12. In this configuration, the conveying speed of the recording paper 12 in Step S160 is slower than the ordinary conveying speed (conveying speed of the recording paper 12 after the image recording). Therefore, it is possible to reduce the clogging with the recording paper 12 in the space.

The carriage 40 is moved to the nearer retracted area of the retracted area 155 and the retracted area 156 (S60, S70, S100). Therefore, it is possible to quickly move the carriage 40 to the retracted area 155, 156.

The platen 42 is positioned at the release position during the withdrawal of the feed tray 20. Therefore, it is feared that any positional deviation may occur, for example, on account of such a situation that the recording paper 12 is touched by the user. In this embodiment, when the feed tray 20 is installed again after being withdrawn (S190: Yes), it is possible to discharge the recording paper 12 (recording paper 12 with the fear of any positional deviation) remaining in the space between the platen 42 and the recording unit 24 in the second conveyance process (S230). Further, if the recording paper 12 is not discharged (S240: Yes), it is possible to notify the user of such a situation by means of the notifying unit 179 (S250).

When one of the insertion and the withdrawal of the feed tray 20 with respect to the casing 14 is executed, the slide member 74 slides while being interlocked with the feed tray 20 by the aid of the lever 75. On the other hand, when the other of the insertion and the withdrawal of the feed tray 20 with respect to the casing 14 is executed, the slide member 74 slides while making abutment against the feed tray 20 without using the lever 75. Accordingly, it is possible to decrease the rotation amount of the lever 75 when the other of the insertion and the withdrawal of the feed tray 20 with respect to the casing 14 is executed. Therefore, the necessary amount of the space is decreased in order to rotate the lever 75. As a result, it is possible to suppress the printer unit 11 from being large-sized.

The lever 75 can be allowed to abut against the slide member 74 by using the small rotation amount owing to the provision of the protrusion 80.

The protruding end surface 80A of the protrusion 80 is the curved surface. Therefore, the force, which acts on the slide member 74 from the lever 75, has the vector which can be allowed to approach the orientation parallel to the front-rear direction 8, irrelevant to the attitude of the lever 75 in the process in which the feed tray 20 is withdrawn. It is possible to reliably move the slide member 74 from the back position to the front position.

The rotation amount of the lever 75, which is brought about when one of the insertion and the withdrawal of the feed tray 20 with respect to the casing 14 is executed, can be relatively increased, while the rotation amount of the lever 75, which is brought about when the other of the insertion and the withdrawal of the feed tray 20 with respect to the casing 14 is executed, can be relatively decreased, without changing the total rotation amount of the lever 75. When the rotation amount of the lever 75, which is brought about when one of the insertion and the withdrawal of the feed tray 20 with respect to the casing 14 is executed, is relatively increased, it is thereby possible to increase the slide amount of the slide member 74 brought about by the abutment against the lever 75.

The lever 75 can be firmly supported by supporting the lever 75 by the two members of the side frame 55 and the base member 90.

The error, which is brought about when the lever 75 is assembled to the side frame 55 and the base member 90, can be absorbed by the difference in the diameter between the hole 77 and the aperture 78. The lever 75 is definitely positioned by the side frame 55 made of the metal material provided with the aperture 78 having the small diameter. Therefore, it is possible to enhance the positional accuracy of the lever 75.

The side frame 55 can be firmly supported. It is possible to reduce the positional deviation between the side frame 55 and the base member 90. Therefore, it is possible to enhance the positional accuracy of the lever 75.

When the slide member 74 is disposed at the back position, the protrusion 104 biases the projection 49 toward the discharge roller 62. Therefore, the platen 42 can be definitely positioned by the discharge roller 62. Accordingly, it is possible to maintain the high positioning accuracy of the platen 42 with respect to the recording unit 24.

The inclined surface 111A can abut against the projection 49 to guide the projection 49 to the position at which the projection 49 can be biased by the protrusion 104, in the slide process of the slide member 74 from the front position to the back position.

The projection 49 can be biased to the discharge roller 62 without providing any distinct member such as a coil spring or the like.

The through-hole 109 can be partially narrowed by the projection 112. Therefore, it is possible to reduce the plastic deformation of the forward end section 111 of the protrusion 104.

It is possible to reduce the deformation in the left-right direction 9 of the slide member 74 by engaging the slide member 74 with the base member 90 by means of the protrusion 105. Note that the deformation in the left-right direction 9 of the slide member 74 is apt to be caused when the projection 49 is biased to the discharge roller 62 by the protrusion 104.

The platen 42 is biased to the conveying roller 60 by the abutment piece 47 and the coil spring 48 in addition to the urging action to the discharge roller 62 by the protrusion 104. Accordingly, the platen 42 can be definitely positioned by both of the discharge roller 62 and the conveying roller 60.

The upper surface 46A of the projection 46 abuts against the side frame 55 or the bearing 71 irrelevant to the rotation position of the platen 42. Therefore, the platen 42 can be definitely positioned by the conveying roller 60 irrelevant to the rotation position of the platen 42.

Both of the discharge roller 62 and the conveying roller 60 are definitely positioned by the side frame 55. Therefore, it is possible to reduce the relative positional deviation between the discharge roller 62 and the conveying roller 60.

The plate member 83 functions as the weight, and thus it is easy for the platen 42 to rotate to the release position. It is possible to reinforce the platen 42 by means of the plate member 83.

It is possible to stabilize the attitude of the platen 42 at the release position.

It is possible to definitely position the platen 42 accurately at the release position.

When the internal space 23 is visually recognized from the opening 13 in the state in which the platen 42 is rotated to the release position, the wall 120 is present in front of the end portion in the conveying orientation 15 of the platen 42. Therefore, it is possible to lower the possibility for the hand of the user to touch the end portion in the conveying orientation 15 of the platen 42 when the platen 42 is rotated to the release position.

According to this embodiment, it is possible to induce the hand of the user who intends to take out the recording paper 12 so that the hand is directed upwardly at positions nearer to the upstream in the conveying orientation 15 along with the upper surface of the wall 120. Accordingly, it is possible to lower the possibility for the hand of the user to touch the platen 42.

Owing to the provision of the rib 45 for the platen 42, the area, in which the conveyed recording paper 12 is brought in contact with the platen 42, is decreased. Therefore, the friction is decreased between the recording paper 12 and the platen 42, and it is possible to smoothly convey the recording paper 12.

The rib 45 is provided with the side section 45B. On this account, the recording paper 12, which is conveyed on the upper section 45A of the rib 45, is easily induced to the discharge roller pair 44. When the platen 42 is disposed at the printing position, the lower end of the side section 45B is positioned over or above the lower end of the shaft 64. Therefore, it is possible to lower the possibility to draw any foreign matter into the gap between the side section 45B and the discharge roller 62.

It is unnecessary to provide any mechanism for separating the discharge roller 62 and the spur 63 which constitute the discharge roller pair 44.

If the feed tray 20 is inserted into the casing 14 in any orientation other than the backward orientation (for example, an orientation inclined with respect to the backward orientation), or if the feed tray 20 is withdrawn from the casing 14 in any orientation other than the frontward orientation (for example, an orientation inclined with respect to the frontward orientation), then it is feared that the feed tray 20 may approach the lever 75 positioned thereover or thereabove. However, even when the feed tray 20 approaches the lever 75, the lever 75 enters the cutout 96 in this embodiment. Accordingly, it is possible to lower the possibility of the interference between the lever 75 and the feed tray 20.

If any malfunction arises when the feed tray 20 is withdrawn from the casing 14, it is feared that the lever 75 may stay at the front rotation position without returning to the reference position from the front rotation position. If the feed tray 20 is inserted into the casing 14 in this state, it is feared that the slide member 74, which slides while being interlocked with the insertion of the feed tray 20, may push and rotate the lever 75 disposed at the front rotation position. Then, it is feared that the rotated lever 75 may abut against the side wall 30 of the feed tray 20 and the lever 75 and/or the side wall 30 may be broken. In this embodiment, when the slide member 74 abuts against the lever 75 disposed at the front rotation position, the lever 75 disposed at the front rotation position is positioned just over the cutout 96. Therefore, the lever 74, which is rotated as described above, enters the cutout 96. Therefore, it is possible to lower the possibility of being broken as described above.

The position of the lever 75 is the same as that of the side wall 30 in the left-right direction 9. Therefore, it is possible to miniaturize the printer unit 11 in the left-right direction 9 as compared with the embodiment in which the position of the lever 75 is different from that of the side wall 30 in the left-right direction 9.

If any malfunction arises when the feed tray 20 is inserted into the casing 14, it is feared that the lever 75 may stay at the back rotation position without returning to the reference position from the back rotation position even when the feed tray 20 is disposed at the position of being installed to the casing 14. If the lever 75 is rotated toward the reference position, for example, on account of the vibration of the multifunction machine 10 in this state, it is feared that the rotated lever 75 may abut against the side wall 30 of the feed tray 20 and the lever 75 and/or the side wall 30 may be broken. In this embodiment, when the feed tray 20 is disposed at the position of being installed to the casing 14, the lever 75 disposed at the back rotation position is positioned just over the cutout 96. Therefore, the lever 74, which is rotated as described above, enters the cutout 96. Therefore, it is possible to lower the possibility of being broken as described above.

When the feed tray 20 is disposed at the position of being installed to the casing 14, the space, in which a part of the lever 75 disposed at the reference position is positioned, is shared with the space in which the cutout 96 is positioned. Therefore, it is possible to miniaturize the vertical size of the printer unit 11 as compared with the embodiment in which the lever 75 disposed at the back rotation position is positioned over or above the side wall 30.

When the feed tray 20 is inserted or withdrawn with respect to the casing 14, the upward movement of the feed tray 20 is regulated by the lower surface 94A of the first protrusion 94 and the lower surface 95A of the second protrusion 95. Accordingly, it is possible to lower the possibility to allow the feed tray 20 to push the lever 75 from the lower position and unexpectedly move the lever 75.

Even when the feed tray 20 is moved upwardly, for example, on account of the oblique insertion or withdrawal of the feed tray 20 with respect to the casing 14, the horizontal surface 97A and the front upper surface 31A abut against the lower surface 94A of the first protrusion 94 and the lower surface 95A of the second protrusion 95, before the feed tray 20 abuts against the lever 75 to rotate the lever 75 upwardly from the front rotation position. Accordingly, it is possible to prevent the lever from being rotated upwardly from the front rotation position and prevent the lever 75 from being broken.

The lower surface 94A of the first protrusion 94 and the lower surface 95A of the second protrusion 95 abut against the feed tray 20 at the two points. Therefore, it is possible to stabilize the attitude of the feed tray 20.

When the feed tray 20 is withdrawn from the casing 14, the upward movement of the feed tray 20 is regulated by the lower surface 94A during the period in which the lower surface 95A is disposed at the position at which the lower surface 95A may enter the cutout 96. Accordingly, it is possible to prevent the lower surface 95A from entering the cutout 96 and avoid the inhibition of the movement of the feed tray 20.

Any unexpected rotation of the lever 75 is avoided by the back lower end section 70A of the third protrusion 70. Therefore, it is possible to lower the possibility to break the lever 75.

It is possible to lower the possibility to allow the end portion in the backward orientation of the upper surface of the feed tray 20 to collide with the lever 75 during the insertion of the feed tray 20 into the casing 14.

When the lever 75 is not pushed by the feed tray 20 upon the abutment, the lever 75 is rotated to the reference position by the coil spring 115. The lever 75, which is disposed at the reference position, can be rotated in both of the backward orientation and the frontward orientation until the lever 75 arrives at the front rotation position or the back rotation position. Therefore, it is possible to lower the possibility to break the lever 75, which would be otherwise caused such that the lever 75 intends to rotate to any position to which the lever 75 cannot be rotated.

<Modifications>

In the embodiment described above, the lever 75 is biased to the reference position by the coil spring 115. However, the lever 75 may be biased to the reference position by the own weight.

In the embodiment described above, the forward end part 79 of the lever 75 is positioned under or below the shaft 76. However, the forward end part 79 of the lever 75 may be positioned over or above the shaft 76. In this case, the forward end 79A, which is disposed when the lever 75 is positioned at the front rotation position, is positioned frontwardly and downwardly as compared with when the lever 75 is positioned at the reference position. The forward end 79A, which is disposed when the lever 75 is positioned at the back rotation position, is positioned backwardly and downwardly as compared with when the lever 75 is positioned at the reference position.

The two levers 75 are provided corresponding to the provision of the two side walls 30 and the two slide members 74 of the feed tray 20. Then, usually, the amounts of rotation of the two levers 75 from the reference positions to the front rotation positions are identical with each other, and the amounts of rotation of the two levers 75 from the reference positions to the back rotation positions are identical with each other. However, the amounts of rotation of the two levers 75 may be different from each other. For example, when the configurations of the two side walls 30 and the two slide members 74 differ between the left and the right, the amounts of rotation of the two levers 75 may be adjusted depending on the configurations. As a result, the amounts of rotation of the two levers 75 may be different from each other.

In the embodiment described above, the lever 75, which is located at the front rotation position, is regulated for the rotation in the orientation of the arrow 151 by making contact with the back lower end part 70A of the third protrusion 70 of the base member 90 (see FIG. 21). However, it is also allowable to adopt such configuration that the lever 75, which is located at the front rotation position, may be further rotatable in the orientation of the arrow 151 by providing no third protrusion 70 of the base member 90 or by providing a position of the third protrusion 70 which is different from that provided in the embodiment described above.

In this case, when at least one of the lower surface 94A of the first protrusion 94 and the lower surface 95A of the second protrusion 95 is opposed in the up-down direction 7 to at least one of the front upper surface 31A of the discharge tray 21 and the horizontal surface 97A of the side wall 30 of the feed tray 20, it is desirable that the spacing distance in the up-down direction 7 between the opposing both is configured to be smaller than the spacing distance in the up-down direction 7 between the lever 75 at a limit rotation position and the feed tray 20.

In this context, the term "limit rotation position" means a position which is designated as the position brought about when the lever 75 is rotated in the maximum amount in the orientation of the arrow 151 from the reference position. For example, the limit rotation position is a position at which it is feared that the lever 75 and/or the coil spring 115 might be damaged, destroyed or broken if the lever 75 is rotated in the orientation of the arrow 151 while exceeding the limit rotation position. Further, for example, the limit rotation position is a certain position brought about when the lever 75 makes contact with the member for regulating the rotation at the certain position at which the lever 75 is rotated in the orientation of the arrow 151 while exceeding the front rotation position. In this case, the limit rotation position is an example of the second position.

Figure 28A:
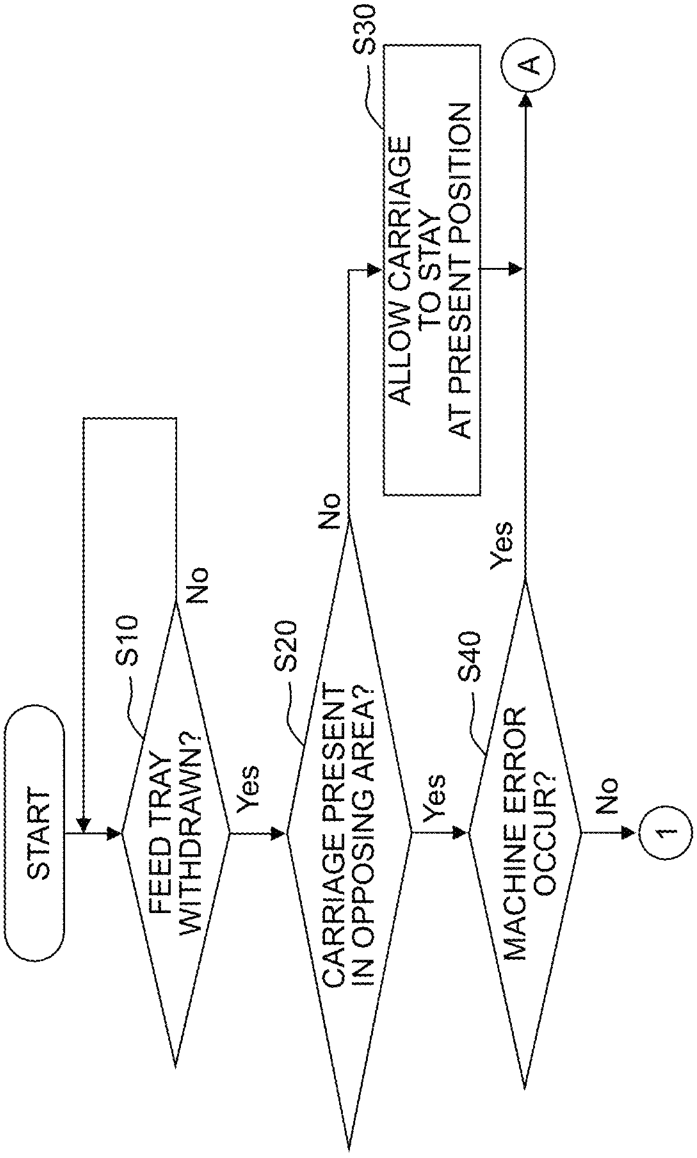
FIGS. 28A and 28B depict a flow chart illustrating a retracting process for a carriage 40.
Figure 28B:
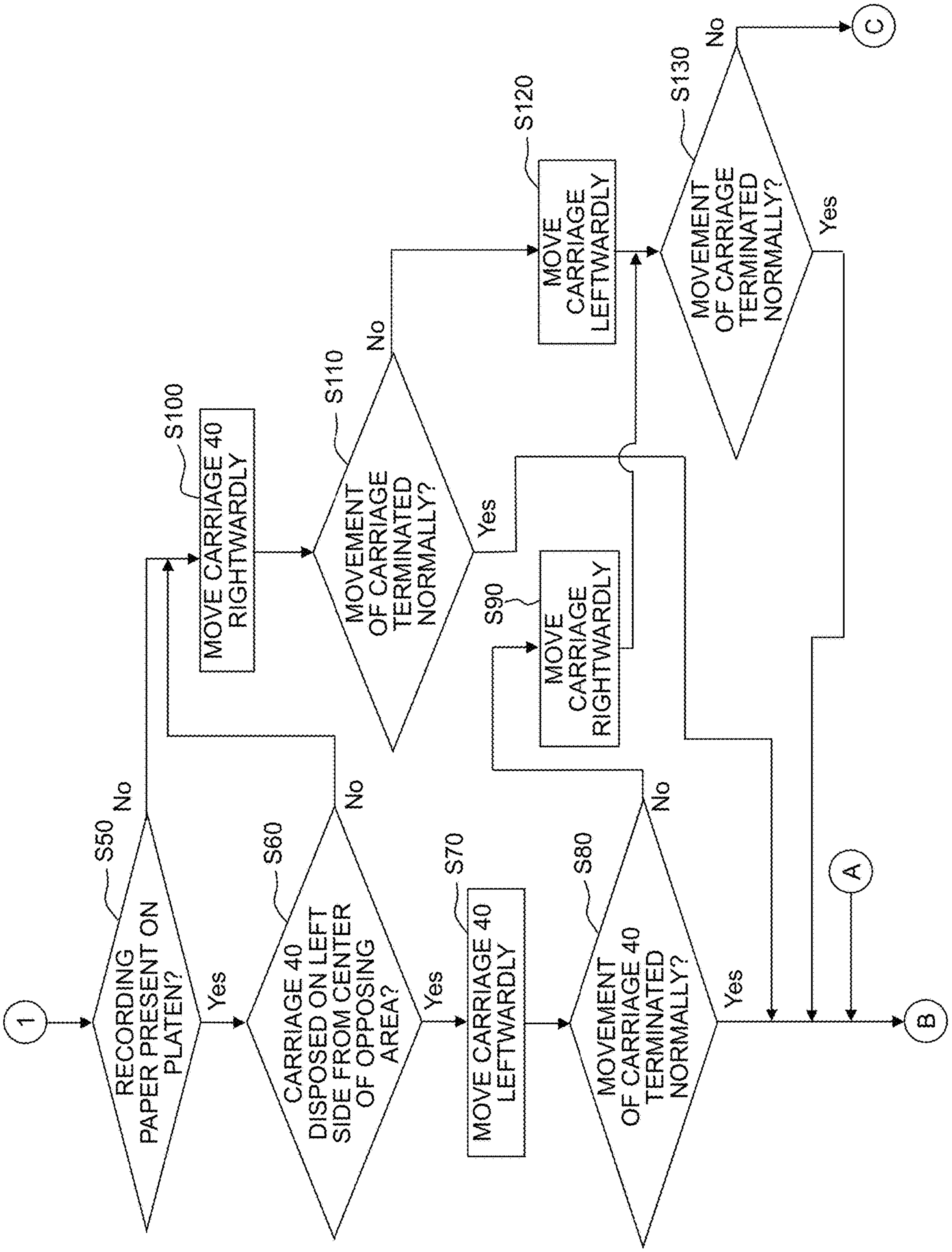

The platen 42 may be rotated about any axis or shaft which is different from that of the conveying roller 60. For example, the platen 42 may be rotated about the axis of the pinch roller 61. Further, for example, as depicted in FIGS. 28A and 28B, the platen 42 may be rotated about the axis of the discharge roller 62. In this case, when the platen 42 is located at the release position, the back end part 67 of the upper surface of the platen 42 (support surface for supporting the recording paper 12) is positioned downwardly as compared with when the platen 42 is located at the printing position, as indicated by the broken line in FIGS. 28A and 28B.

Figure 29A:
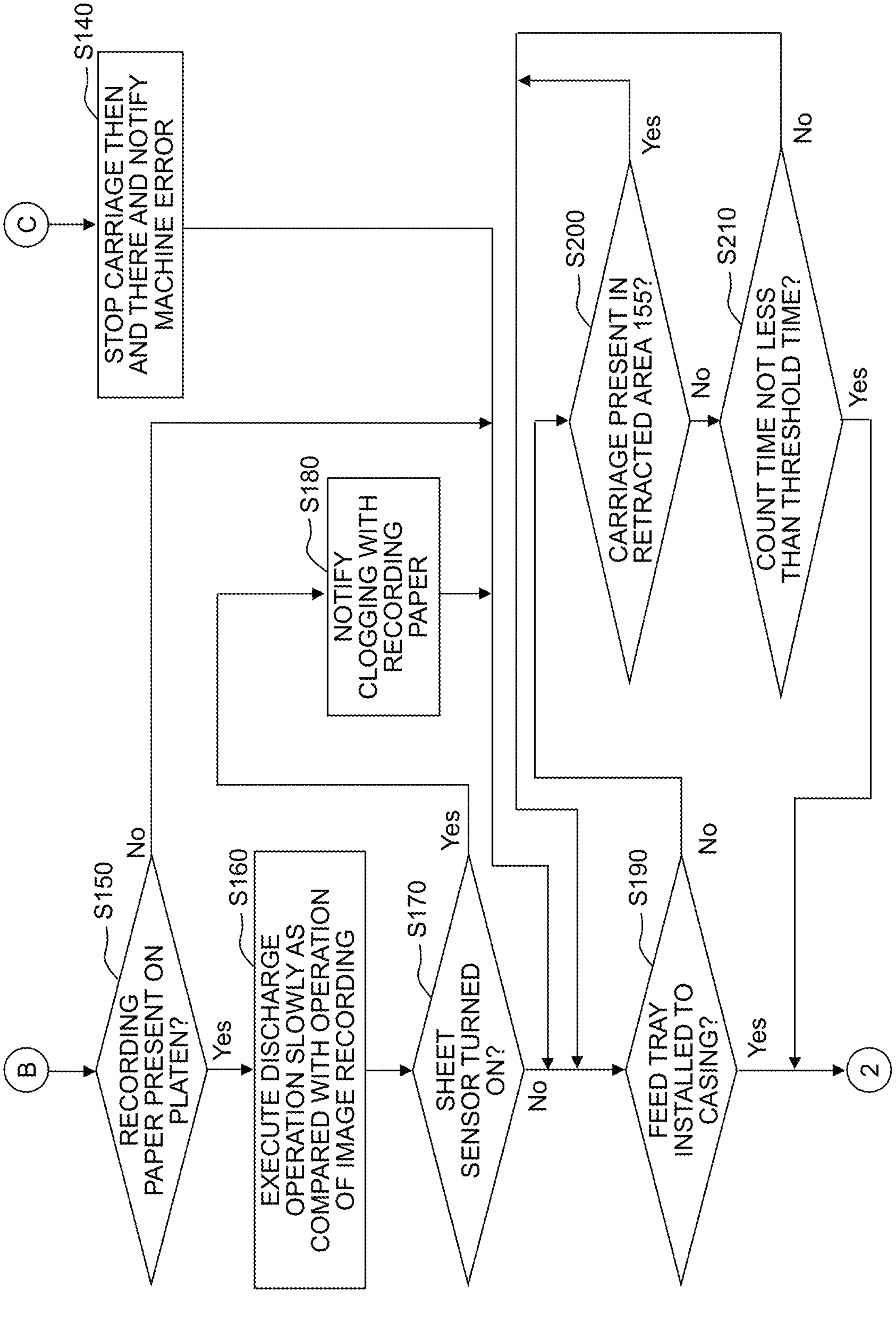
FIGS. 29A and 29B depict a flow chart illustrating the retracting process for the carriage 40.
Figure 29B:
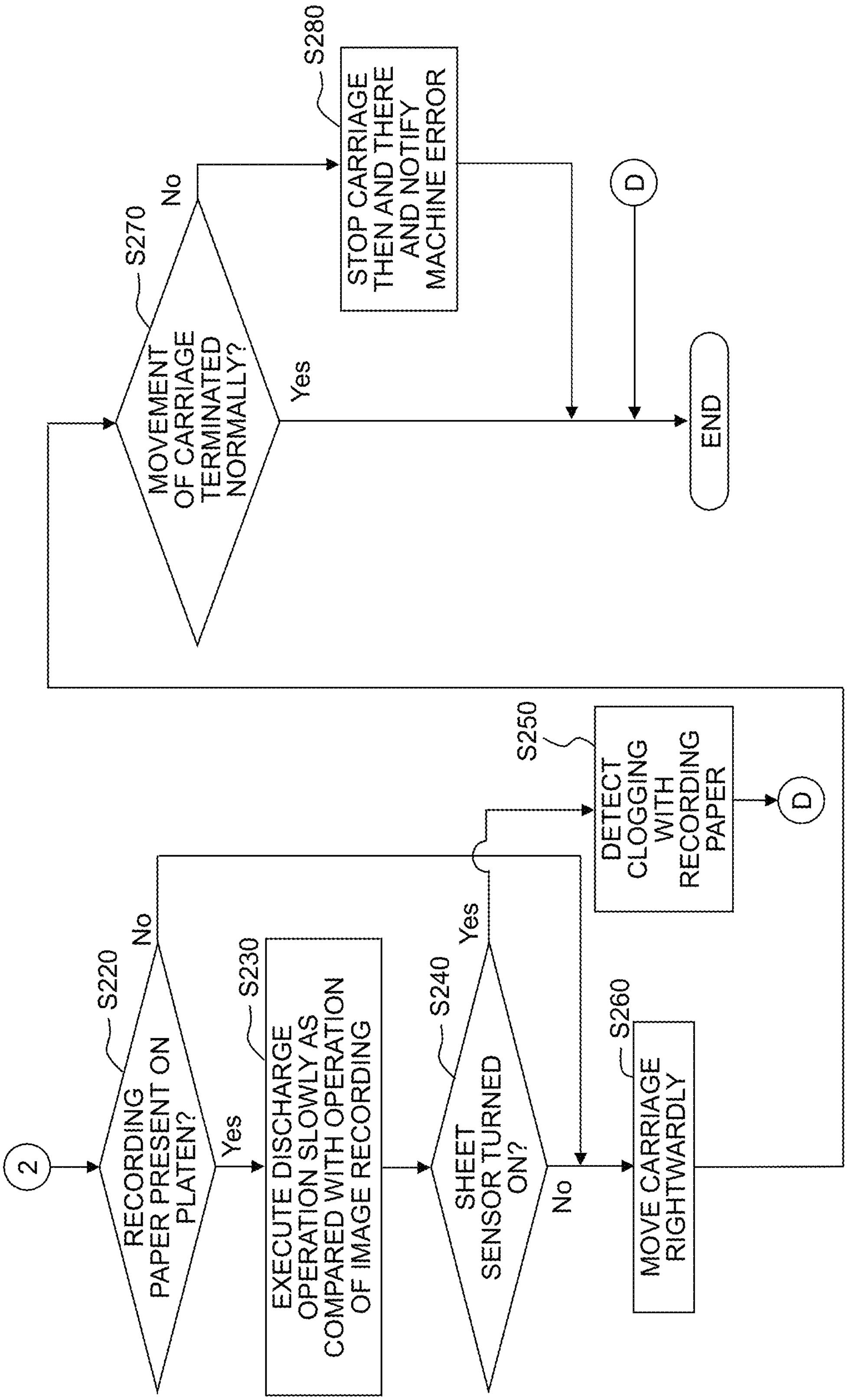

The platen 42 may be moved to the printing position and the release position by any means which is different from the rotation, for example, by a slide (sliding movement) in the up-down direction 7 as depicted in FIGS. 29A and 29B. In this case, when the platen 42 is located at the release position, the platen 42 is positioned downwardly as compared with when the platen 42 is located at the printing position, as indicated by the broken line in FIGS. 29A and 29B. In other words, the front end part 66 and the back end part 67 of the upper surface of the platen 42 are positioned downwardly as compared with when the platen 42 is located at the printing position.

In the embodiment described above, the conveying roller 60 is arranged under or below the straight part 34, and the pinch roller 61 is arranged over or above the straight part 34. However, conversely to the embodiment described above, the conveying roller 60 may be arranged over or above the straight part 34, and the pinch roller 61 may be arranged under or below the straight part 34. In this case, the slide member 74 is configured to move the pinch roller 61 downwardly by guiding the shaft 87 downwardly while being interlocked with the frontward movement. Further, in this case, the platen 42 is rotated about the axis of the pinch roller 61.

The projection 50 of the platen 42 depicted in FIGS. 6 and 8 may be rotatable about an axis extending in the left-right direction 9. In other words, the projection 50 may be a roller which is rotatably supported by the central part 162 of the platen 42.

A buffer material may be attached to the platen 42. The buffer material is, for example, a porous material such as a sponge, etc. For example, the plate member 83, which is composed of the metal in the embodiment described above, may be composed of a porous material in place of the metal. Thus, the plate member 83 functions as the buffer material. It is a matter of course that the platen 42 may be provided with the buffer material separately from the plate member 83 composed of the metal. In this case, when the platen 42 is located at the release position, the buffer material, instead of the plate member 83, makes contact with the surface 119 from the upper position, and thus the platen 42 at the release position is supported by the base member 90.

It is also allowable that the platen 42 is not provided with the ribs 43, 45. In this case, the support surface for the recording paper 12 is the upper surface of the platen 42.

In the embodiment described above, when the feed tray 20 is withdrawn from the casing 14, then the lever 75, which makes contact with the feed tray 20 and which is rotated, makes contact with the slide member 74, and thus the slide member 74 slides from the back position to the front position. When the feed tray 20 is inserted into the casing 14, then the feed tray 20 makes contact with the slide member 74, and thus the slide member 74 slides from the front position to the back position.

However, inversely to the above, the following configuration is also available. That is, when the feed tray 20 is inserted into the casing 14, then the lever 75, which makes contact with the feed tray 20 and which is rotated, abuts against the slide member 74, and thus the slide member 74 slides from the front position to the back position. When the feed tray 20 is withdrawn from the casing 14, then the feed tray 20 makes contact with the slide member 74, and thus the slide member 74 slides from the back position to the front position without using the lever 75. In this case, it is preferable that the forward end part 79 of the lever 75 (portion of the lever 75 entering into the cutout 96) is positioned frontwardly as compared with the shaft 76 (in the case of the embodiment described above, the forward end part 79 is positioned backwardly as compared with the shaft 76) when the lever 75 is positioned at the reference position.

Further, in both of the situations upon the insertion of the feed tray 20 into the casing 14 and upon the withdrawal of the feed tray 20 from the casing 14, the rotated lever 75, with which the feed tray 20 makes contact, may make contact with the slide member 74, and thus the slide member 74 may slide. Further, in both of the situations upon the insertion of the feed tray 20 into the casing 14 and upon the withdrawal of the feed tray 20 from the casing 14, the feed tray 20 may make contact with the slide member 74, and thus the slide member 74 may slide without using the lever 75.

Note that when the slide member 74 slides from the front position to the back position by allowing the lever 75 to make contact with the slide member 74 upon the insertion of the feed tray 20 into the casing 14, the slide member 74 is provided with a projection 142 which projects or protrudes in the left-right direction 9 and which is located at the position at which the lever 75 makes the contact therewith from the front position, for example, as depicted by the broken line in FIG. 15.

In the embodiment described above, the platen 42 is moved to the printing position and the release position by allowing the slide member 74 to slide in the front-rear direction 8. However, the platen 42 may be moved to the printing position and the release position while being interlocked with the movement of any member which is different from the slide member 74.

Figure 26:
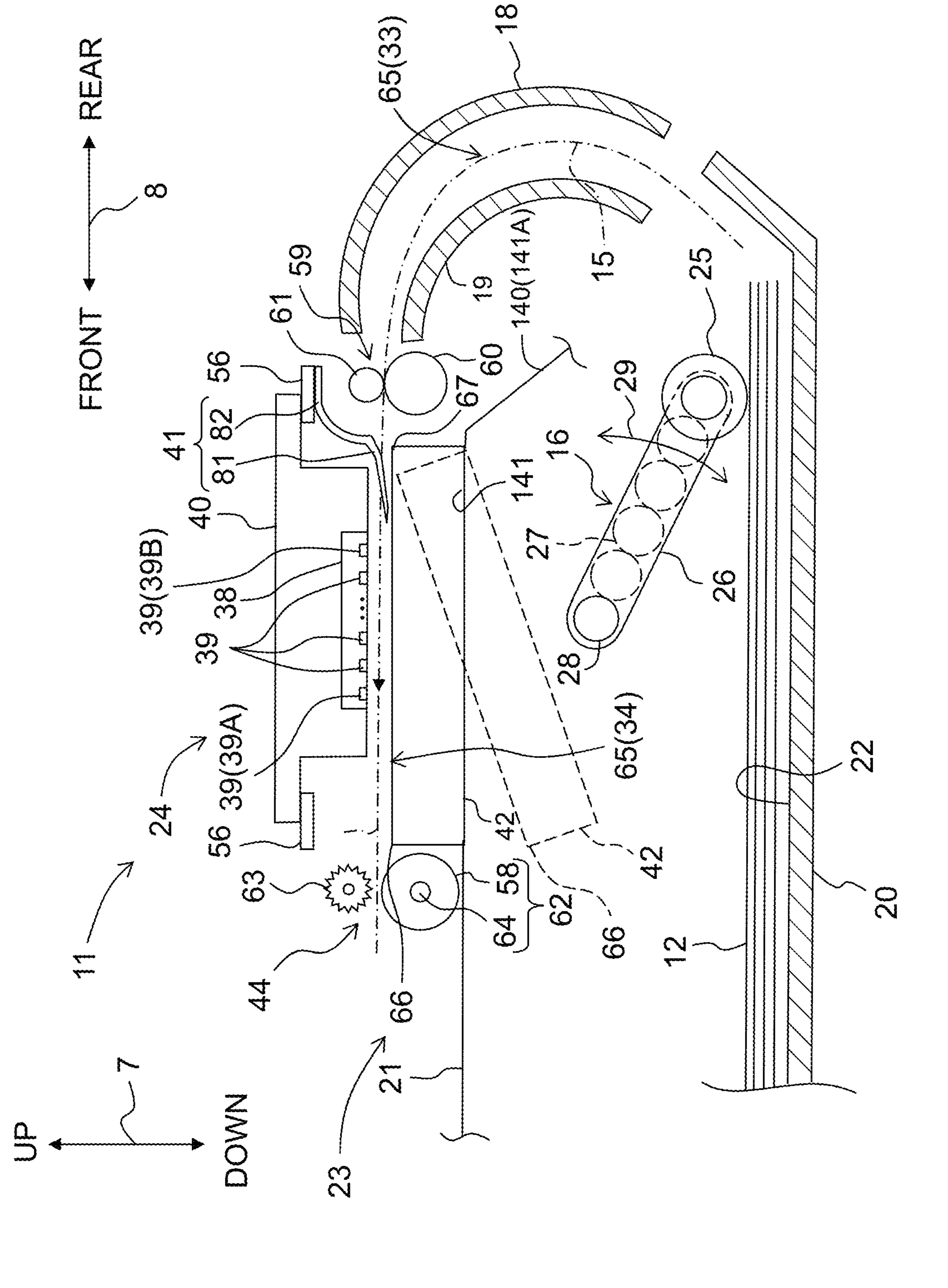
FIG. 26 is a vertical sectional view schematically depicting the internal structure of a printer part 11 in a modification.

For example, as depicted in FIG. 26, an upper surface 141 of a side wall 140 of the feed tray 20 may support the platen 42 located at the printing position. The side wall 140 corresponds to the side wall 30 of the feed tray 20 of the embodiment described above. An inclined surface 141A is formed at a back end portion of the upper surface 141 of the side wall 140. The inclined surface 141A guides the forward end portion of the platen 42 downwardly in accordance with the frontward movement brought about when the feed tray 20 is withdrawn from the casing 14. Accordingly, the platen 42 is rotated from the printing position depicted by the solid line in FIG. 26 to the release position depicted by the broken line in FIG. 26 (position at which the forward end part 66 of the upper surface of the platen 42 (support surface for the recording paper) is disposed downwardly as compared with when the platen 42 is located at the printing position). Further, the inclined surface 141A guides the forward end portion of the platen 42 upwardly in the process of the backward movement brought about when the slide member 74 is inserted into the casing 14. Accordingly, the platen 42 is rotated from the release position to the printing position. In this case, the inclined surface 141A of the upper surface 141 of the side wall 140 is an example of the guide portion. Further, the feed tray 20 is an example of the rotating mechanism.

According to the configuration depicted in FIG. 26, it is unnecessary to separately provide any member for supporting the feed tray 20 at the printing position. Therefore, it is possible to decrease the parts cost and the number of parts for constructing the printer unit 11.

According to the configuration depicted in FIG. 26, the platen 42 can be interlocked with the withdrawal of the feed tray 20 from the casing 14 by using the simple configuration of the inclined surface 141A.

Further, for example, the upper surface of the discharge tray 21 may support the platen 42 at the printing position, and the platen 42 may be rotated to the printing position and the release position while being interlocked with the movement of the discharge tray 21. Note that the discharge tray 21 may be moved integrally with the feed tray 20 in the same manner as the embodiment described above, or the discharge tray 21 may be moved separately from the feed tray 20. The discharge tray 21 is an example of the rotating mechanism.

The material of the frame (side frame 55 and guide rail 56) is not limited to the metal. The material may be made of resin containing, as a main component thereof, a resin such as polyacetal (POM), etc.

It is also allowable that the printer part 11 is not provided with the contact member 41.

In the embodiment described above, the conveying passage 65 is configured by the curved part 33 and the straight part 34. However, the configuration of the conveying passage 65 is not limited to this. For example, the conveying passage 65 may be a generally straight passage which extends frontwardly from an opening formed on the back surface of the casing 14 and which arrives at the internal space 23.

The printer part 11 of the embodiment described above is based on the so-called serial head system in which the recording part 24 is provided with the carriage 40. However, it is also allowable to adopt the so-called line head system in which the recording part 24 is not provided with the carriage 40, and the recording head 38 is provided to range from the left end to the right end of the conveying passage 65.

In the embodiment described above, the printer part 11 records an image on the recording paper 12 in accordance with the ink-jet system. However, it is also allowable to record the image on the recording paper 12 by means of any system other than the ink-jet system, for example, the electrophotography system.

What is claimed is:

1. An image recording apparatus comprising:

a casing including an opening and an internal space, the internal space being open to outside via the opening;

a tray which is to be installed to the casing by being inserted in a first orientation into the internal space via the opening, which is to be withdrawn from the casing in a second orientation that is opposite to the first orientation, and which is configured to support a sheet;

a sheet conveying passage located in the casing;

a platen located in the sheet conveying passage and including a support surface for supporting the sheet, the platen being located in the casing in a case that the tray is entirely withdrawn from the casing in the second orientation;

a recording part located above the platen and configured to record an image on the sheet supported by the platen; and an interlock which moves the platen while being interlocked with movement of the tray in the first orientation or movement in the second orientation, wherein the platen is movable to a printing position which is a position provided during the recording of the image on the sheet by the recording part and a release position at which the support surface is located under the printing position, wherein the interlock is configured to move the platen from the printing position to the release position in response to the withdrawal of the tray from the casing or the insertion of the tray into the casing, wherein the interlock includes a slide member which is located in the casing and which is slidable to a first position and a second position that is located in the second orientation as compared with the first position, wherein the slide member slides from the first position to the second position while being interlocked with the withdrawal of the tray from the casing, wherein the platen is moved from the printing position to the release position while being interlocked with the slide from the first position to the second position, wherein the image recording apparatus further comprises a roller pair located in the sheet conveying passage, including a driving roller and a driven roller that follows the driving roller, the roller pair being configured to nip the sheet to convey the sheet in a conveying orientation directed to the internal space, and wherein the slide member includes a biasing part configured to bias the platen toward the driving roller at the first position.

2. The image recording apparatus according to claim 1, wherein the interlock moves the platen while being interlocked with the movement of the tray in the second orientation, and the interlock moves the platen from the printing position to the release position while being interlocked with the withdrawal of the tray from the casing.

3. The image recording apparatus according to claim 2, wherein the sheet conveying passage includes a first path which U-turns from the first orientation to the second orientation while extending upwardly from the tray installed to the casing and a second path which is continued to the first path and which extends in the second orientation to arrive at the internal space, wherein the image recording apparatus further comprises a roller pair located in the second path and configured to nip the sheet to convey the sheet in the second orientation, wherein the support surface of the platen is located in the first orientation as compared with the roller pair in the second path, and wherein the release position is a position at which an end portion in the second orientation of the support surface is positioned under the printing position and a space between the platen and the recording part is communicated with the internal space via a gap between the end portion and the roller pair.

4. The image recording apparatus according to claim 1, wherein the interlock includes a lever which is located in the casing and which is rotatable to a third position and a fourth position at which a forward end is located in the second orientation as compared with the third position, wherein the lever is rotated from the third position to the fourth position by allowing the lever to contact the tray which is moved in the second orientation, and wherein the slide member slides from the first position to the second position by allowing the slide member to contact the lever which is rotated from the third position to the fourth position.

5. The image recording apparatus according to claim 4, wherein the lever is rotatable to the third position, the fourth position, and a fifth position at which the forward end is located in the first orientation as compared with the third position;

wherein the lever contacts the tray and rotates from the third position to one of the fourth position and the fifth position, and the slide member slides while contacting the rotating lever in a case that one of the insertion and the withdrawal of the tray with respect to the casing is executed, and wherein the slide member slides while contacting the tray in a case that the other of the insertion and the withdrawal of the tray with respect to the casing is executed.

6. The image recording apparatus according to claim 5, wherein the lever is rotated from the third position to the fourth position by allowing a first contact portion of the lever to contact the tray in accordance with one of the insertion and the withdrawal of the tray with respect to the casing, the lever is rotated from the third position to the fifth position by allowing a second contact portion of the lever to contact the tray in accordance with the other of the insertion and the withdrawal of the tray with respect to the casing, wherein the first contact portion and the second contact portion are positioned in the first orientation with respect to a rotation axis of the lever in a case that the other of the insertion and the withdrawal of the tray with respect to the casing is the insertion, and wherein the first contact portion and the second contact portion are located in the second orientation with respect to the rotation axis in a case that the other of the insertion and the withdrawal of the tray with respect to the casing is the withdrawal.

7. The image recording apparatus according to claim 1, wherein the slide member includes a guide which contacts the platen in a sliding process from the first position to the second position and which is configured to guide the platen from the printing position to the release position.

8. The image recording apparatus according to claim 2, further comprising:

a tray sensor configured to output a first signal in response that the tray is installed to the casing and output a second signal in response that the tray is not installed to the casing; and a controller, wherein the recording part further includes:

a head configured to discharge ink droplets; and a carriage configured to carry the head and being movable in a scanning direction intersecting the second orientation and an up-down direction to an opposing area in which the carriage is opposed to the platen in the up-down direction and a retracted area in which the carriage is retracted from the platen in the scanning direction, wherein the controller is configured to:

judge whether or not the carriage is located in the opposing area in response that an acquired signal is switched from the first signal to the second signal; and move the carriage to the retracted area in response that it is judged that the carriage is located in the opposing area.

9. The image recording apparatus according to claim 8, wherein the controller is configured to:

judge whether or not the sheet is present in a space between the platen and the recording part in a case that it is judged whether or not the carriage is positioned in the opposing area; and move the carriage to the retracted area in response that it is judged that the carriage is positioned in the opposing area and the sheet is present in the space between the platen and the recording part.

10. The image recording apparatus according to claim 9, further comprising:

a roller pair located in the sheet conveying passage and configured to nip the sheet to convey the sheet in the second orientation, wherein the controller does not drive the roller pair in response that it is judged that the carriage is located in the opposing area and the sheet is not present in the space between the platen and the recording part.

11. The image recording apparatus according to claim 9, further comprising:

a roller pair located in the sheet conveying passage and configured to nip the sheet to convey the sheet in the second orientation, wherein the controller executes a process in which the roller pair is allowed to convey the sheet disposed in the space between the platen and the recording part in the second orientation after moving the carriage to the retracted area in response that it is judged that the carriage is positioned in the opposing area and the sheet is present in the space between the platen and the recording part.

12. The image recording apparatus according to claim 11, wherein the controller adjusts a conveying speed of the sheet brought about by the roller pair in a case that the sheet, which is present in the space between the platen and the recording part, is conveyed in the second orientation so that the conveying speed of the sheet is slower than a conveying speed brought about in a case that the sheet after image recording by the recording part is conveyed in the second orientation by the roller pair.

13. The image recording apparatus according to claim 8, wherein the retracted area includes:

a first retracted area located in one orientation of the scanning direction as compared with the platen; and a second retracted area located in the other orientation of the scanning direction as compared with the platen, wherein the controller moves the carriage to the first retracted area in response that it is judged that the carriage is positioned on a side of the first retracted area as compared with a center in the scanning direction of the opposing area, and wherein the controller moves the carriage to the second retracted area in response that it is judged that the carriage is positioned on a side of the second retracted area as compared with the center in the scanning direction of the opposing area.

14. The image recording apparatus according to claim 8, further comprising:

a roller pair located in the sheet conveying passage and configured to convey the sheet in the second orientation; and an alarm configured to notify occurrence of an error, wherein the controller is configured to:

judge whether or not the sheet is present in a space between the platen and the recording part in response that the acquired signal is switched from the second signal to the first signal;

drive the roller pair so that the sheet, which is present in the space between the platen and the recording part, is conveyed in the second orientation in response that it is judged that the sheet is present in the space between the platen and the recording part;

judge whether or not the sheet is present in the space between the platen and the recording part again after driving the roller pair so that the sheet, which is present in the space between the platen and the recording part, is conveyed in the second orientation; and allow the alarm to notify the occurrence of the error in response that it is judged that the sheet is present in the space between the platen and the recording part in a case that it is judged whether or not the sheet is present in the space between the platen and the recording part again.

15. The image recording apparatus according to claim 1, wherein the internal space is located between the sheet conveying passage and the opening;

wherein the platen is located upstream in the conveying orientation from the roller pair in the sheet conveying passage, and wherein the slide member includes:

a guide configured to contact a first portion of the platen in a range ranging from the second position to a third position disposed between the second position and the first position in a slide process from the second position to the first position, the guide being configured to guide the platen from the release position to the printing position; and wherein the biasing part is configured to separate the first portion from the guide by contacting a second portion of the platen between the third position and the first position in the slide process from the second position to the first position.

16. The image recording apparatus according to claim 1, further comprising:

a roller pair located in the sheet conveying passage and configured to nip the sheet to convey the sheet in a conveying orientation directed to the internal space;

a rotating mechanism configured to rotate the platen to the printing position which is the position provided during the recording of the image on the sheet by the recording part and the release position at which an end portion in the conveying orientation of the support surface is positioned under the printing position and a space between the platen and the recording part is communicated with the internal space via a gap between the end portion and the roller pair; and a base member which constitutes a lower portion of the casing and which is integrally formed with a resin material, wherein the internal space is located between the sheet conveying passage and the opening, wherein the platen is positioned upstream in the conveying orientation from the roller pair in the sheet conveying passage, wherein the base member includes a wall which protrudes upwardly and which extends in a direction intersecting the conveying orientation and an up-down direction, and wherein in a case that the platen is located at the release position, the end portion is located upstream in the conveying orientation from the wall, and the end portion is supported by the base member under an upper end of the wall.

17. The image recording apparatus according to claim 1, wherein the tray includes a bottom wall on which the sheet is supported and a side wall which is provided upstandingly upwardly, wherein the interlock includes:

a lever located above the side wall at the same position as that of the side wall in a widthwise direction orthogonal to the first orientation and an up-down direction, the lever being rotatable to a first position at which a forward end is positioned under a rotation axis, a second position at which the forward end is positioned in the second orientation as compared with the first position, and a third position at which the forward end is positioned in the first orientation as compared with the first position, and is the lever being rotatable between the second position and the third position, wherein the lever is rotated from the first position to the second position in accordance with abutment against the tray that is to be withdrawn from the casing, while the lever is rotated from the first position to the third position in accordance with abutment against the tray that is to be inserted into the casing, wherein the slide member slides in the second orientation to move the platen from the printing position to the release position while being interlocked with the withdrawal of the tray from the casing or the rotation of the lever from the first position to the second position, wherein the slide member slides in the first orientation to move the platen from the release position to the printing position while being interlocked with the insertion of the tray into the casing or the rotation of the lever from the first position to the third position, wherein the side wall includes a cutout located on an upper surface of the side wall, and wherein an end in the second orientation of the cutout is located in the second orientation as compared with the lever located at the second position at a position of the tray provided upon contact in a case that the slide member contacts the lever positioned at the second position in a process in which the tray is inserted into the casing.

18. An image recording apparatus comprising:

a casing including an opening and an internal space, the internal space being open to outside via the opening;

a tray which is to be installed to the casing by being inserted in a first orientation into the internal space via the opening, which is to be withdrawn from the casing in a second orientation that is opposite to the first orientation, and which is configured to support a sheet;

a sheet conveying passage located in the casing;

a platen located in the sheet conveying passage and including a support surface for supporting the sheet;

a recording part located above the platen and configured to record an image on the sheet supported by the platen;

a slide member located in the casing and being slidable; and a lever located in the casing and being rotatable to a first position and a second position at which a forward end is disposed at a position different in an up-down direction from that provided at the first position, wherein the platen is movable to a printing position which is a position provided during the recording of the image on the sheet by the recording part and a release position at which the support surface is positioned under or below the printing position, while being interlocked with the slide of the slide member, wherein the lever is rotated from the first position to the second position while making contact with the tray, and the slide member slides while making contact with the rotating lever in a case that one of the insertion and the withdrawal of the tray with respect to the casing is executed, and wherein the slide member slides while making contact with the tray in a case that the other of the insertion and the withdrawal of the tray with respect to the casing is executed, wherein the image recording apparatus further comprises a roller pair located in the sheet conveying passage, including a driving roller and a driven roller that follows the driving roller, the roller pair being configured to nip the sheet to convey the sheet in a conveying orientation directed to the internal space, and wherein the slide member includes a biasing part configured to bias the platen toward the driving roller at the first position.

19. The image recording apparatus according to claim 18, wherein the lever includes a protrusion which protrudes in an orientation of rotation toward a contact position for making contact with the slide member.

* * * * *